United States Patent
Sabourin et al.

(10) Patent No.: US 11,816,224 B2
(45) Date of Patent: *Nov. 14, 2023

(54) ASSESSING AND MANAGING COMPUTATIONAL RISK INVOLVED WITH INTEGRATING THIRD PARTY COMPUTING FUNCTIONALITY WITHIN A COMPUTING SYSTEM

(71) Applicant: OneTrust, LLC, Atlanta, GA (US)

(72) Inventors: Jason L. Sabourin, Brookhaven, GA (US); Shiven Patel, Atlanta, GA (US)

(73) Assignee: OneTrust, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/977,285

(22) Filed: Oct. 31, 2022

(65) Prior Publication Data

US 2023/0046469 A1 Feb. 16, 2023

Related U.S. Application Data

(63) Continuation of application No. 17/722,551, filed on Apr. 18, 2022, now Pat. No. 11,562,078.

(Continued)

(51) Int. Cl.
*G06F 21/57* (2013.01)
*G06F 9/54* (2006.01)
*G06Q 10/0635* (2023.01)

(52) U.S. Cl.
CPC ............ *G06F 21/577* (2013.01); *G06F 9/547* (2013.01); *G06Q 10/0635* (2013.01)

(58) Field of Classification Search
CPC .............................. G06F 21/577; G06F 9/547
See application file for complete search history.

(56) References Cited

U.S. PATENT DOCUMENTS

| | | | |
|---|---|---|---|
| 4,536,866 | A | 8/1985 | Jerome et al. |
| 4,574,350 | A | 3/1986 | Starr |

(Continued)

FOREIGN PATENT DOCUMENTS

| | | |
|---|---|---|
| CN | 111496802 | 8/2020 |
| CN | 112115859 | 12/2020 |

(Continued)

OTHER PUBLICATIONS

Tuomas Aura et al., Scanning Electronic Documents for Personally Identifiable Information, ACM, Oct. 30, 2006, retrieved online on Jun. 13, 2019, pp. 41-49. Retrieved from the Internet: URL: http://delivery.acm.org/10.1145/1180000/1179608/p41-aura.pdf? (Year: 2006).

(Continued)

*Primary Examiner* — Thaddeus J Plecha
(74) *Attorney, Agent, or Firm* — Brient IP Law, LLC

(57) ABSTRACT

In general, various aspects of the present disclosure provide methods, apparatuses, systems, computing devices, computing entities, and/or the like for addressing a modified risk rating identifying a risk to an entity of having computer-implemented functionality provided by a vendor integrated with a computing system of the entity. In accordance various aspects, a method is provided that comprises: receiving a first assessment dataset for computer-implemented functionality; detecting an inconsistency between a value of an attribute for the computer-implemented functionality specified in the first assessment dataset and a corresponding value of the attribute specified in a second assessment dataset for the computer-implemented functionality; modifying a risk rating that identifies a risk to the entity of having the computer-implemented functionality integrated with the computing system to generate a modified risk rating based on the inconsistency; and in response, performing an action (Continued)

with respect to the computing system to address the modified risk rating.

20 Claims, 15 Drawing Sheets

Related U.S. Application Data

(60) Provisional application No. 63/176,185, filed on Apr. 16, 2021.

(56) References Cited

U.S. PATENT DOCUMENTS

| | | |
|---|---|---|
| 5,193,162 A | 3/1993 | Bordsen et al. |
| 5,276,735 A | 1/1994 | Boebert et al. |
| 5,329,447 A | 7/1994 | Leedom, Jr. |
| 5,404,299 A | 4/1995 | Tsurubayashi et al. |
| 5,535,393 A | 7/1996 | Reeve et al. |
| 5,560,005 A | 9/1996 | Hoover et al. |
| 5,668,986 A | 9/1997 | Nilsen et al. |
| 5,710,917 A | 1/1998 | Musa et al. |
| 5,761,529 A | 6/1998 | Raji |
| 5,764,906 A | 6/1998 | Edelstein et al. |
| 5,872,973 A | 2/1999 | Mitchell et al. |
| 5,913,041 A | 6/1999 | Ramanathan et al. |
| 5,913,214 A | 6/1999 | Madnick et al. |
| 6,009,429 A | 12/1999 | Greer et al. |
| 6,016,394 A | 1/2000 | Walker |
| 6,122,627 A | 9/2000 | Carey et al. |
| 6,148,297 A | 11/2000 | Swor et al. |
| 6,148,342 A | 11/2000 | Ho |
| 6,240,416 B1 | 5/2001 | Immon et al. |
| 6,240,422 B1 | 5/2001 | Atkins et al. |
| 6,243,816 B1 | 6/2001 | Fang et al. |
| 6,253,203 B1 | 6/2001 | OFlaherty et al. |
| 6,263,335 B1 | 7/2001 | Paik et al. |
| 6,272,631 B1 | 8/2001 | Thomlinson et al. |
| 6,275,824 B1 | 8/2001 | OFlaherty et al. |
| 6,282,548 B1 | 8/2001 | Burner et al. |
| 6,330,562 B1 | 12/2001 | Boden et al. |
| 6,363,488 B1 | 3/2002 | Ginter et al. |
| 6,374,237 B1 | 4/2002 | Reese |
| 6,374,252 B1 | 4/2002 | Althoff et al. |
| 6,408,336 B1 | 6/2002 | Schneider et al. |
| 6,427,230 B1 | 7/2002 | Goiffon et al. |
| 6,442,688 B1 | 8/2002 | Moses et al. |
| 6,446,120 B1 | 9/2002 | Dantressangle |
| 6,463,488 B1 | 10/2002 | San Juan |
| 6,484,149 B1 | 11/2002 | Jammes et al. |
| 6,484,180 B1 | 11/2002 | Lyons et al. |
| 6,516,314 B1 | 2/2003 | Birkler et al. |
| 6,516,337 B1 | 2/2003 | Tripp et al. |
| 6,519,571 B1 | 2/2003 | Guheen et al. |
| 6,574,631 B1 | 6/2003 | Subramanian et al. |
| 6,591,272 B1 | 7/2003 | Williams |
| 6,601,233 B1 | 7/2003 | Underwood |
| 6,606,744 B1 | 8/2003 | Mikurak |
| 6,611,812 B2 | 8/2003 | Hurtado et al. |
| 6,625,602 B1 | 9/2003 | Meredith et al. |
| 6,629,081 B1 | 9/2003 | Cornelius et al. |
| 6,633,878 B1 | 10/2003 | Underwood |
| 6,662,192 B1 | 12/2003 | Rebane |
| 6,662,357 B1 | 12/2003 | Bowman-Amuah |
| 6,697,824 B1 | 2/2004 | Bowman-Amuah |
| 6,699,042 B2 | 3/2004 | Smith et al. |
| 6,701,314 B1 | 3/2004 | Conover et al. |
| 6,721,713 B1 | 4/2004 | Guheen et al. |
| 6,725,200 B1 | 4/2004 | Rost |
| 6,732,109 B2 | 5/2004 | Lindberg et al. |
| 6,754,665 B1 | 6/2004 | Futagami et al. |
| 6,755,344 B1 | 6/2004 | Mollett et al. |
| 6,757,685 B2 | 6/2004 | Raffaele et al. |
| 6,757,888 B1 | 6/2004 | Knutson et al. |
| 6,779,095 B2 | 8/2004 | Selkirk et al. |
| 6,816,944 B2 | 11/2004 | Peng |
| 6,826,693 B1 | 11/2004 | Yoshida et al. |
| 6,850,252 B1 | 2/2005 | Hoffberg |
| 6,886,101 B2 | 4/2005 | Glazer et al. |
| 6,901,346 B2 | 5/2005 | Tracy et al. |
| 6,904,417 B2 | 6/2005 | Clayton et al. |
| 6,909,897 B2 | 6/2005 | Kikuchi |
| 6,912,676 B1 | 6/2005 | Gusler et al. |
| 6,925,443 B1 | 8/2005 | Baggett, Jr. et al. |
| 6,938,041 B1 | 8/2005 | Brandow et al. |
| 6,956,845 B2 | 10/2005 | Baker et al. |
| 6,978,270 B1 | 12/2005 | Carty et al. |
| 6,980,927 B2 | 12/2005 | Tracy et al. |
| 6,980,987 B2 | 12/2005 | Kaminer |
| 6,983,221 B2 | 1/2006 | Tracy et al. |
| 6,985,887 B1 | 1/2006 | Sunstein et al. |
| 6,990,454 B2 | 1/2006 | McIntosh |
| 6,993,448 B2 | 1/2006 | Tracy et al. |
| 6,993,495 B2 | 1/2006 | Smith, Jr. et al. |
| 6,996,807 B1 | 2/2006 | Vardi et al. |
| 7,003,560 B1 | 2/2006 | Mullen et al. |
| 7,003,662 B2 | 2/2006 | Genty et al. |
| 7,013,290 B2 | 3/2006 | Ananian |
| 7,017,105 B2 | 3/2006 | Flanagin et al. |
| 7,023,979 B1 | 4/2006 | Wu et al. |
| 7,039,594 B1 | 5/2006 | Gersting |
| 7,039,654 B1 | 5/2006 | Eder |
| 7,047,517 B1 | 5/2006 | Brown et al. |
| 7,051,036 B2 | 5/2006 | Rosnow et al. |
| 7,051,038 B1 | 5/2006 | Yeh et al. |
| 7,058,970 B2 | 6/2006 | Shaw |
| 7,069,427 B2 | 6/2006 | Adler et al. |
| 7,076,558 B1 | 7/2006 | Dunn |
| 7,093,200 B2 | 8/2006 | Schreiber et al. |
| 7,095,854 B1 | 8/2006 | Ginter et al. |
| 7,100,195 B1 | 8/2006 | Underwood |
| 7,120,800 B2 | 10/2006 | Ginter et al. |
| 7,124,101 B1 | 10/2006 | Mikurak |
| 7,124,107 B1 | 10/2006 | Pishevar et al. |
| 7,127,705 B2 | 10/2006 | Christfort et al. |
| 7,127,741 B2 | 10/2006 | Bandini et al. |
| 7,133,845 B1 | 11/2006 | Ginter et al. |
| 7,139,999 B2 | 11/2006 | Bowman-Amuah |
| 7,143,091 B2 | 11/2006 | Charnock et al. |
| 7,149,698 B2 | 12/2006 | Guheen et al. |
| 7,165,041 B1 | 1/2007 | Guheen et al. |
| 7,167,842 B1 | 1/2007 | Josephson, II et al. |
| 7,167,844 B1 | 1/2007 | Leong et al. |
| 7,171,379 B2 | 1/2007 | Menninger et al. |
| 7,181,438 B1 | 2/2007 | Szabo |
| 7,203,929 B1 | 4/2007 | Vinodkrishnan et al. |
| 7,213,233 B1 | 5/2007 | Vinodkrish |
| 7,216,155 B2 | 5/2007 | Stuckman et al. |
| 7,216,340 B1 | 5/2007 | Vinodkrishnan et al. |
| 7,219,066 B2 | 5/2007 | Parks et al. |
| 7,223,234 B2 | 5/2007 | Stupp et al. |
| 7,225,460 B2 | 5/2007 | Barzilai et al. |
| 7,234,065 B2 | 6/2007 | Breslin et al. |
| 7,247,625 B2 | 7/2007 | Zhang et al. |
| 7,251,624 B1 | 7/2007 | Lee et al. |
| 7,260,830 B2 | 8/2007 | Sugimoto |
| 7,266,566 B1 | 9/2007 | Kennaley et al. |
| 7,272,818 B2 | 9/2007 | Ishimitsu et al. |
| 7,275,063 B2 | 9/2007 | Horn |
| 7,281,020 B2 | 10/2007 | Fine |
| 7,284,232 B1 | 10/2007 | Bates et al. |
| 7,284,271 B2 | 10/2007 | Lucovsky et al. |
| 7,287,280 B2 | 10/2007 | Young |
| 7,290,275 B2 | 10/2007 | Baudoin et al. |
| 7,293,119 B2 | 11/2007 | Beale |
| 7,299,299 B2 | 11/2007 | Hollenbeck et al. |
| 7,302,569 B2 | 11/2007 | Betz et al. |
| 7,313,575 B2 | 12/2007 | Carr et al. |
| 7,313,699 B2 | 12/2007 | Koga |
| 7,313,825 B2 | 12/2007 | Redlich et al. |
| 7,315,826 B1 | 1/2008 | Guheen et al. |
| 7,315,849 B2 | 1/2008 | Bakalash et al. |
| 7,322,047 B2 | 1/2008 | Redlich et al. |
| 7,330,805 B2 | 2/2008 | Iimori |

(56) References Cited

U.S. PATENT DOCUMENTS

| | | |
|---|---|---|
| 7,340,447 B2 | 3/2008 | Ghatare |
| 7,340,776 B2 | 3/2008 | Zobel et al. |
| 7,343,434 B2 | 3/2008 | Kapoor et al. |
| 7,346,518 B1 | 3/2008 | Frank et al. |
| 7,353,204 B2 | 4/2008 | Liu |
| 7,353,283 B2 | 4/2008 | Henaff et al. |
| 7,356,559 B1 | 4/2008 | Jacobs et al. |
| 7,367,014 B2 | 4/2008 | Griffin |
| 7,370,025 B1 | 5/2008 | Pandit |
| 7,376,835 B2 | 5/2008 | Olkin et al. |
| 7,380,120 B1 | 5/2008 | Garcia |
| 7,382,903 B2 | 6/2008 | Ray |
| 7,383,570 B2 | 6/2008 | Pinkas et al. |
| 7,391,854 B2 | 6/2008 | Salonen et al. |
| 7,398,393 B2 | 7/2008 | Mont et al. |
| 7,401,235 B2 | 7/2008 | Mowers et al. |
| 7,403,942 B1 | 7/2008 | Bayliss |
| 7,409,354 B2 | 8/2008 | Putnam et al. |
| 7,412,402 B2 | 8/2008 | Cooper |
| 7,424,680 B2 | 9/2008 | Carpenter |
| 7,428,546 B2 | 9/2008 | Nori et al. |
| 7,428,707 B2 | 9/2008 | Quimby |
| 7,430,585 B2 | 9/2008 | Sibert |
| 7,454,457 B1 | 11/2008 | Lowery et al. |
| 7,454,508 B2 | 11/2008 | Mathew et al. |
| 7,478,157 B2 | 1/2009 | Bohrer et al. |
| 7,480,694 B2 | 1/2009 | Blennerhassett et al. |
| 7,480,755 B2 | 1/2009 | Herrell et al. |
| 7,487,170 B2 | 2/2009 | Stevens |
| 7,493,282 B2 | 2/2009 | Manly et al. |
| 7,500,607 B2 | 3/2009 | Williams |
| 7,512,987 B2 | 3/2009 | Williams |
| 7,516,882 B2 | 4/2009 | Cucinotta |
| 7,523,053 B2 | 4/2009 | Pudhukottai et al. |
| 7,529,836 B1 | 5/2009 | Bolen |
| 7,533,113 B1 | 5/2009 | Haddad |
| 7,548,968 B1 | 6/2009 | Bura et al. |
| 7,552,480 B1 | 6/2009 | Voss |
| 7,562,339 B2 | 7/2009 | Racca et al. |
| 7,565,685 B2 | 7/2009 | Ross et al. |
| 7,567,541 B2 | 7/2009 | Karimi et al. |
| 7,584,505 B2 | 9/2009 | Mondri et al. |
| 7,584,508 B1 | 9/2009 | Kashchenko et al. |
| 7,587,749 B2 | 9/2009 | Leser et al. |
| 7,590,705 B2 | 9/2009 | Mathew et al. |
| 7,590,972 B2 | 9/2009 | Axelrod et al. |
| 7,603,356 B2 | 10/2009 | Schran et al. |
| 7,606,783 B1 | 10/2009 | Carter |
| 7,606,790 B2 | 10/2009 | Levy |
| 7,607,120 B2 | 10/2009 | Sanyal et al. |
| 7,613,700 B1 | 11/2009 | Lobo et al. |
| 7,617,136 B1 | 11/2009 | Lessing et al. |
| 7,617,167 B2 | 11/2009 | Griffis et al. |
| 7,620,644 B2 | 11/2009 | Cote et al. |
| 7,627,666 B1 | 12/2009 | DeGiulio et al. |
| 7,630,874 B2 | 12/2009 | Fables et al. |
| 7,630,998 B2 | 12/2009 | Zhou et al. |
| 7,636,742 B1 | 12/2009 | Olavarrieta et al. |
| 7,640,322 B2 | 12/2009 | Wendkos et al. |
| 7,650,497 B2 | 1/2010 | Thornton et al. |
| 7,653,592 B1 | 1/2010 | Flaxman et al. |
| 7,657,476 B2 | 2/2010 | Barney |
| 7,657,694 B2 | 2/2010 | Mansell et al. |
| 7,665,073 B2 | 2/2010 | Meijer et al. |
| 7,665,125 B2 | 2/2010 | Heard et al. |
| 7,668,947 B2 | 2/2010 | Hutchinson et al. |
| 7,673,282 B2 | 3/2010 | Amaru et al. |
| 7,676,034 B1 | 3/2010 | Wu et al. |
| 7,681,034 B1 | 3/2010 | Lee et al. |
| 7,681,140 B2 | 3/2010 | Ebert |
| 7,685,561 B2 | 3/2010 | Deem et al. |
| 7,685,577 B2 | 3/2010 | Pace et al. |
| 7,693,593 B2 | 4/2010 | Ishibashi et al. |
| 7,698,398 B1 | 4/2010 | Lai |
| 7,702,639 B2 | 4/2010 | Stanley et al. |
| 7,707,224 B2 | 4/2010 | Chastagnol et al. |
| 7,711,995 B1 | 5/2010 | Morris |
| 7,712,029 B2 | 5/2010 | Ferreira et al. |
| 7,716,242 B2 | 5/2010 | Pae et al. |
| 7,725,474 B2 | 5/2010 | Tamai et al. |
| 7,725,875 B2 | 5/2010 | Waldrep |
| 7,729,940 B2 | 6/2010 | Harvey et al. |
| 7,730,142 B2 | 6/2010 | LeVasseur et al. |
| 7,752,124 B2 | 7/2010 | Green et al. |
| 7,756,826 B2 | 7/2010 | Bots et al. |
| 7,756,987 B2 | 7/2010 | Wang et al. |
| 7,761,586 B2 | 7/2010 | Olenick et al. |
| 7,774,745 B2 | 8/2010 | Fildebrandt et al. |
| 7,788,212 B2 | 8/2010 | Beckmann et al. |
| 7,788,222 B2 | 8/2010 | Shah et al. |
| 7,788,632 B2 | 8/2010 | Kuester et al. |
| 7,788,726 B2 | 8/2010 | Teixeira |
| 7,797,726 B2 | 9/2010 | Ashley et al. |
| 7,801,758 B2 | 9/2010 | Gracie et al. |
| 7,801,826 B2 | 9/2010 | Labrou et al. |
| 7,801,912 B2 | 9/2010 | Ransil et al. |
| 7,802,305 B1 | 9/2010 | Leeds |
| 7,805,349 B2 | 9/2010 | Yu et al. |
| 7,805,451 B2 | 9/2010 | Hosokawa |
| 7,813,947 B2 | 10/2010 | DeAngelis et al. |
| 7,822,620 B2 | 10/2010 | Dixon et al. |
| 7,827,523 B2 | 11/2010 | Ahmed et al. |
| 7,836,078 B2 | 11/2010 | Dettinger et al. |
| 7,844,640 B2 | 11/2010 | Bender et al. |
| 7,849,143 B2 | 12/2010 | Vuong |
| 7,853,468 B2 | 12/2010 | Callahan et al. |
| 7,853,470 B2 | 12/2010 | Sonnleithner et al. |
| 7,853,925 B2 | 12/2010 | Kemmler |
| 7,860,816 B2 | 12/2010 | Fokoue-Nkoutche et al. |
| 7,870,540 B2 | 1/2011 | Zare et al. |
| 7,870,608 B2 | 1/2011 | Shraim et al. |
| 7,873,541 B1 | 1/2011 | Klar et al. |
| 7,877,327 B2 | 1/2011 | Gwiazda et al. |
| 7,877,812 B2 | 1/2011 | Koved et al. |
| 7,885,841 B2 | 2/2011 | King |
| 7,890,461 B2 | 2/2011 | Oeda et al. |
| 7,895,260 B2 | 2/2011 | Archer et al. |
| 7,904,360 B2 | 3/2011 | Evans |
| 7,904,478 B2 | 3/2011 | Yu et al. |
| 7,904,487 B2 | 3/2011 | Ghatare |
| 7,917,888 B2 | 3/2011 | Chong et al. |
| 7,917,963 B2 | 3/2011 | Goyal et al. |
| 7,921,152 B2 | 4/2011 | Ashley et al. |
| 7,930,197 B2 | 4/2011 | Ozzie et al. |
| 7,930,753 B2 | 4/2011 | Mellinger et al. |
| 7,953,725 B2 | 5/2011 | Burris et al. |
| 7,954,150 B2 | 5/2011 | Croft et al. |
| 7,958,087 B2 | 6/2011 | Blumenau |
| 7,958,494 B2 | 6/2011 | Chaar et al. |
| 7,962,900 B2 | 6/2011 | Barraclough et al. |
| 7,966,310 B2 | 6/2011 | Sullivan et al. |
| 7,966,599 B1 | 6/2011 | Malasky et al. |
| 7,966,663 B2 | 6/2011 | Strickland et al. |
| 7,974,992 B2 | 7/2011 | Fastabend et al. |
| 7,975,000 B2 | 7/2011 | Dixon et al. |
| 7,991,559 B2 | 8/2011 | Dzekunov et al. |
| 7,991,747 B1 | 8/2011 | Upadhyay et al. |
| 7,996,372 B2 | 8/2011 | Rubel, Jr. |
| 8,005,891 B2 | 8/2011 | Knowles et al. |
| 8,010,612 B2 | 8/2011 | Costea et al. |
| 8,010,720 B2 | 8/2011 | Iwaoka et al. |
| 8,019,881 B2 | 9/2011 | Sandhu et al. |
| 8,020,206 B2 | 9/2011 | Hubbard et al. |
| 8,024,384 B2 | 9/2011 | Prabhakar et al. |
| 8,032,721 B2 | 10/2011 | Murai |
| 8,036,374 B2 | 10/2011 | Noble, Jr. |
| 8,037,409 B2 | 10/2011 | Jacob et al. |
| 8,041,749 B2 | 10/2011 | Beck |
| 8,041,763 B2 | 10/2011 | Kordun et al. |
| 8,041,913 B2 | 10/2011 | Wang |
| 8,069,161 B2 | 11/2011 | Bugir et al. |
| 8,069,471 B2 | 11/2011 | Boren |
| 8,082,539 B1 | 12/2011 | Schelkogonov |
| 8,090,754 B2 | 1/2012 | Schmidt et al. |

(56) References Cited

U.S. PATENT DOCUMENTS

| | | |
|---|---|---|
| 8,095,923 B2 | 1/2012 | Harvey et al. |
| 8,099,709 B2 | 1/2012 | Baikov et al. |
| 8,103,962 B2 | 1/2012 | Embley et al. |
| 8,117,441 B2 | 2/2012 | Kurien et al. |
| 8,135,815 B2 | 3/2012 | Mayer |
| 8,146,054 B2 | 3/2012 | Baker et al. |
| 8,146,074 B2 | 3/2012 | Ito et al. |
| 8,150,717 B2 | 4/2012 | Whitmore |
| 8,156,105 B2 | 4/2012 | Altounian et al. |
| 8,156,158 B2 | 4/2012 | Rolls et al. |
| 8,156,159 B2 | 4/2012 | Ebrahimi et al. |
| 8,166,406 B1 | 4/2012 | Goldfeder et al. |
| 8,176,061 B2 | 5/2012 | Swanbeck et al. |
| 8,176,177 B2 | 5/2012 | Sussman et al. |
| 8,176,334 B2 | 5/2012 | Vainstein |
| 8,176,470 B2 | 5/2012 | Klumpp et al. |
| 8,180,759 B2 | 5/2012 | Joseph |
| 8,181,151 B2 | 5/2012 | Sedukhin et al. |
| 8,185,409 B2 | 5/2012 | Putnam et al. |
| 8,185,497 B2 | 5/2012 | Vermeulen et al. |
| 8,196,176 B2 | 6/2012 | Berteau et al. |
| 8,205,093 B2 | 6/2012 | Argott |
| 8,205,140 B2 | 6/2012 | Hafeez et al. |
| 8,214,362 B1 | 7/2012 | Djabarov |
| 8,214,803 B2 | 7/2012 | Horii et al. |
| 8,234,377 B2 | 7/2012 | Cohn |
| 8,239,244 B2 | 8/2012 | Ginsberg et al. |
| 8,250,051 B2 | 8/2012 | Bugir et al. |
| 8,255,468 B2 | 8/2012 | Vitaldevara et al. |
| 8,260,262 B2 | 9/2012 | Ben Ayed |
| 8,261,362 B2 | 9/2012 | Goodwin et al. |
| 8,266,231 B1 | 9/2012 | Golovin et al. |
| 8,275,632 B2 | 9/2012 | Awaraji et al. |
| 8,275,793 B2 | 9/2012 | Ahmad et al. |
| 8,286,239 B1 | 10/2012 | Sutton |
| 8,312,549 B2 | 11/2012 | Goldberg et al. |
| 8,316,237 B1 | 11/2012 | Felsher et al. |
| 8,332,908 B2 | 12/2012 | Hatakeyama et al. |
| 8,340,999 B2 | 12/2012 | Kumaran et al. |
| 8,341,405 B2 | 12/2012 | Meijer et al. |
| 8,346,929 B1 | 1/2013 | Lai |
| 8,364,713 B2 | 1/2013 | Pollard |
| 8,370,224 B2 | 2/2013 | Grewal |
| 8,370,794 B2 | 2/2013 | Moosmann et al. |
| 8,380,630 B2 | 2/2013 | Felsher |
| 8,380,743 B2 | 2/2013 | Convertino et al. |
| 8,381,180 B2 | 2/2013 | Rostoker |
| 8,381,297 B2 | 2/2013 | Touboul |
| 8,386,314 B2 | 2/2013 | Kirkby et al. |
| 8,392,982 B2 | 3/2013 | Harris et al. |
| 8,418,226 B2 | 4/2013 | Gardner |
| 8,423,954 B2 | 4/2013 | Ronen et al. |
| 8,429,179 B1 | 4/2013 | Mirhaji |
| 8,429,597 B2 | 4/2013 | Prigge |
| 8,429,630 B2 | 4/2013 | Nickolov et al. |
| 8,429,758 B2 | 4/2013 | Chen et al. |
| 8,438,644 B2 | 5/2013 | Watters et al. |
| 8,448,252 B1 | 5/2013 | King et al. |
| 8,452,693 B2 | 5/2013 | Shah et al. |
| 8,463,247 B2 | 6/2013 | Misiag |
| 8,464,311 B2 | 6/2013 | Ashley et al. |
| 8,468,244 B2 | 6/2013 | Redlich et al. |
| 8,473,324 B2 | 6/2013 | Alvarez et al. |
| 8,474,012 B2 | 6/2013 | Ahmed et al. |
| 8,494,894 B2 | 7/2013 | Jaster et al. |
| 8,504,481 B2 | 8/2013 | Motahari et al. |
| 8,510,199 B1 | 8/2013 | Erlanger |
| 8,515,988 B2 | 8/2013 | Jones et al. |
| 8,516,076 B2 | 8/2013 | Thomas |
| 8,527,337 B1 | 9/2013 | Lim et al. |
| 8,533,746 B2 | 9/2013 | Nolan et al. |
| 8,533,844 B2 | 9/2013 | Mahaffey et al. |
| 8,538,817 B2 | 9/2013 | Wilson |
| 8,539,359 B2 | 9/2013 | Rapaport et al. |
| 8,539,437 B2 | 9/2013 | Finlayson et al. |
| 8,560,645 B2 | 10/2013 | Linden et al. |
| 8,560,841 B2 | 10/2013 | Chin et al. |
| 8,560,956 B2 | 10/2013 | Curtis et al. |
| 8,561,100 B2 | 10/2013 | Hu et al. |
| 8,561,153 B2 | 10/2013 | Grason et al. |
| 8,565,729 B2 | 10/2013 | Moseler et al. |
| 8,566,726 B2 | 10/2013 | Dixon et al. |
| 8,566,938 B1 | 10/2013 | Prakash et al. |
| 8,571,909 B2 | 10/2013 | Miller et al. |
| 8,572,717 B2 | 10/2013 | Narayanaswamy |
| 8,578,036 B1 | 11/2013 | Holfelder et al. |
| 8,578,166 B2 | 11/2013 | De Monseignat et al. |
| 8,578,481 B2 | 11/2013 | Rowley |
| 8,578,501 B1 | 11/2013 | Ogilvie |
| 8,583,694 B2 | 11/2013 | Siegel et al. |
| 8,583,766 B2 | 11/2013 | Dixon et al. |
| 8,589,183 B2 | 11/2013 | Awaraji et al. |
| 8,589,372 B2 | 11/2013 | Krislov |
| 8,601,467 B2 | 12/2013 | Hofhansl et al. |
| 8,601,591 B2 | 12/2013 | Krishnamurthy et al. |
| 8,606,746 B2 | 12/2013 | Yeap et al. |
| 8,612,420 B2 | 12/2013 | Sun et al. |
| 8,612,993 B2 | 12/2013 | Grant et al. |
| 8,615,549 B2 | 12/2013 | Knowles et al. |
| 8,615,731 B2 | 12/2013 | Doshi |
| 8,620,952 B2 | 12/2013 | Bennett et al. |
| 8,621,637 B2 | 12/2013 | Al-Harbi et al. |
| 8,626,671 B2 | 1/2014 | Federgreen |
| 8,627,114 B2 | 1/2014 | Resch et al. |
| 8,630,961 B2 | 1/2014 | Beilby et al. |
| 8,631,048 B1 | 1/2014 | Davis et al. |
| 8,640,110 B2 | 1/2014 | Kopp et al. |
| 8,646,072 B1 | 2/2014 | Savant |
| 8,650,399 B2 | 2/2014 | Le Bihan et al. |
| 8,655,939 B2 | 2/2014 | Redlich et al. |
| 8,656,265 B1 | 2/2014 | Paulin et al. |
| 8,656,456 B2 | 2/2014 | Maxson et al. |
| 8,661,036 B2 | 2/2014 | Turski et al. |
| 8,667,074 B1 | 3/2014 | Farkas |
| 8,667,487 B1 | 3/2014 | Boodman et al. |
| 8,677,472 B1 | 3/2014 | Dotan et al. |
| 8,681,984 B2 | 3/2014 | Lee et al. |
| 8,682,698 B2 | 3/2014 | Cashman et al. |
| 8,683,201 B2 | 3/2014 | Shaty |
| 8,683,502 B2 | 3/2014 | Shkedi et al. |
| 8,688,601 B2 | 4/2014 | Jaiswal |
| 8,689,292 B2 | 4/2014 | Williams et al. |
| 8,693,689 B2 | 4/2014 | Belenkiy et al. |
| 8,700,524 B2 | 4/2014 | Williams et al. |
| 8,700,699 B2 | 4/2014 | Shen et al. |
| 8,706,742 B1 | 4/2014 | Ravid et al. |
| 8,707,451 B2 | 4/2014 | Ture et al. |
| 8,712,813 B2 | 4/2014 | King |
| 8,713,098 B1 | 4/2014 | Adya et al. |
| 8,713,638 B2 | 4/2014 | Hu et al. |
| 8,719,366 B2 | 5/2014 | Mathew et al. |
| 8,732,839 B2 | 5/2014 | Hohl |
| 8,744,894 B2 | 6/2014 | Christiansen et al. |
| 8,751,285 B2 | 6/2014 | Deb et al. |
| 8,762,406 B2 | 6/2014 | Ho et al. |
| 8,762,413 B2 | 6/2014 | Graham, Jr. et al. |
| 8,763,071 B2 | 6/2014 | Sinha et al. |
| 8,763,082 B2 | 6/2014 | Huber et al. |
| 8,763,131 B2 | 6/2014 | Archer et al. |
| 8,767,947 B1 | 7/2014 | Ristock et al. |
| 8,769,242 B2 | 7/2014 | Tkac et al. |
| 8,769,412 B2 | 7/2014 | Gill et al. |
| 8,769,671 B2 | 7/2014 | Shraim et al. |
| 8,776,241 B2 | 7/2014 | Zaitsev |
| 8,788,935 B1 | 7/2014 | Hirsch et al. |
| 8,793,614 B2 | 7/2014 | Wilson et al. |
| 8,793,650 B2 | 7/2014 | Hilerio et al. |
| 8,793,781 B2 | 7/2014 | Grossi et al. |
| 8,793,809 B2 | 7/2014 | Falkenburg et al. |
| 8,799,984 B2 | 8/2014 | Ahn |
| 8,805,707 B2 | 8/2014 | Schumann, Jr. et al. |
| 8,805,806 B2 | 8/2014 | Amarendran et al. |
| 8,805,925 B2 | 8/2014 | Price et al. |
| 8,812,342 B2 | 8/2014 | Barcelo et al. |

(56) References Cited

U.S. PATENT DOCUMENTS

| | | |
|---|---|---|
| 8,812,752 B1 | 8/2014 | Shih et al. |
| 8,812,766 B2 | 8/2014 | Kranendonk et al. |
| 8,813,028 B2 | 8/2014 | Farooqi |
| 8,813,214 B1 | 8/2014 | McNair et al. |
| 8,819,253 B2 | 8/2014 | Simeloff et al. |
| 8,819,617 B1 | 8/2014 | Koenig et al. |
| 8,819,800 B2 | 8/2014 | Gao et al. |
| 8,826,446 B1 | 9/2014 | Liu et al. |
| 8,832,649 B2 | 9/2014 | Bishop et al. |
| 8,832,854 B1 | 9/2014 | Staddon et al. |
| 8,839,232 B2 | 9/2014 | Taylor et al. |
| 8,839,346 B2 | 9/2014 | Murgia et al. |
| 8,843,487 B2 | 9/2014 | McGraw et al. |
| 8,843,745 B2 | 9/2014 | Roberts, Jr. |
| 8,849,757 B2 | 9/2014 | Kruglick |
| 8,856,534 B2 | 10/2014 | Khosravi et al. |
| 8,856,936 B2 | 10/2014 | Datta Ray et al. |
| 8,862,507 B2 | 10/2014 | Sandhu et al. |
| 8,863,261 B2 | 10/2014 | Yang |
| 8,875,232 B2 | 10/2014 | Blom et al. |
| 8,887,047 B2 | 11/2014 | Digiantomasso et al. |
| 8,893,078 B2 | 11/2014 | Schaude et al. |
| 8,893,286 B1 | 11/2014 | Oliver |
| 8,893,297 B2 | 11/2014 | Eversoll et al. |
| 8,904,494 B2 | 12/2014 | Kindler et al. |
| 8,914,263 B2 | 12/2014 | Shimada et al. |
| 8,914,299 B2 | 12/2014 | Pesci-Anderson et al. |
| 8,914,342 B2 | 12/2014 | Kalaboukis et al. |
| 8,914,902 B2 | 12/2014 | Moritz et al. |
| 8,918,306 B2 | 12/2014 | Cashman et al. |
| 8,918,392 B1 | 12/2014 | Brooker et al. |
| 8,918,632 B1 | 12/2014 | Sartor |
| 8,924,388 B2 | 12/2014 | Elliot et al. |
| 8,930,364 B1 | 1/2015 | Brooker et al. |
| 8,930,896 B1 | 1/2015 | Wiggins |
| 8,930,897 B2 | 1/2015 | Nassar |
| 8,935,198 B1 | 1/2015 | Phillips et al. |
| 8,935,266 B2 | 1/2015 | Wu |
| 8,935,342 B2 | 1/2015 | Patel |
| 8,935,804 B1 | 1/2015 | Clark et al. |
| 8,938,221 B2 | 1/2015 | Brazier et al. |
| 8,943,076 B2 | 1/2015 | Stewart et al. |
| 8,943,548 B2 | 1/2015 | Drokov et al. |
| 8,943,602 B2 | 1/2015 | Roy et al. |
| 8,949,137 B2 | 2/2015 | Crapo et al. |
| 8,955,038 B2 | 2/2015 | Nicodemus et al. |
| 8,959,568 B2 | 2/2015 | Hudis et al. |
| 8,959,584 B2 | 2/2015 | Piliouras |
| 8,966,575 B2 | 2/2015 | McQuay et al. |
| 8,966,597 B1 | 2/2015 | Saylor et al. |
| 8,973,108 B1 | 3/2015 | Roth et al. |
| 8,977,234 B2 | 3/2015 | Chava |
| 8,977,643 B2 | 3/2015 | Schindlauer et al. |
| 8,978,158 B2 | 3/2015 | Rajkumar et al. |
| 8,983,972 B2 | 3/2015 | Kriebel et al. |
| 8,984,031 B1 | 3/2015 | Todd |
| 8,990,933 B1 | 3/2015 | Magdalin |
| 8,996,417 B1 | 3/2015 | Channakeshava |
| 8,996,480 B2 | 3/2015 | Agarwala et al. |
| 8,997,213 B2 | 3/2015 | Papakipos et al. |
| 9,001,673 B2 | 4/2015 | Birdsall et al. |
| 9,002,939 B2 | 4/2015 | Laden et al. |
| 9,003,295 B2 | 4/2015 | Baschy |
| 9,003,552 B2 | 4/2015 | Goodwin et al. |
| 9,009,851 B2 | 4/2015 | Droste et al. |
| 9,014,661 B2 | 4/2015 | Decharms |
| 9,015,796 B1 | 4/2015 | Fujioka |
| 9,021,469 B2 | 4/2015 | Hilerio et al. |
| 9,026,526 B1 | 5/2015 | Bau et al. |
| 9,030,987 B2 | 5/2015 | Bianchetti et al. |
| 9,032,067 B2 | 5/2015 | Prasad et al. |
| 9,043,217 B2 | 5/2015 | Cashman et al. |
| 9,043,480 B2 | 5/2015 | Barton et al. |
| 9,047,463 B2 | 6/2015 | Porras |
| 9,047,582 B2 | 6/2015 | Hutchinson et al. |
| 9,047,583 B2 | 6/2015 | Patton et al. |
| 9,047,639 B1 | 6/2015 | Quintiliani et al. |
| 9,049,244 B2 | 6/2015 | Prince et al. |
| 9,049,314 B2 | 6/2015 | Pugh et al. |
| 9,055,071 B1 | 6/2015 | Gates et al. |
| 9,058,590 B2 | 6/2015 | Criddle et al. |
| 9,064,033 B2 | 6/2015 | Jin et al. |
| 9,069,940 B2 | 6/2015 | Hars |
| 9,076,231 B1 | 7/2015 | Hill et al. |
| 9,077,736 B2 | 7/2015 | Werth et al. |
| 9,081,952 B2 | 7/2015 | Sagi et al. |
| 9,087,090 B1 | 7/2015 | Cormier et al. |
| 9,092,796 B2 | 7/2015 | Eversoll et al. |
| 9,094,434 B2 | 7/2015 | Williams et al. |
| 9,098,515 B2 | 8/2015 | Richter et al. |
| 9,100,337 B1 | 8/2015 | Battré et al. |
| 9,100,778 B2 | 8/2015 | Stogaitis et al. |
| 9,106,691 B1 | 8/2015 | Burger et al. |
| 9,106,710 B1 | 8/2015 | Feimster |
| 9,110,918 B1 | 8/2015 | Rajaa et al. |
| 9,111,105 B2 | 8/2015 | Barton et al. |
| 9,111,295 B2 | 8/2015 | Tietzen et al. |
| 9,123,330 B1 | 9/2015 | Sharifi et al. |
| 9,123,339 B1 | 9/2015 | Shaw et al. |
| 9,129,311 B2 | 9/2015 | Schoen et al. |
| 9,135,261 B2 | 9/2015 | Maunder et al. |
| 9,135,444 B2 | 9/2015 | Carter et al. |
| 9,141,823 B2 | 9/2015 | Dawson |
| 9,141,911 B2 | 9/2015 | Zhao et al. |
| 9,152,818 B1 | 10/2015 | Hathaway et al. |
| 9,152,820 B1 | 10/2015 | Pauley, Jr. et al. |
| 9,154,514 B1 | 10/2015 | Prakash |
| 9,154,556 B1 | 10/2015 | Dotan et al. |
| 9,158,655 B2 | 10/2015 | Wadhwani et al. |
| 9,165,036 B2 | 10/2015 | Mehra |
| 9,170,996 B2 | 10/2015 | Lovric et al. |
| 9,172,706 B2 | 10/2015 | Krishnamurthy et al. |
| 9,177,293 B1 | 11/2015 | Gagnon et al. |
| 9,178,901 B2 | 11/2015 | Xue et al. |
| 9,183,100 B2 | 11/2015 | Gventer et al. |
| 9,189,642 B2 | 11/2015 | Perlman |
| 9,201,572 B2 | 12/2015 | Lyon et al. |
| 9,201,770 B1 | 12/2015 | Duerk |
| 9,202,026 B1 | 12/2015 | Reeves |
| 9,202,085 B2 | 12/2015 | Mawdsley et al. |
| 9,215,076 B1 | 12/2015 | Roth et al. |
| 9,215,252 B2 | 12/2015 | Smith et al. |
| 9,218,596 B2 | 12/2015 | Ronca et al. |
| 9,224,009 B1 | 12/2015 | Liu et al. |
| 9,230,036 B2 | 1/2016 | Davis |
| 9,231,935 B1 | 1/2016 | Bridge et al. |
| 9,232,040 B2 | 1/2016 | Barash et al. |
| 9,235,476 B2 | 1/2016 | Mchugh et al. |
| 9,240,987 B2 | 1/2016 | Barrett-Bowen et al. |
| 9,241,259 B2 | 1/2016 | Daniela et al. |
| 9,245,126 B2 | 1/2016 | Christodorescu et al. |
| 9,245,266 B2 | 1/2016 | Hardt |
| 9,253,609 B2 | 2/2016 | Hosier, Jr. |
| 9,258,116 B2 | 2/2016 | Moskowitz et al. |
| 9,264,443 B2 | 2/2016 | Weisman |
| 9,274,858 B2 | 3/2016 | Milliron et al. |
| 9,280,581 B1 | 3/2016 | Grimes et al. |
| 9,286,149 B2 | 3/2016 | Sampson et al. |
| 9,286,282 B2 | 3/2016 | Ling, III et al. |
| 9,288,118 B1 | 3/2016 | Pattan |
| 9,288,556 B2 | 3/2016 | Kim et al. |
| 9,294,498 B1 | 3/2016 | Yampolskiy et al. |
| 9,299,050 B2 | 3/2016 | Stiffler et al. |
| 9,306,939 B2 | 4/2016 | Chan et al. |
| 9,317,697 B2 | 4/2016 | Maier et al. |
| 9,317,715 B2 | 4/2016 | Schuette et al. |
| 9,325,731 B2 | 4/2016 | Mcgeehan |
| 9,336,184 B2 | 5/2016 | Mital et al. |
| 9,336,220 B2 | 5/2016 | Li et al. |
| 9,336,324 B2 | 5/2016 | Lomme et al. |
| 9,336,332 B2 | 5/2016 | Davis et al. |
| 9,336,400 B2 | 5/2016 | Milman et al. |
| 9,338,188 B1 | 5/2016 | Ahn |
| 9,342,706 B2 | 5/2016 | Chawla et al. |

(56) References Cited

U.S. PATENT DOCUMENTS

| | | |
|---|---|---|
| 9,344,297 B2 | 5/2016 | Shah et al. |
| 9,344,424 B2 | 5/2016 | Tenenboym et al. |
| 9,344,484 B2 | 5/2016 | Ferris |
| 9,348,802 B2 | 5/2016 | Massand |
| 9,348,862 B2 | 5/2016 | Kawecki, III |
| 9,348,929 B2 | 5/2016 | Eberlein |
| 9,349,016 B1 | 5/2016 | Brisebois et al. |
| 9,350,718 B2 | 5/2016 | Sondhi et al. |
| 9,355,157 B2 | 5/2016 | Mohammed et al. |
| 9,356,961 B1 | 5/2016 | Todd et al. |
| 9,361,446 B1 | 6/2016 | Demirjian et al. |
| 9,369,488 B2 | 6/2016 | Woods et al. |
| 9,372,869 B2 | 6/2016 | Joseph et al. |
| 9,374,693 B1 | 6/2016 | Olincy et al. |
| 9,384,199 B2 | 7/2016 | Thereska et al. |
| 9,384,357 B2 | 7/2016 | Patil et al. |
| 9,386,078 B2 | 7/2016 | Reno et al. |
| 9,386,104 B2 | 7/2016 | Adams et al. |
| 9,395,959 B2 | 7/2016 | Hatfield et al. |
| 9,396,332 B2 | 7/2016 | Abrams et al. |
| 9,401,900 B2 | 7/2016 | Levasseur et al. |
| 9,411,967 B2 | 8/2016 | Parecki et al. |
| 9,411,982 B1 | 8/2016 | Dippenaar et al. |
| 9,417,859 B2 | 8/2016 | Gounares et al. |
| 9,418,221 B2 | 8/2016 | Turgeman |
| 9,424,021 B2 | 8/2016 | Zamir |
| 9,424,414 B1 | 8/2016 | Demirjian et al. |
| 9,426,177 B2 | 8/2016 | Wang et al. |
| 9,450,940 B2 | 9/2016 | Belov et al. |
| 9,460,136 B1 | 10/2016 | Todd et al. |
| 9,460,171 B2 | 10/2016 | Marrelli et al. |
| 9,460,307 B2 | 10/2016 | Breslau et al. |
| 9,461,876 B2 | 10/2016 | Van Dusen et al. |
| 9,462,009 B1 | 10/2016 | Kolman et al. |
| 9,465,702 B2 | 10/2016 | Gventer et al. |
| 9,465,800 B2 | 10/2016 | Lacey |
| 9,473,446 B2 | 10/2016 | Vijay et al. |
| 9,473,505 B1 | 10/2016 | Asano et al. |
| 9,473,535 B2 | 10/2016 | Sartor |
| 9,477,523 B1 | 10/2016 | Warman et al. |
| 9,477,660 B2 | 10/2016 | Scott et al. |
| 9,477,685 B1 | 10/2016 | Leung et al. |
| 9,477,942 B2 | 10/2016 | Adachi et al. |
| 9,483,659 B2 | 11/2016 | Bao et al. |
| 9,489,366 B2 | 11/2016 | Scott et al. |
| 9,495,547 B1 | 11/2016 | Schepis et al. |
| 9,501,523 B2 | 11/2016 | Hyatt et al. |
| 9,507,960 B2 | 11/2016 | Bell et al. |
| 9,509,674 B1 | 11/2016 | Nasserbakht et al. |
| 9,509,702 B2 | 11/2016 | Grigg et al. |
| 9,514,231 B2 | 12/2016 | Eden |
| 9,516,012 B2 | 12/2016 | Chochois et al. |
| 9,521,166 B2 | 12/2016 | Wilson |
| 9,524,500 B2 | 12/2016 | Dave et al. |
| 9,529,989 B2 | 12/2016 | Kling et al. |
| 9,536,108 B2 | 1/2017 | Powell et al. |
| 9,537,546 B2 | 1/2017 | Cordeiro et al. |
| 9,542,568 B2 | 1/2017 | Francis et al. |
| 9,549,047 B1 | 1/2017 | Fredinburg et al. |
| 9,552,395 B2 | 1/2017 | Bayer et al. |
| 9,552,470 B2 | 1/2017 | Turgeman et al. |
| 9,553,918 B1 | 1/2017 | Manion et al. |
| 9,558,497 B2 | 1/2017 | Carvalho |
| 9,569,752 B2 | 2/2017 | Deering et al. |
| 9,571,506 B2 | 2/2017 | Boss et al. |
| 9,571,509 B1 | 2/2017 | Satish et al. |
| 9,571,526 B2 | 2/2017 | Sartor |
| 9,571,559 B2 | 2/2017 | Raleigh et al. |
| 9,571,991 B1 | 2/2017 | Brizendine et al. |
| 9,576,289 B2 | 2/2017 | Henderson et al. |
| 9,578,060 B1 | 2/2017 | Brisebois et al. |
| 9,578,173 B2 | 2/2017 | Sanghavi et al. |
| 9,582,681 B2 | 2/2017 | Mishra |
| 9,584,964 B2 | 2/2017 | Pelkey |
| 9,589,110 B2 | 3/2017 | Carey et al. |
| 9,600,181 B2 | 3/2017 | Patel et al. |
| 9,602,529 B2 | 3/2017 | Jones et al. |
| 9,606,971 B2 | 3/2017 | Seolas et al. |
| 9,607,041 B2 | 3/2017 | Himmelstein |
| 9,619,652 B2 | 4/2017 | Slater |
| 9,619,661 B1 | 4/2017 | Finkelstein |
| 9,621,357 B2 | 4/2017 | Williams et al. |
| 9,621,566 B2 | 4/2017 | Gupta et al. |
| 9,626,124 B2 | 4/2017 | Lipinski et al. |
| 9,626,680 B1 | 4/2017 | Ryan et al. |
| 9,629,064 B2 | 4/2017 | Graves et al. |
| 9,642,008 B2 | 5/2017 | Wyatt et al. |
| 9,646,095 B1 | 5/2017 | Gottlieb et al. |
| 9,647,949 B2 | 5/2017 | Varki et al. |
| 9,648,036 B2 | 5/2017 | Seiver et al. |
| 9,652,314 B2 | 5/2017 | Mahiddini |
| 9,654,506 B2 | 5/2017 | Barrett |
| 9,654,541 B1 | 5/2017 | Kapczynski et al. |
| 9,665,722 B2 | 5/2017 | Nagasundaram et al. |
| 9,665,733 B1 | 5/2017 | Sills et al. |
| 9,665,883 B2 | 5/2017 | Roullier et al. |
| 9,672,053 B2 | 6/2017 | Tang et al. |
| 9,672,355 B2 | 6/2017 | Titonis et al. |
| 9,678,794 B1 | 6/2017 | Barrett et al. |
| 9,691,090 B1 | 6/2017 | Barday |
| 9,697,368 B2 | 7/2017 | Dharawat |
| 9,699,209 B2 | 7/2017 | Ng et al. |
| 9,703,549 B2 | 7/2017 | Dufresne |
| 9,704,103 B2 | 7/2017 | Suskind et al. |
| 9,705,840 B2 | 7/2017 | Pujare et al. |
| 9,705,880 B2 | 7/2017 | Siris |
| 9,721,078 B2 | 8/2017 | Cornick et al. |
| 9,721,108 B2 | 8/2017 | Krishnamurthy et al. |
| 9,727,751 B2 | 8/2017 | Oliver et al. |
| 9,729,583 B1 | 8/2017 | Barday |
| 9,734,148 B2 | 8/2017 | Bendersky et al. |
| 9,734,255 B2 | 8/2017 | Jiang |
| 9,736,004 B2 | 8/2017 | Jung et al. |
| 9,740,985 B2 | 8/2017 | Byron et al. |
| 9,740,987 B2 | 8/2017 | Dolan |
| 9,749,408 B2 | 8/2017 | Subramani et al. |
| 9,753,703 B2 | 9/2017 | Jemiolo |
| 9,754,091 B2 | 9/2017 | Kode et al. |
| 9,756,059 B2 | 9/2017 | Demirjian et al. |
| 9,760,620 B2 | 9/2017 | Nachnani et al. |
| 9,760,635 B2 | 9/2017 | Bliss et al. |
| 9,760,697 B1 | 9/2017 | Walker |
| 9,760,849 B2 | 9/2017 | Vinnakota et al. |
| 9,762,553 B2 | 9/2017 | Ford et al. |
| 9,767,202 B2 | 9/2017 | Darby et al. |
| 9,767,309 B1 | 9/2017 | Patel et al. |
| 9,769,124 B2 | 9/2017 | Yan |
| 9,773,269 B1 | 9/2017 | Lazarus |
| 9,785,795 B2 | 10/2017 | Grondin et al. |
| 9,787,671 B1 | 10/2017 | Bogrett |
| 9,798,749 B2 | 10/2017 | Saner |
| 9,798,826 B2 | 10/2017 | Wilson et al. |
| 9,798,896 B2 | 10/2017 | Jakobsson |
| 9,800,605 B2 | 10/2017 | Baikalov et al. |
| 9,800,606 B1 | 10/2017 | Yumer |
| 9,804,649 B2 | 10/2017 | Cohen et al. |
| 9,804,928 B2 | 10/2017 | Davis et al. |
| 9,805,381 B2 | 10/2017 | Frank et al. |
| 9,811,532 B2 | 11/2017 | Parkison et al. |
| 9,817,850 B2 | 11/2017 | Dubbels et al. |
| 9,817,978 B2 | 11/2017 | Marsh et al. |
| 9,819,684 B2 | 11/2017 | Cernoch et al. |
| 9,825,928 B2 | 11/2017 | Lelcuk et al. |
| 9,830,563 B2 | 11/2017 | Paknad |
| 9,832,633 B2 | 11/2017 | Gerber, Jr. et al. |
| 9,836,598 B2 | 12/2017 | Iyer et al. |
| 9,838,407 B1 | 12/2017 | Oprea et al. |
| 9,838,839 B2 | 12/2017 | Vudali et al. |
| 9,841,969 B2 | 12/2017 | Seibert, Jr. et al. |
| 9,842,042 B2 | 12/2017 | Chhatwal et al. |
| 9,842,349 B2 | 12/2017 | Sawczuk et al. |
| 9,848,005 B2 | 12/2017 | Ardeli et al. |
| 9,848,061 B1 | 12/2017 | Jain et al. |
| 9,852,150 B2 | 12/2017 | Sharpe et al. |

(56) References Cited

U.S. PATENT DOCUMENTS

| | | |
|---|---|---|
| 9,853,959 B1 | 12/2017 | Kapczynski et al. |
| 9,860,226 B2 | 1/2018 | Thormaehlen |
| 9,864,735 B1 | 1/2018 | Lamprecht |
| 9,876,825 B2 | 1/2018 | Amar et al. |
| 9,877,138 B1 | 1/2018 | Franklin |
| 9,880,157 B2 | 1/2018 | Levak et al. |
| 9,882,935 B2 | 1/2018 | Barday |
| 9,887,965 B2 | 2/2018 | Kay et al. |
| 9,888,377 B1 | 2/2018 | Mccorkendale et al. |
| 9,892,441 B2 | 2/2018 | Barday |
| 9,892,442 B2 | 2/2018 | Barday |
| 9,892,443 B2 | 2/2018 | Barday |
| 9,892,444 B2 | 2/2018 | Barday |
| 9,894,076 B2 | 2/2018 | Li et al. |
| 9,898,613 B1 | 2/2018 | Swerdlow et al. |
| 9,898,739 B2 | 2/2018 | Monastyrsky et al. |
| 9,898,769 B2 | 2/2018 | Barday |
| 9,912,625 B2 | 3/2018 | Mutha et al. |
| 9,912,677 B2 | 3/2018 | Chien |
| 9,912,810 B2 | 3/2018 | Segre et al. |
| 9,916,703 B2 | 3/2018 | Levinson et al. |
| 9,922,124 B2 | 3/2018 | Rathod |
| 9,923,927 B1 | 3/2018 | Mcclintock et al. |
| 9,928,379 B1 | 3/2018 | Hoffer |
| 9,934,493 B2 | 4/2018 | Castinado et al. |
| 9,934,544 B1 | 4/2018 | Whitfield et al. |
| 9,936,127 B2 | 4/2018 | Todasco |
| 9,942,214 B1 | 4/2018 | Burciu et al. |
| 9,942,244 B2 | 4/2018 | Lahoz et al. |
| 9,942,276 B2 | 4/2018 | Sartor |
| 9,946,897 B2 | 4/2018 | Lovin |
| 9,948,652 B2 | 4/2018 | Yu et al. |
| 9,948,663 B1 | 4/2018 | Wang et al. |
| 9,953,189 B2 | 4/2018 | Cook et al. |
| 9,954,879 B1 | 4/2018 | Sadaghiani et al. |
| 9,954,883 B2 | 4/2018 | Ahuja et al. |
| 9,959,551 B1 | 5/2018 | Schermerhorn et al. |
| 9,959,582 B2 | 5/2018 | Sukman et al. |
| 9,961,070 B2 | 5/2018 | Tang |
| 9,973,518 B2 | 5/2018 | Lee et al. |
| 9,973,585 B2 | 5/2018 | Ruback et al. |
| 9,977,904 B2 | 5/2018 | Khan et al. |
| 9,977,920 B2 | 5/2018 | Danielson et al. |
| 9,983,936 B2 | 5/2018 | Dornemann et al. |
| 9,984,252 B2 | 5/2018 | Pollard |
| 9,990,499 B2 | 6/2018 | Chan et al. |
| 9,992,213 B2 | 6/2018 | Sinnema |
| 10,001,975 B2 | 6/2018 | Bharthulwar |
| 10,002,064 B2 | 6/2018 | Muske |
| 10,007,895 B2 | 6/2018 | Vanasco |
| 10,013,577 B1 | 7/2018 | Beaumont et al. |
| 10,015,164 B2 | 7/2018 | Hamburg et al. |
| 10,019,339 B2 | 7/2018 | Von Hanxleden et al. |
| 10,019,588 B2 | 7/2018 | Garcia et al. |
| 10,019,591 B1 | 7/2018 | Beguin |
| 10,019,741 B2 | 7/2018 | Hesselink |
| 10,021,143 B2 | 7/2018 | Cabrera et al. |
| 10,025,804 B2 | 7/2018 | Vranyes et al. |
| 10,025,836 B2 | 7/2018 | Batchu et al. |
| 10,028,226 B2 | 7/2018 | Ayyagari et al. |
| 10,032,172 B2 | 7/2018 | Barday |
| 10,044,761 B2 | 8/2018 | Ducatel et al. |
| 10,055,426 B2 | 8/2018 | Arasan et al. |
| 10,055,869 B2 | 8/2018 | Borrelli et al. |
| 10,061,847 B2 | 8/2018 | Mohammed et al. |
| 10,069,858 B2 | 9/2018 | Robinson et al. |
| 10,069,914 B1 | 9/2018 | Smith |
| 10,073,924 B2 | 9/2018 | Karp et al. |
| 10,075,437 B1 | 9/2018 | Costigan et al. |
| 10,075,451 B1 | 9/2018 | Hall et al. |
| 10,084,817 B2 | 9/2018 | Saher et al. |
| 10,091,214 B2 | 10/2018 | Godlewski et al. |
| 10,091,312 B1 | 10/2018 | Khanwalkar et al. |
| 10,097,551 B2 | 10/2018 | Chan et al. |
| 10,102,533 B2 | 10/2018 | Barday |
| 10,108,409 B2 | 10/2018 | Pirzadeh et al. |
| 10,122,663 B2 | 11/2018 | Hu et al. |
| 10,122,760 B2 | 11/2018 | Terrill et al. |
| 10,127,403 B2 | 11/2018 | Kong et al. |
| 10,129,211 B2 | 11/2018 | Heath |
| 10,140,666 B1 | 11/2018 | Wang et al. |
| 10,142,113 B2 | 11/2018 | Zaidi et al. |
| 10,152,560 B2 | 12/2018 | Potiagalov et al. |
| 10,158,676 B2 | 12/2018 | Barday |
| 10,165,011 B2 | 12/2018 | Barday |
| 10,169,762 B2 | 1/2019 | Ogawa |
| 10,176,503 B2 | 1/2019 | Barday et al. |
| 10,181,043 B1 | 1/2019 | Pauley, Jr. et al. |
| 10,181,051 B2 | 1/2019 | Barday et al. |
| 10,187,363 B2 | 1/2019 | Smirnoff et al. |
| 10,187,394 B2 | 1/2019 | Bar et al. |
| 10,188,950 B2 | 1/2019 | Biswas et al. |
| 10,204,154 B2 | 2/2019 | Barday et al. |
| 10,205,994 B2 | 2/2019 | Splaine et al. |
| 10,212,134 B2 | 2/2019 | Rai |
| 10,212,175 B2 | 2/2019 | Seul et al. |
| 10,223,533 B2 | 3/2019 | Dawson |
| 10,230,571 B2 | 3/2019 | Rangasamy et al. |
| 10,242,228 B2 | 3/2019 | Barday et al. |
| 10,250,594 B2 | 4/2019 | Chathoth et al. |
| 10,255,602 B2 | 4/2019 | Wang |
| 10,257,127 B2 | 4/2019 | Dotan-Cohen et al. |
| 10,257,181 B1 | 4/2019 | Sherif et al. |
| 10,268,838 B2 | 4/2019 | Yadgiri et al. |
| 10,275,221 B2 | 4/2019 | Thattai et al. |
| 10,275,614 B2 | 4/2019 | Barday et al. |
| 10,282,370 B1 | 5/2019 | Barday et al. |
| 10,282,559 B2 | 5/2019 | Barday et al. |
| 10,284,604 B2 | 5/2019 | Barday et al. |
| 10,289,584 B2 | 5/2019 | Chiba |
| 10,289,857 B1 | 5/2019 | Brinskelle |
| 10,289,866 B2 | 5/2019 | Barday et al. |
| 10,289,867 B2 | 5/2019 | Barday et al. |
| 10,289,870 B2 | 5/2019 | Barday et al. |
| 10,291,731 B2 | 5/2019 | Huang |
| 10,296,504 B2 | 5/2019 | Hock et al. |
| 10,304,442 B1 | 5/2019 | Rudden et al. |
| 10,310,723 B2 | 6/2019 | Rathod |
| 10,311,042 B1 | 6/2019 | Kumar |
| 10,311,475 B2 | 6/2019 | Yuasa |
| 10,311,492 B2 | 6/2019 | Gelfenbeyn et al. |
| 10,318,761 B2 | 6/2019 | Barday et al. |
| 10,320,940 B1 | 6/2019 | Brennan et al. |
| 10,324,960 B1 | 6/2019 | Skvortsov et al. |
| 10,326,768 B2 | 6/2019 | Verweyst et al. |
| 10,326,798 B2 | 6/2019 | Lambert |
| 10,326,841 B2 | 6/2019 | Bradley et al. |
| 10,327,100 B1 | 6/2019 | Davis et al. |
| 10,331,689 B2 | 6/2019 | Sorrentino et al. |
| 10,331,904 B2 | 6/2019 | Sher-Jan et al. |
| 10,333,975 B2 | 6/2019 | Soman et al. |
| 10,339,470 B1 | 7/2019 | Dutta et al. |
| 10,346,186 B2 | 7/2019 | Kalyanpur |
| 10,346,635 B2 | 7/2019 | Kumar et al. |
| 10,346,637 B2 | 7/2019 | Barday et al. |
| 10,346,638 B2 | 7/2019 | Barday et al. |
| 10,346,849 B2 | 7/2019 | Ionescu et al. |
| 10,348,726 B2 | 7/2019 | Caluwaert |
| 10,348,775 B2 | 7/2019 | Barday |
| 10,353,673 B2 | 7/2019 | Barday et al. |
| 10,361,857 B2 | 7/2019 | Woo |
| 10,366,241 B2 | 7/2019 | Sartor |
| 10,373,119 B2 | 8/2019 | Driscoll et al. |
| 10,373,409 B2 | 8/2019 | White et al. |
| 10,375,115 B2 | 8/2019 | Mallya |
| 10,387,559 B1 | 8/2019 | Wendt et al. |
| 10,387,577 B2 | 8/2019 | Hill et al. |
| 10,387,657 B2 | 8/2019 | Belfiore, Jr. et al. |
| 10,387,952 B1 | 8/2019 | Sandhu et al. |
| 10,395,201 B2 | 8/2019 | Vescio |
| 10,402,545 B2 | 9/2019 | Gorfein et al. |
| 10,404,729 B2 | 9/2019 | Turgeman |
| 10,417,401 B2 | 9/2019 | Votaw et al. |
| 10,417,445 B2 | 9/2019 | Wouhaybi et al. |

(56) References Cited

U.S. PATENT DOCUMENTS

| | | |
|---|---|---|
| 10,417,621 B2 | 9/2019 | Cassel et al. |
| 10,419,476 B2 | 9/2019 | Parekh |
| 10,423,985 B1 | 9/2019 | Dutta et al. |
| 10,425,492 B2 | 9/2019 | Comstock et al. |
| 10,430,608 B2 | 10/2019 | Peri et al. |
| 10,435,350 B2 | 10/2019 | Ito et al. |
| 10,437,412 B2 | 10/2019 | Barday et al. |
| 10,437,860 B2 | 10/2019 | Barday et al. |
| 10,438,016 B2 | 10/2019 | Barday et al. |
| 10,438,273 B2 | 10/2019 | Burns et al. |
| 10,440,062 B2 | 10/2019 | Barday et al. |
| 10,445,508 B2 | 10/2019 | Sher-Jan et al. |
| 10,445,526 B2 | 10/2019 | Barday et al. |
| 10,452,864 B2 | 10/2019 | Barday et al. |
| 10,452,866 B2 | 10/2019 | Barday et al. |
| 10,453,076 B2 | 10/2019 | Parekh et al. |
| 10,453,092 B1 | 10/2019 | Wang et al. |
| 10,454,934 B2 | 10/2019 | Parimi et al. |
| 10,481,763 B2 | 11/2019 | Bartkiewicz et al. |
| 10,489,454 B1 | 11/2019 | Chen |
| 10,503,926 B2 | 12/2019 | Barday et al. |
| 10,510,031 B2 | 12/2019 | Barday et al. |
| 10,521,623 B2 | 12/2019 | Rodriguez et al. |
| 10,534,851 B1 | 1/2020 | Chan et al. |
| 10,535,081 B2 | 1/2020 | Ferreira et al. |
| 10,536,475 B1 | 1/2020 | Mccorkle, Jr. et al. |
| 10,536,478 B2 | 1/2020 | Kirti et al. |
| 10,540,212 B2 | 1/2020 | Feng et al. |
| 10,541,938 B1 | 1/2020 | Timmerman et al. |
| 10,546,135 B1 | 1/2020 | Kassoumeh et al. |
| 10,552,462 B1 | 2/2020 | Hart |
| 10,558,809 B1 | 2/2020 | Joyce et al. |
| 10,558,821 B2 | 2/2020 | Barday et al. |
| 10,564,815 B2 | 2/2020 | Soon-Shiong |
| 10,564,935 B2 | 2/2020 | Barday et al. |
| 10,564,936 B2 | 2/2020 | Barday et al. |
| 10,565,161 B2 | 2/2020 | Barday et al. |
| 10,565,236 B1 | 2/2020 | Barday et al. |
| 10,567,439 B2 | 2/2020 | Barday |
| 10,567,517 B2 | 2/2020 | Weinig et al. |
| 10,572,684 B2 | 2/2020 | Lafever et al. |
| 10,572,686 B2 | 2/2020 | Barday et al. |
| 10,572,778 B1 * | 2/2020 | Robinson ............ G06F 18/2431 |
| 10,574,705 B2 | 2/2020 | Barday et al. |
| 10,581,825 B2 | 3/2020 | Poschel et al. |
| 10,592,648 B2 | 3/2020 | Barday et al. |
| 10,592,692 B2 | 3/2020 | Brannon et al. |
| 10,599,456 B2 | 3/2020 | Lissack |
| 10,606,916 B2 | 3/2020 | Brannon et al. |
| 10,613,971 B1 | 4/2020 | Vasikarla |
| 10,614,365 B2 | 4/2020 | Sathish et al. |
| 10,628,553 B1 | 4/2020 | Murrish et al. |
| 10,645,102 B2 | 5/2020 | Hamdi |
| 10,645,548 B2 | 5/2020 | Reynolds et al. |
| 10,649,630 B1 | 5/2020 | Vora et al. |
| 10,650,408 B1 | 5/2020 | Andersen et al. |
| 10,657,469 B2 | 5/2020 | Bade et al. |
| 10,657,504 B1 | 5/2020 | Zimmerman et al. |
| 10,659,566 B1 | 5/2020 | Luah et al. |
| 10,671,749 B2 | 6/2020 | Felice-Steele et al. |
| 10,671,760 B2 | 6/2020 | Esmailzadeh et al. |
| 10,678,945 B2 | 6/2020 | Barday et al. |
| 10,685,140 B2 | 6/2020 | Barday et al. |
| 10,706,176 B2 | 7/2020 | Brannon et al. |
| 10,706,226 B2 | 7/2020 | Byun et al. |
| 10,708,305 B2 | 7/2020 | Barday et al. |
| 10,713,387 B2 | 7/2020 | Brannon et al. |
| 10,726,145 B2 | 7/2020 | Duminy et al. |
| 10,726,153 B2 | 7/2020 | Nerurkar et al. |
| 10,726,158 B2 | 7/2020 | Brannon et al. |
| 10,732,865 B2 | 8/2020 | Jain et al. |
| 10,735,388 B2 | 8/2020 | Rose et al. |
| 10,740,487 B2 | 8/2020 | Barday et al. |
| 10,747,893 B2 | 8/2020 | Kiriyama et al. |
| 10,747,897 B2 | 8/2020 | Cook |
| 10,749,870 B2 | 8/2020 | Brouillette et al. |
| 10,762,213 B2 | 9/2020 | Rudek et al. |
| 10,762,230 B2 | 9/2020 | Ancin et al. |
| 10,762,236 B2 | 9/2020 | Brannon et al. |
| 10,769,302 B2 | 9/2020 | Barday et al. |
| 10,769,303 B2 | 9/2020 | Brannon et al. |
| 10,776,510 B2 | 9/2020 | Antonelli et al. |
| 10,776,518 B2 | 9/2020 | Barday et al. |
| 10,778,792 B1 | 9/2020 | Handy Bosma et al. |
| 10,783,256 B2 | 9/2020 | Brannon et al. |
| 10,785,173 B2 | 9/2020 | Willett et al. |
| 10,785,299 B2 | 9/2020 | Gupta et al. |
| 10,791,150 B2 | 9/2020 | Barday et al. |
| 10,795,527 B1 | 10/2020 | Legge et al. |
| 10,796,020 B2 | 10/2020 | Barday et al. |
| 10,796,260 B2 | 10/2020 | Brannon et al. |
| 10,798,133 B2 | 10/2020 | Barday et al. |
| 10,803,196 B2 | 10/2020 | Bodegas Martinez et al. |
| 10,805,331 B2 | 10/2020 | Boyer et al. |
| 10,831,831 B2 | 11/2020 | Greene |
| 10,834,590 B2 | 11/2020 | Turgeman et al. |
| 10,839,100 B2 | 11/2020 | Hollinger et al. |
| 10,846,433 B2 | 11/2020 | Brannon et al. |
| 10,853,356 B1 | 12/2020 | Mcpherson et al. |
| 10,853,501 B2 | 12/2020 | Brannon |
| 10,860,721 B1 | 12/2020 | Gentile |
| 10,860,742 B2 | 12/2020 | Joseph et al. |
| 10,860,979 B2 | 12/2020 | Geffen et al. |
| 10,878,127 B2 | 12/2020 | Brannon et al. |
| 10,885,485 B2 | 1/2021 | Brannon et al. |
| 10,891,393 B2 | 1/2021 | Currier et al. |
| 10,893,074 B2 | 1/2021 | Sartor |
| 10,896,394 B2 | 1/2021 | Brannon et al. |
| 10,902,490 B2 | 1/2021 | He et al. |
| 10,909,488 B2 | 2/2021 | Hecht et al. |
| 10,924,514 B1 | 2/2021 | Altman et al. |
| 10,929,557 B2 | 2/2021 | Chavez |
| 10,949,555 B2 | 3/2021 | Rattan et al. |
| 10,949,565 B2 | 3/2021 | Barday et al. |
| 10,956,213 B1 | 3/2021 | Chambers et al. |
| 10,957,326 B2 | 3/2021 | Bhaya et al. |
| 10,963,571 B2 | 3/2021 | Bar Joseph et al. |
| 10,963,572 B2 | 3/2021 | Belfiore, Jr. et al. |
| 10,965,547 B1 | 3/2021 | Esposito et al. |
| 10,970,418 B2 | 4/2021 | Durvasula et al. |
| 10,972,509 B2 | 4/2021 | Barday et al. |
| 10,976,950 B1 | 4/2021 | Trezzo et al. |
| 10,983,963 B1 | 4/2021 | Venkatasubramanian et al. |
| 10,984,458 B1 | 4/2021 | Gutierrez |
| 10,997,318 B2 | 5/2021 | Barday et al. |
| 11,003,748 B2 | 5/2021 | Oliker et al. |
| 11,012,475 B2 | 5/2021 | Patnala et al. |
| 11,023,528 B1 | 6/2021 | Lee et al. |
| 11,023,921 B2 | 6/2021 | Wang et al. |
| 11,037,168 B1 | 6/2021 | Lee et al. |
| 11,057,356 B2 | 7/2021 | Malhotra et al. |
| 11,057,427 B2 | 7/2021 | Wright et al. |
| 11,062,051 B2 | 7/2021 | Barday et al. |
| 11,068,318 B2 | 7/2021 | Kuesel et al. |
| 11,068,584 B2 | 7/2021 | Burriesci et al. |
| 11,068,618 B2 | 7/2021 | Brannon et al. |
| 11,068,797 B2 | 7/2021 | Bhide et al. |
| 11,068,847 B2 | 7/2021 | Boutros et al. |
| 11,093,950 B2 | 8/2021 | Hersh et al. |
| 11,138,299 B2 | 10/2021 | Brannon et al. |
| 11,144,622 B2 | 10/2021 | Brannon et al. |
| 11,144,678 B2 | 10/2021 | Dondini et al. |
| 11,144,862 B1 | 10/2021 | Jackson et al. |
| 11,195,134 B2 | 12/2021 | Brannon et al. |
| 11,201,929 B2 | 12/2021 | Dudmesh et al. |
| 11,210,420 B2 | 12/2021 | Brannon et al. |
| 11,238,390 B2 | 2/2022 | Brannon et al. |
| 11,240,273 B2 | 2/2022 | Barday et al. |
| 11,245,951 B2 | 2/2022 | Lim et al. |
| 11,246,520 B2 | 2/2022 | Clifford et al. |
| 11,252,159 B2 | 2/2022 | Kannan et al. |
| 11,256,777 B2 | 2/2022 | Brannon et al. |
| 11,263,262 B2 | 3/2022 | Chen |
| 11,327,996 B2 | 5/2022 | Reynolds et al. |

(56) References Cited

U.S. PATENT DOCUMENTS

| | | | |
|---|---|---|---|
| 11,562,078 B2 * | 1/2023 | Sabourin | G06F 9/547 |
| 11,682,399 B2 * | 6/2023 | Paulraj | H04L 67/55 |
| | | | 704/231 |
| 2002/0004736 A1 | 1/2002 | Roundtree et al. | |
| 2002/0049907 A1 | 4/2002 | Woods et al. | |
| 2002/0055932 A1 | 5/2002 | Wheeler et al. | |
| 2002/0077941 A1 | 6/2002 | Halligan et al. | |
| 2002/0103854 A1 | 8/2002 | Okita | |
| 2002/0129216 A1 | 9/2002 | Collins | |
| 2002/0161594 A1 | 10/2002 | Bryan et al. | |
| 2002/0161733 A1 | 10/2002 | Grainger | |
| 2003/0041250 A1 | 2/2003 | Proudler | |
| 2003/0065641 A1 | 4/2003 | Chaloux | |
| 2003/0093680 A1 | 5/2003 | Astley et al. | |
| 2003/0097451 A1 | 5/2003 | Bjorksten et al. | |
| 2003/0097661 A1 | 5/2003 | Li et al. | |
| 2003/0115142 A1 | 6/2003 | Brickell et al. | |
| 2003/0130893 A1 | 7/2003 | Farmer | |
| 2003/0131001 A1 | 7/2003 | Matsuo | |
| 2003/0131093 A1 | 7/2003 | Aschen et al. | |
| 2003/0140150 A1 | 7/2003 | Kemp et al. | |
| 2003/0167216 A1 | 9/2003 | Brown et al. | |
| 2003/0212604 A1 | 11/2003 | Cullen, III | |
| 2004/0002818 A1 | 1/2004 | Kulp et al. | |
| 2004/0025053 A1 | 2/2004 | Hayward | |
| 2004/0088235 A1 | 5/2004 | Ziekle et al. | |
| 2004/0098366 A1 | 5/2004 | Sinclair et al. | |
| 2004/0098493 A1 | 5/2004 | Rees | |
| 2004/0111359 A1 | 6/2004 | Hudock | |
| 2004/0186912 A1 | 9/2004 | Harlow et al. | |
| 2004/0193907 A1 | 9/2004 | Patanella | |
| 2005/0022198 A1 | 1/2005 | Olapurath et al. | |
| 2005/0033616 A1 | 2/2005 | Vavul et al. | |
| 2005/0076294 A1 | 4/2005 | DeHamer et al. | |
| 2005/0114343 A1 | 5/2005 | Wesinger et al. | |
| 2005/0144066 A1 | 6/2005 | Cope et al. | |
| 2005/0197884 A1 | 9/2005 | Mullen, Jr. | |
| 2005/0198177 A1 | 9/2005 | Black | |
| 2005/0198646 A1 | 9/2005 | Kortela | |
| 2005/0246292 A1 | 11/2005 | Sarcanin | |
| 2005/0278538 A1 | 12/2005 | Fowler | |
| 2006/0031078 A1 | 2/2006 | Pizzinger et al. | |
| 2006/0035204 A1 | 2/2006 | LaMarche et al. | |
| 2006/0075122 A1 | 4/2006 | Lindskog et al. | |
| 2006/0149730 A1 | 7/2006 | Curtis | |
| 2006/0156052 A1 | 7/2006 | Bodnar et al. | |
| 2006/0190280 A1 | 8/2006 | Hoebel et al. | |
| 2006/0206375 A1 | 9/2006 | Scott et al. | |
| 2006/0224422 A1 | 10/2006 | Cohen | |
| 2006/0253597 A1 | 11/2006 | Mujica | |
| 2006/0259416 A1 | 11/2006 | Johnson | |
| 2007/0011058 A1 | 1/2007 | Dev | |
| 2007/0027715 A1 | 2/2007 | Gropper et al. | |
| 2007/0061125 A1 | 3/2007 | Bhatt et al. | |
| 2007/0061393 A1 | 3/2007 | Moore | |
| 2007/0130101 A1 | 6/2007 | Anderson et al. | |
| 2007/0130323 A1 | 6/2007 | Landsman et al. | |
| 2007/0157311 A1 | 7/2007 | Meier et al. | |
| 2007/0173355 A1 | 7/2007 | Klein | |
| 2007/0179793 A1 | 8/2007 | Bagchi et al. | |
| 2007/0180490 A1 | 8/2007 | Renzi et al. | |
| 2007/0192438 A1 | 8/2007 | Goei | |
| 2007/0266420 A1 | 11/2007 | Hawkins et al. | |
| 2007/0283171 A1 | 12/2007 | Breslin et al. | |
| 2008/0005194 A1 | 1/2008 | Smolen et al. | |
| 2008/0015927 A1 | 1/2008 | Ramirez | |
| 2008/0028065 A1 | 1/2008 | Caso et al. | |
| 2008/0028435 A1 | 1/2008 | Strickland et al. | |
| 2008/0047016 A1 | 2/2008 | Spoonamore | |
| 2008/0120699 A1 | 5/2008 | Spear | |
| 2008/0140696 A1 | 6/2008 | Mathuria | |
| 2008/0189306 A1 | 8/2008 | Hewett et al. | |
| 2008/0195436 A1 | 8/2008 | Whyte | |
| 2008/0222271 A1 | 9/2008 | Spires | |
| 2008/0235177 A1 | 9/2008 | Kim et al. | |
| 2008/0270203 A1 | 10/2008 | Holmes et al. | |
| 2008/0270351 A1 | 10/2008 | Thomsen | |
| 2008/0270381 A1 | 10/2008 | Thomsen | |
| 2008/0270382 A1 | 10/2008 | Thomsen et al. | |
| 2008/0270451 A1 | 10/2008 | Thomsen et al. | |
| 2008/0270462 A1 | 10/2008 | Thomsen | |
| 2008/0281649 A1 | 11/2008 | Morris | |
| 2008/0282320 A1 | 11/2008 | DeNovo et al. | |
| 2008/0288271 A1 | 11/2008 | Faust | |
| 2008/0288299 A1 | 11/2008 | Schultz | |
| 2009/0012896 A1 | 1/2009 | Arnold | |
| 2009/0022301 A1 | 1/2009 | Mudaliar | |
| 2009/0037975 A1 | 2/2009 | Ishikawa et al. | |
| 2009/0119500 A1 | 5/2009 | Roth et al. | |
| 2009/0132419 A1 | 5/2009 | Grammer et al. | |
| 2009/0138276 A1 | 5/2009 | Hayashida et al. | |
| 2009/0140035 A1 | 6/2009 | Miller | |
| 2009/0144702 A1 | 6/2009 | Atkin et al. | |
| 2009/0158249 A1 | 6/2009 | Tomkins et al. | |
| 2009/0172705 A1 | 7/2009 | Cheong | |
| 2009/0182818 A1 | 7/2009 | Krywaniuk | |
| 2009/0187764 A1 | 7/2009 | Astakhov et al. | |
| 2009/0204452 A1 | 8/2009 | Iskandar et al. | |
| 2009/0204820 A1 | 8/2009 | Brandenburg et al. | |
| 2009/0210347 A1 | 8/2009 | Sarcanin | |
| 2009/0216610 A1 | 8/2009 | Chorny | |
| 2009/0249076 A1 | 10/2009 | Reed et al. | |
| 2009/0303237 A1 | 12/2009 | Liu et al. | |
| 2010/0010912 A1 | 1/2010 | Jones et al. | |
| 2010/0010968 A1 | 1/2010 | Redlich et al. | |
| 2010/0077484 A1 | 3/2010 | Paretti et al. | |
| 2010/0082533 A1 | 4/2010 | Nakamura et al. | |
| 2010/0094650 A1 | 4/2010 | Tran et al. | |
| 2010/0100398 A1 | 4/2010 | Auker et al. | |
| 2010/0121773 A1 | 5/2010 | Currier et al. | |
| 2010/0192201 A1 | 7/2010 | Shimoni et al. | |
| 2010/0205057 A1 | 8/2010 | Hook et al. | |
| 2010/0223349 A1 | 9/2010 | Thorson | |
| 2010/0228786 A1 | 9/2010 | Török | |
| 2010/0234987 A1 | 9/2010 | Benschop et al. | |
| 2010/0235297 A1 | 9/2010 | Mamorsky | |
| 2010/0235915 A1 | 9/2010 | Memon et al. | |
| 2010/0262624 A1 | 10/2010 | Pullikottil | |
| 2010/0268628 A1 | 10/2010 | Pitkow et al. | |
| 2010/0268932 A1 | 10/2010 | Bhattacharjee | |
| 2010/0281313 A1 | 11/2010 | White et al. | |
| 2010/0287114 A1 | 11/2010 | Bartko et al. | |
| 2010/0333012 A1 | 12/2010 | Adachi et al. | |
| 2011/0006996 A1 | 1/2011 | Smith et al. | |
| 2011/0010202 A1 | 1/2011 | Neale | |
| 2011/0082794 A1 | 4/2011 | Blechman | |
| 2011/0137696 A1 | 6/2011 | Meyer et al. | |
| 2011/0145154 A1 | 6/2011 | Rivers et al. | |
| 2011/0153396 A1 | 6/2011 | Marcuvitz et al. | |
| 2011/0191664 A1 | 8/2011 | Sheleheda et al. | |
| 2011/0208850 A1 | 8/2011 | Sheleheda et al. | |
| 2011/0209067 A1 | 8/2011 | Bogess et al. | |
| 2011/0231896 A1 | 9/2011 | Tovar | |
| 2011/0238573 A1 | 9/2011 | Varadarajan | |
| 2011/0252456 A1 | 10/2011 | Hatakeyama | |
| 2011/0302643 A1 | 12/2011 | Pichna et al. | |
| 2012/0041939 A1 | 2/2012 | Amsterdamski | |
| 2012/0084151 A1 | 4/2012 | Kozak et al. | |
| 2012/0084349 A1 | 4/2012 | Lee et al. | |
| 2012/0102411 A1 | 4/2012 | Sathish | |
| 2012/0102543 A1 | 4/2012 | Kohli et al. | |
| 2012/0109830 A1 | 5/2012 | Vogel | |
| 2012/0110674 A1 | 5/2012 | Belani et al. | |
| 2012/0116923 A1 | 5/2012 | Irving et al. | |
| 2012/0131438 A1 | 5/2012 | Li et al. | |
| 2012/0143650 A1 | 6/2012 | Crowley et al. | |
| 2012/0144499 A1 | 6/2012 | Tan et al. | |
| 2012/0191596 A1 | 7/2012 | Kremen et al. | |
| 2012/0226621 A1 | 9/2012 | Petran et al. | |
| 2012/0239557 A1 | 9/2012 | Weinflash et al. | |
| 2012/0254320 A1 | 10/2012 | Dove et al. | |
| 2012/0259752 A1 | 10/2012 | Agee | |
| 2012/0323700 A1 | 12/2012 | Aleksandrovich et al. | |
| 2012/0330769 A1 | 12/2012 | Arceo | |

(56) References Cited

U.S. PATENT DOCUMENTS

| | | |
|---|---|---|
| 2012/0330869 A1 | 12/2012 | Durham |
| 2013/0004933 A1 | 1/2013 | Bhaskaran |
| 2013/0018954 A1 | 1/2013 | Cheng |
| 2013/0085801 A1 | 4/2013 | Sharpe et al. |
| 2013/0091156 A1 | 4/2013 | Raiche et al. |
| 2013/0103485 A1 | 4/2013 | Postrel |
| 2013/0111323 A1 | 5/2013 | Taghaddos et al. |
| 2013/0124257 A1 | 5/2013 | Schubert |
| 2013/0159351 A1 | 6/2013 | Hamann et al. |
| 2013/0171968 A1 | 7/2013 | Wang |
| 2013/0179982 A1 | 7/2013 | Bridges et al. |
| 2013/0179988 A1 | 7/2013 | Bekker et al. |
| 2013/0185806 A1 | 7/2013 | Hatakeyama |
| 2013/0211872 A1* | 8/2013 | Cherry .................. G06Q 10/04 705/7.28 |
| 2013/0218829 A1 | 8/2013 | Martinez |
| 2013/0219459 A1 | 8/2013 | Bradley |
| 2013/0254139 A1 | 9/2013 | Lei |
| 2013/0254649 A1 | 9/2013 | ONeill |
| 2013/0254699 A1 | 9/2013 | Bashir et al. |
| 2013/0262328 A1 | 10/2013 | Federgreen |
| 2013/0282438 A1 | 10/2013 | Hunter et al. |
| 2013/0282466 A1 | 10/2013 | Hampton |
| 2013/0290169 A1 | 10/2013 | Bathula et al. |
| 2013/0298071 A1 | 11/2013 | Wine |
| 2013/0311224 A1 | 11/2013 | Heroux et al. |
| 2013/0318207 A1 | 11/2013 | Dotter |
| 2013/0326112 A1 | 12/2013 | Park et al. |
| 2013/0332362 A1 | 12/2013 | Ciurea |
| 2013/0340086 A1 | 12/2013 | Blom |
| 2014/0006355 A1 | 1/2014 | Kirihata |
| 2014/0006616 A1 | 1/2014 | Aad et al. |
| 2014/0012833 A1 | 1/2014 | Humprecht |
| 2014/0019561 A1 | 1/2014 | Belity et al. |
| 2014/0032259 A1 | 1/2014 | Lafever et al. |
| 2014/0032265 A1 | 1/2014 | Paprocki |
| 2014/0040134 A1 | 2/2014 | Ciurea |
| 2014/0040161 A1 | 2/2014 | Berlin |
| 2014/0040979 A1 | 2/2014 | Barton et al. |
| 2014/0041048 A1 | 2/2014 | Goodwin et al. |
| 2014/0047551 A1 | 2/2014 | Nagasundaram et al. |
| 2014/0052463 A1 | 2/2014 | Cashman et al. |
| 2014/0067973 A1 | 3/2014 | Eden |
| 2014/0074550 A1 | 3/2014 | Chourey |
| 2014/0074645 A1 | 3/2014 | Ingram |
| 2014/0075493 A1 | 3/2014 | Krishnan et al. |
| 2014/0089027 A1 | 3/2014 | Brown |
| 2014/0089039 A1 | 3/2014 | Mcclellan |
| 2014/0108173 A1 | 4/2014 | Cooper et al. |
| 2014/0108968 A1 | 4/2014 | Vishria |
| 2014/0137257 A1 | 5/2014 | Martinez et al. |
| 2014/0142988 A1 | 5/2014 | Grosso et al. |
| 2014/0143011 A1 | 5/2014 | Mudugu et al. |
| 2014/0143844 A1 | 5/2014 | Goertzen |
| 2014/0164476 A1 | 6/2014 | Thomson |
| 2014/0188956 A1 | 7/2014 | Subba et al. |
| 2014/0196143 A1 | 7/2014 | Fliderman et al. |
| 2014/0208418 A1 | 7/2014 | Libin |
| 2014/0222468 A1 | 8/2014 | Araya et al. |
| 2014/0244309 A1 | 8/2014 | Francois |
| 2014/0244325 A1 | 8/2014 | Cartwright |
| 2014/0244375 A1 | 8/2014 | Kim |
| 2014/0244399 A1 | 8/2014 | Orduna et al. |
| 2014/0257917 A1 | 9/2014 | Spencer et al. |
| 2014/0258093 A1 | 9/2014 | Gardiner et al. |
| 2014/0278539 A1 | 9/2014 | Edwards |
| 2014/0278663 A1 | 9/2014 | Samuel et al. |
| 2014/0278730 A1 | 9/2014 | Muhart et al. |
| 2014/0278802 A1 | 9/2014 | Macpherson |
| 2014/0283027 A1 | 9/2014 | Orona et al. |
| 2014/0283106 A1 | 9/2014 | Stahura et al. |
| 2014/0288971 A1 | 9/2014 | Whibbs, Iii |
| 2014/0289681 A1 | 9/2014 | Wielgosz |
| 2014/0289862 A1 | 9/2014 | Gorfein et al. |
| 2014/0317171 A1 | 10/2014 | Fox et al. |
| 2014/0324480 A1 | 10/2014 | Dufel et al. |
| 2014/0337041 A1 | 11/2014 | Madden et al. |
| 2014/0337466 A1 | 11/2014 | Li et al. |
| 2014/0344015 A1 | 11/2014 | Puértolas-Montañés et al. |
| 2015/0006514 A1 | 1/2015 | Hung |
| 2015/0012363 A1 | 1/2015 | Grant et al. |
| 2015/0019530 A1 | 1/2015 | Felch |
| 2015/0026056 A1 | 1/2015 | Calman et al. |
| 2015/0026260 A1 | 1/2015 | Worthley |
| 2015/0033112 A1 | 1/2015 | Norwood et al. |
| 2015/0066577 A1 | 3/2015 | Christiansen et al. |
| 2015/0066865 A1 | 3/2015 | Yara et al. |
| 2015/0088598 A1 | 3/2015 | Acharyya et al. |
| 2015/0088635 A1 | 3/2015 | Maycotte et al. |
| 2015/0106260 A1 | 4/2015 | Andrews et al. |
| 2015/0106264 A1 | 4/2015 | Johnson |
| 2015/0106867 A1 | 4/2015 | Liang |
| 2015/0106948 A1 | 4/2015 | Holman et al. |
| 2015/0106949 A1 | 4/2015 | Holman et al. |
| 2015/0121462 A1 | 4/2015 | Courage et al. |
| 2015/0143258 A1 | 5/2015 | Carolan et al. |
| 2015/0149362 A1 | 5/2015 | Baum et al. |
| 2015/0154520 A1 | 6/2015 | Federgreen et al. |
| 2015/0169318 A1 | 6/2015 | Nash |
| 2015/0172296 A1 | 6/2015 | Fujioka |
| 2015/0178740 A1 | 6/2015 | Borawski et al. |
| 2015/0199534 A1 | 7/2015 | Francis et al. |
| 2015/0199541 A1 | 7/2015 | Koch et al. |
| 2015/0199702 A1 | 7/2015 | Singh |
| 2015/0229664 A1 | 8/2015 | Hawthorn et al. |
| 2015/0235049 A1 | 8/2015 | Cohen et al. |
| 2015/0235050 A1 | 8/2015 | Wouhaybi et al. |
| 2015/0235283 A1 | 8/2015 | Nishikawa |
| 2015/0242638 A1 | 8/2015 | Bitran et al. |
| 2015/0242773 A1* | 8/2015 | Major ................ G06Q 10/0635 705/7.28 |
| 2015/0242778 A1 | 8/2015 | Wilcox et al. |
| 2015/0242858 A1 | 8/2015 | Smith et al. |
| 2015/0248391 A1 | 9/2015 | Watanabe |
| 2015/0254597 A1 | 9/2015 | Jahagirdar |
| 2015/0261887 A1 | 9/2015 | Joukov |
| 2015/0262189 A1 | 9/2015 | Vergeer |
| 2015/0264417 A1 | 9/2015 | Spitz et al. |
| 2015/0269384 A1 | 9/2015 | Holman et al. |
| 2015/0271167 A1 | 9/2015 | Kalai |
| 2015/0288715 A1 | 10/2015 | Hotchkiss |
| 2015/0309813 A1 | 10/2015 | Patel |
| 2015/0310227 A1 | 10/2015 | Ishida et al. |
| 2015/0310575 A1 | 10/2015 | Shelton |
| 2015/0348200 A1 | 12/2015 | Fair et al. |
| 2015/0356362 A1 | 12/2015 | Demos |
| 2015/0379430 A1 | 12/2015 | Dirac et al. |
| 2016/0006760 A1 | 1/2016 | Lala et al. |
| 2016/0012465 A1 | 1/2016 | Sharp |
| 2016/0026394 A1 | 1/2016 | Goto |
| 2016/0034918 A1 | 2/2016 | Bjelajac et al. |
| 2016/0048700 A1 | 2/2016 | Stransky-Heilkron |
| 2016/0050213 A1 | 2/2016 | Storr |
| 2016/0063523 A1 | 3/2016 | Nistor et al. |
| 2016/0063567 A1 | 3/2016 | Srivastava |
| 2016/0071112 A1 | 3/2016 | Unser |
| 2016/0080405 A1 | 3/2016 | Schler et al. |
| 2016/0099963 A1 | 4/2016 | Mahaffey et al. |
| 2016/0103963 A1 | 4/2016 | Mishra |
| 2016/0104259 A1 | 4/2016 | Menrad |
| 2016/0125550 A1 | 5/2016 | Joao et al. |
| 2016/0125749 A1 | 5/2016 | Delacroix et al. |
| 2016/0125751 A1 | 5/2016 | Barker et al. |
| 2016/0140466 A1 | 5/2016 | Sidebottom et al. |
| 2016/0143570 A1 | 5/2016 | Valacich et al. |
| 2016/0148143 A1 | 5/2016 | Anderson et al. |
| 2016/0148259 A1 | 5/2016 | Baek et al. |
| 2016/0162269 A1 | 6/2016 | Pogorelik et al. |
| 2016/0164915 A1 | 6/2016 | Cook |
| 2016/0180386 A1 | 6/2016 | Konig |
| 2016/0188450 A1 | 6/2016 | Appusamy et al. |
| 2016/0189156 A1 | 6/2016 | Kim et al. |
| 2016/0196189 A1 | 7/2016 | Miyagi et al. |
| 2016/0225000 A1 | 8/2016 | Glasgow |

(56) References Cited

U.S. PATENT DOCUMENTS

| | | |
|---|---|---|
| 2016/0232465 A1 | 8/2016 | Kurtz et al. |
| 2016/0232534 A1 | 8/2016 | Lacey et al. |
| 2016/0234319 A1 | 8/2016 | Griffin |
| 2016/0253497 A1 | 9/2016 | Christodorescu et al. |
| 2016/0255139 A1 | 9/2016 | Rathod |
| 2016/0261631 A1 | 9/2016 | Vissamsetty et al. |
| 2016/0262163 A1 | 9/2016 | Gonzalez Garrido et al. |
| 2016/0292453 A1 | 10/2016 | Patterson et al. |
| 2016/0292621 A1 | 10/2016 | Ciccone et al. |
| 2016/0321582 A1 | 11/2016 | Broudou et al. |
| 2016/0321748 A1 | 11/2016 | Mahatma et al. |
| 2016/0330237 A1 | 11/2016 | Edlabadkar |
| 2016/0335531 A1 | 11/2016 | Mullen et al. |
| 2016/0342811 A1 | 11/2016 | Whitcomb et al. |
| 2016/0359861 A1 | 12/2016 | Manov et al. |
| 2016/0364736 A1 | 12/2016 | Maugans, III |
| 2016/0370954 A1 | 12/2016 | Burningham et al. |
| 2016/0378762 A1 | 12/2016 | Rohter |
| 2016/0381064 A1 | 12/2016 | Chan et al. |
| 2016/0381560 A1 | 12/2016 | Margaliot |
| 2017/0004055 A1 | 1/2017 | Horan et al. |
| 2017/0032395 A1 | 2/2017 | Kaufman et al. |
| 2017/0032408 A1 | 2/2017 | Kumar et al. |
| 2017/0034101 A1 | 2/2017 | Kumar et al. |
| 2017/0041324 A1 | 2/2017 | Ionutescu et al. |
| 2017/0046399 A1 | 2/2017 | Sankaranarasimhan et al. |
| 2017/0046753 A1 | 2/2017 | Deupree, IV |
| 2017/0061501 A1 | 3/2017 | Horwich |
| 2017/0068785 A1 | 3/2017 | Experton et al. |
| 2017/0070495 A1 | 3/2017 | Cherry et al. |
| 2017/0075513 A1 | 3/2017 | Watson et al. |
| 2017/0093917 A1 | 3/2017 | Chandra et al. |
| 2017/0115864 A1 | 4/2017 | Thomas et al. |
| 2017/0124570 A1 | 5/2017 | Nidamanuri et al. |
| 2017/0140174 A1 | 5/2017 | Lacey et al. |
| 2017/0140467 A1 | 5/2017 | Neag et al. |
| 2017/0142158 A1 | 5/2017 | Laoutaris et al. |
| 2017/0142177 A1 | 5/2017 | Hu |
| 2017/0154188 A1 | 6/2017 | Meier et al. |
| 2017/0161520 A1 | 6/2017 | Lockhart, III et al. |
| 2017/0171235 A1 | 6/2017 | Mulchandani et al. |
| 2017/0171325 A1 | 6/2017 | Perez |
| 2017/0177324 A1 | 6/2017 | Frank et al. |
| 2017/0180378 A1 | 6/2017 | Tyler et al. |
| 2017/0180505 A1 | 6/2017 | Shaw et al. |
| 2017/0193017 A1 | 7/2017 | Migliori |
| 2017/0193624 A1 | 7/2017 | Tsai |
| 2017/0201518 A1 | 7/2017 | Holmqvist et al. |
| 2017/0206707 A1 | 7/2017 | Guay et al. |
| 2017/0208084 A1 | 7/2017 | Steelman et al. |
| 2017/0213206 A1 | 7/2017 | Shearer |
| 2017/0220685 A1 | 8/2017 | Yan et al. |
| 2017/0220964 A1 | 8/2017 | Datta Ray |
| 2017/0249394 A1 | 8/2017 | Loeb et al. |
| 2017/0249710 A1 | 8/2017 | Guillama et al. |
| 2017/0269791 A1 | 9/2017 | Meyerzon et al. |
| 2017/0270318 A1 | 9/2017 | Ritchie |
| 2017/0278004 A1 | 9/2017 | Mcelhinney et al. |
| 2017/0278117 A1 | 9/2017 | Wallace et al. |
| 2017/0286719 A1 | 10/2017 | Krishnamurthy et al. |
| 2017/0287031 A1 | 10/2017 | Barday |
| 2017/0289199 A1 | 10/2017 | Barday |
| 2017/0308875 A1 | 10/2017 | O'Regan et al. |
| 2017/0316400 A1 | 11/2017 | Venkatakrishnan et al. |
| 2017/0330197 A1 | 11/2017 | DiMaggio et al. |
| 2017/0353404 A1 | 12/2017 | Hodge |
| 2018/0032757 A1 | 2/2018 | Michael |
| 2018/0039975 A1 | 2/2018 | Hefetz |
| 2018/0041498 A1 | 2/2018 | Kikuchi |
| 2018/0046753 A1 | 2/2018 | Shelton |
| 2018/0046939 A1 | 2/2018 | Meron et al. |
| 2018/0063174 A1 | 3/2018 | Grill et al. |
| 2018/0063190 A1 | 3/2018 | Wright et al. |
| 2018/0082368 A1 | 3/2018 | Weinflash et al. |
| 2018/0083843 A1 | 3/2018 | Sambandam |
| 2018/0091476 A1 | 3/2018 | Jakobsson et al. |
| 2018/0131574 A1 | 5/2018 | Jacobs et al. |
| 2018/0131658 A1 | 5/2018 | Bhagwan et al. |
| 2018/0165637 A1 | 6/2018 | Romero et al. |
| 2018/0198614 A1 | 7/2018 | Neumann |
| 2018/0204281 A1 | 7/2018 | Painter et al. |
| 2018/0219917 A1 | 8/2018 | Chiang |
| 2018/0239500 A1 | 8/2018 | Allen et al. |
| 2018/0248914 A1 | 8/2018 | Sartor |
| 2018/0285887 A1 | 10/2018 | Maung |
| 2018/0301222 A1 | 10/2018 | Dew, Sr. et al. |
| 2018/0307859 A1 | 10/2018 | Lafever et al. |
| 2018/0336509 A1 | 11/2018 | Guttmann |
| 2018/0343215 A1 | 11/2018 | Ganapathi et al. |
| 2018/0349583 A1 | 12/2018 | Turgeman et al. |
| 2018/0351888 A1 | 12/2018 | Howard |
| 2018/0352003 A1 | 12/2018 | Winn et al. |
| 2018/0357243 A1 | 12/2018 | Yoon |
| 2018/0365720 A1 | 12/2018 | Goldman et al. |
| 2018/0374030 A1 | 12/2018 | Barday et al. |
| 2018/0375814 A1 | 12/2018 | Hart |
| 2019/0005210 A1 | 1/2019 | Wiederspohn et al. |
| 2019/0012211 A1 | 1/2019 | Selvaraj |
| 2019/0012672 A1 | 1/2019 | Francesco |
| 2019/0019184 A1 | 1/2019 | Lacey et al. |
| 2019/0050547 A1 | 2/2019 | Welsh et al. |
| 2019/0087570 A1 | 3/2019 | Sloane |
| 2019/0096020 A1 | 3/2019 | Barday et al. |
| 2019/0108353 A1 | 4/2019 | Sadeh et al. |
| 2019/0130132 A1 | 5/2019 | Barbas et al. |
| 2019/0132350 A1 | 5/2019 | Smith et al. |
| 2019/0138496 A1 | 5/2019 | Yamaguchi |
| 2019/0139087 A1 | 5/2019 | Dabbs et al. |
| 2019/0148003 A1 | 5/2019 | Van Hoe |
| 2019/0156053 A1 | 5/2019 | Vogel et al. |
| 2019/0156058 A1 | 5/2019 | Van Dyne et al. |
| 2019/0171801 A1 | 6/2019 | Barday et al. |
| 2019/0179652 A1 | 6/2019 | Hesener et al. |
| 2019/0180051 A1 | 6/2019 | Barday et al. |
| 2019/0182294 A1 | 6/2019 | Rieke et al. |
| 2019/0188402 A1 | 6/2019 | Wang et al. |
| 2019/0266200 A1 | 8/2019 | Francolla |
| 2019/0266201 A1 | 8/2019 | Barday et al. |
| 2019/0266350 A1 | 8/2019 | Barday et al. |
| 2019/0268343 A1 | 8/2019 | Barday et al. |
| 2019/0268344 A1 | 8/2019 | Barday et al. |
| 2019/0272492 A1 | 9/2019 | Elledge et al. |
| 2019/0294818 A1 | 9/2019 | Barday et al. |
| 2019/0332802 A1 | 10/2019 | Barday et al. |
| 2019/0332807 A1 | 10/2019 | Lafever et al. |
| 2019/0333118 A1 | 10/2019 | Crimmins et al. |
| 2019/0354709 A1 | 11/2019 | Brinskelle |
| 2019/0356684 A1 | 11/2019 | Sinha et al. |
| 2019/0362169 A1 | 11/2019 | Lin et al. |
| 2019/0362268 A1 | 11/2019 | Fogarty et al. |
| 2019/0377901 A1 | 12/2019 | Balzer et al. |
| 2019/0378073 A1 | 12/2019 | Lopez et al. |
| 2019/0384934 A1 | 12/2019 | Kim |
| 2019/0392162 A1 | 12/2019 | Stern et al. |
| 2019/0392170 A1 | 12/2019 | Barday et al. |
| 2019/0392171 A1 | 12/2019 | Barday et al. |
| 2020/0004938 A1 | 1/2020 | Brannon et al. |
| 2020/0020454 A1 | 1/2020 | McGarvey et al. |
| 2020/0050966 A1 | 2/2020 | Enuka et al. |
| 2020/0051117 A1 | 2/2020 | Mitchell |
| 2020/0057781 A1 | 2/2020 | Mccormick |
| 2020/0074471 A1 | 3/2020 | Adjaoute |
| 2020/0081865 A1 | 3/2020 | Farrar et al. |
| 2020/0082270 A1 | 3/2020 | Gu et al. |
| 2020/0090197 A1 | 3/2020 | Rodriguez et al. |
| 2020/0092179 A1 | 3/2020 | Chieu et al. |
| 2020/0110589 A1 | 4/2020 | Bequet et al. |
| 2020/0110904 A1 | 4/2020 | Shinde et al. |
| 2020/0117737 A1 | 4/2020 | Gopalakrishnan et al. |
| 2020/0137097 A1 | 4/2020 | Zimmermann et al. |
| 2020/0143301 A1 | 5/2020 | Bowers |
| 2020/0143797 A1 | 5/2020 | Manoharan et al. |
| 2020/0159952 A1 | 5/2020 | Dain et al. |
| 2020/0159955 A1 | 5/2020 | Barlik et al. |

(56) References Cited

U.S. PATENT DOCUMENTS

| | | |
|---|---|---|
| 2020/0167653 A1 | 5/2020 | Manjunath et al. |
| 2020/0175424 A1 | 6/2020 | Kursun |
| 2020/0183655 A1 | 6/2020 | Barday et al. |
| 2020/0186355 A1 | 6/2020 | Davies |
| 2020/0193018 A1 | 6/2020 | Van Dyke |
| 2020/0193022 A1 | 6/2020 | Lunsford et al. |
| 2020/0210558 A1 | 7/2020 | Barday et al. |
| 2020/0210620 A1 | 7/2020 | Haletky |
| 2020/0211002 A1 | 7/2020 | Steinberg |
| 2020/0220901 A1 | 7/2020 | Barday et al. |
| 2020/0226156 A1 | 7/2020 | Borra et al. |
| 2020/0226196 A1 | 7/2020 | Brannon et al. |
| 2020/0242259 A1 | 7/2020 | Chirravuri et al. |
| 2020/0242719 A1 | 7/2020 | Lee |
| 2020/0250342 A1 | 8/2020 | Miller et al. |
| 2020/0252413 A1 | 8/2020 | Buzbee et al. |
| 2020/0252817 A1 | 8/2020 | Brouillette et al. |
| 2020/0272764 A1 | 8/2020 | Brannon et al. |
| 2020/0285755 A1* | 9/2020 | Kassoumeh ....... G06Q 10/0635 |
| 2020/0293679 A1 | 9/2020 | Handy Bosma et al. |
| 2020/0296171 A1 | 9/2020 | Mocanu et al. |
| 2020/0302089 A1 | 9/2020 | Barday et al. |
| 2020/0310917 A1 | 10/2020 | Tkachev et al. |
| 2020/0311310 A1 | 10/2020 | Barday et al. |
| 2020/0344243 A1 | 10/2020 | Brannon et al. |
| 2020/0356695 A1 | 11/2020 | Brannon et al. |
| 2020/0364369 A1 | 11/2020 | Brannon et al. |
| 2020/0372178 A1 | 11/2020 | Barday et al. |
| 2020/0394327 A1 | 12/2020 | Childress et al. |
| 2020/0401380 A1 | 12/2020 | Jacobs et al. |
| 2020/0401962 A1 | 12/2020 | Gottemukkala et al. |
| 2020/0410117 A1 | 12/2020 | Barday et al. |
| 2020/0410131 A1 | 12/2020 | Barday et al. |
| 2020/0410132 A1 | 12/2020 | Brannon et al. |
| 2021/0012341 A1 | 1/2021 | Garg et al. |
| 2021/0056569 A1 | 2/2021 | Silberman et al. |
| 2021/0075775 A1 | 3/2021 | Cheng et al. |
| 2021/0081567 A1 | 3/2021 | Park et al. |
| 2021/0099449 A1 | 4/2021 | Frederick et al. |
| 2021/0110047 A1 | 4/2021 | Chunsheng |
| 2021/0125089 A1 | 4/2021 | Nickl et al. |
| 2021/0152496 A1 | 5/2021 | Kim et al. |
| 2021/0182940 A1 | 6/2021 | Gupta et al. |
| 2021/0224402 A1 | 7/2021 | Sher-Jan et al. |
| 2021/0233157 A1 | 7/2021 | Crutchfield, Jr. |
| 2021/0243595 A1 | 8/2021 | Buck et al. |
| 2021/0248247 A1 | 8/2021 | Poothokaran et al. |
| 2021/0256163 A1 | 8/2021 | Fleming et al. |
| 2021/0279360 A1 | 9/2021 | Gimenez Palop et al. |
| 2021/0288995 A1 | 9/2021 | Attar et al. |
| 2021/0297441 A1 | 9/2021 | Olalere |
| 2021/0303828 A1 | 9/2021 | Lafreniere et al. |
| 2021/0312061 A1 | 10/2021 | Schroeder et al. |
| 2021/0326786 A1 | 10/2021 | Sun et al. |
| 2021/0328969 A1 | 10/2021 | Gaddam et al. |
| 2021/0382949 A1 | 12/2021 | Yastrebenetsky et al. |
| 2021/0397735 A1 | 12/2021 | Samatov et al. |
| 2021/0400018 A1 | 12/2021 | Vettaikaran et al. |
| 2021/0406712 A1 | 12/2021 | Bhide et al. |
| 2022/0137850 A1 | 5/2022 | Boddu et al. |
| 2022/0171759 A1 | 6/2022 | Jindal et al. |
| 2022/0217045 A1 | 7/2022 | Blau et al. |

FOREIGN PATENT DOCUMENTS

| | | |
|---|---|---|
| EP | 1394698 | 3/2004 |
| EP | 2031540 | 3/2009 |
| KR | 20130062500 | 6/2013 |
| WO | 2001033430 | 5/2001 |
| WO | 20020067158 | 8/2002 |
| WO | 20030050773 | 6/2003 |
| WO | 20080084111 | 1/2005 |
| WO | 2007002412 | 1/2007 |
| WO | 2008/134203 | 11/2008 |
| WO | 2012174659 | 12/2012 |
| WO | 2015116905 | 8/2015 |
| WO | 2020/146028 | 7/2020 |
| WO | 2022006421 | 1/2022 |

OTHER PUBLICATIONS

Van Eijk et al., "The Impact of User Location on Cookie Notices (Inside and Outside of the European Union)," IEEE Security & Privacy Workshop on Technology and Consumer Protection (CONPRO '19), Jan. 1, 2019 (Year: 2019).

Vukovic et al., "Managing Enterprise IT Systems Using Online Communities," Jul. 9, 2011, IEEE, pp. 552-559. (Year: 2011).

Wang et al., "Revealing Key Non-Financial Factors for Online Credit-Scoring in E-Financing," 2013, IEEE, pp. 1-6 (Year: 2013).

Wang et al., "Secure and Efficient Access to Outsourced Data," ACM, pp. 55-65 (Year: 2009).

Weaver et al., "Understanding Information Preview in Mobile Email Processing", ACM, pp. 303-312, 2011 (Year: 2011).

Wong et al., "Ontology Mapping for the Interoperability Problem in Network Management," IEEE, pp. 2058-2068 (Year: 2005).

Wu et al., "Data Mining with Big Data," IEEE, Jan. 2014, pp. 97-107, vol. 26, No. 1, (Year: 2014).

www.truste.com (1), 200150207, Internet Archive Wayback Machine, www.archive.org,2_7_2015.

Xu, et al., "GatorShare: A File System Framework for High-Throughput Data Management," ACM, pp. 776-786 (Year: 2010).

Yang et al., "DAC-MACS: Effective Data Access Control for Multiauthority Cloud Storage Systems," IEEE, pp. 1790-1801 (Year: 2013).

Yang et al., "Mining Web Access Sequence with Improved Apriori Algorithm," IEEE, 2017, pp. 780-784 (Year: 2017).

Ye et al., "An Evolution-Based Cache Scheme for Scalable Mobile Data Access," ACM, pp. 1-7 (Year: 2007).

Yin et al., "Multibank Memory Optimization for Parallel Data Access in Multiple Data Arrays", ACM, pp. 1-8 (Year: 2016).

Yiu et al., "Outsourced Similarity Search on Metric Data Assets", IEEE, pp. 338-352 (Year: 2012).

Yu, "Using Data from Social Media Websites to Inspire the Design of Assistive Technology", ACM, pp. 1-2 (Year: 2016).

Yu, et al., "Performance and Fairness Issues in Big Data Transfers," ACM, pp. 9-11 (Year: 2014).

Yue et al., "An Automatic HTTP Cookie Management System," Computer Networks, Elsevier, Amsterdam, NL, vol. 54, No. 13, Sep. 15, 2010, pp. 2182-2198 (Year: 2010).

Zannone, et al., "Maintaining Privacy on Derived Objects," ACM, pp. 10-19 (Year: 2005).

Zeldovich, Nickolai, et al., Making Information Flow Explicit in HiStar, OSDI '06: 7th USENIX Symposium on Operating Systems Design and Implementation, USENIX Association, p. 263-278.

Zhang et al., "Data Transfer Performance Issues for a Web Services Interface to Synchrotron Experiments", ACM, pp. 59-65 (Year: 2007).

Zhang et al., "Dynamic Topic Modeling for Monitoring Market Competition from Online Text and Image Data", ACM, pp. 1425-1434 (Year: 2015).

Zheng, et al., "Methodologies for Cross-Domain Data Fusion: An Overview," IEEE, pp. 16-34 (Year: 2015).

Zheng, et al., "Toward Assured Data Deletion in Cloud Storage," IEEE, vol. 34, No. 3, pp. 101-107 May/Jun. 2020 (Year: 2020).

Zhu, et al., "Dynamic Data Integration Using Web Services," IEEE, pp. 1-8 (Year: 2004).

Final Office Action, dated Oct. 26, 2021, from corresponding U.S. Appl. No. 17/306,496.

Final Office Action, dated Oct. 27, 2022, from corresponding U.S. Appl. No. 17/346,586.

Final Office Action, dated Oct. 28, 2021, from corresponding U.S. Appl. No. 17/234,205.

Final Office Action, dated Oct. 29, 2021, from corresponding U.S. Appl. No. 17/020,275.

Final Office Action, dated Sep. 17, 2021, from corresponding U.S. Appl. No. 17/200,698.

(56) References Cited

OTHER PUBLICATIONS

Final Office Action, dated Sep. 19, 2022, from corresponding U.S. Appl. No. 17/306,496.
Final Office Action, dated Sep. 21, 2020, from corresponding U.S. Appl. No. 16/808,493.
Final Office Action, dated Sep. 21, 2020, from corresponding U.S. Appl. No. 16/862,944.
Final Office Action, dated Sep. 22, 2020, from corresponding U.S. Appl. No. 16/808,497.
Final Office Action, dated Sep. 23, 2020, from corresponding U.S. Appl. No. 16/862,948.
Final Office Action, dated Sep. 24, 2020, from corresponding U.S. Appl. No. 16/862,952.
Final Office Action, dated Sep. 25, 2019, from corresponding U.S. Appl. No. 16/278,119.
Final Office Action, dated Sep. 28, 2020, from corresponding U.S. Appl. No. 16/565,395.
Final Office Action, dated Sep. 8, 2020, from corresponding U.S. Appl. No. 16/410,866.
Office Action, dated Apr. 1, 2021, from corresponding U.S. Appl. No. 17/119,080.
Office Action, dated Apr. 12, 2022, from corresponding U.S. Appl. No. 17/670,341.
Office Action, dated Apr. 15, 2021, from corresponding U.S. Appl. No. 17/161,159.
Office Action, dated Apr. 18, 2018, from corresponding U.S. Appl. No. 15/894,819.
Office Action, dated Apr. 18, 2022, from corresponding U.S. Appl. No. 17/670,349.
Office Action, dated Apr. 2, 2021, from corresponding U.S. Appl. No. 17/151,334.
Office Action, dated Apr. 20, 2020, from corresponding U.S. Appl. No. 16/812,795.
Office Action, dated Apr. 22, 2019, from corresponding U.S. Appl. No. 16/241,710.
Office Action, dated Apr. 22, 2020, from corresponding U.S. Appl. No. 16/811,793.
Office Action, dated Apr. 25, 2022, from corresponding U.S. Appl. No. 17/588,645.
Office Action, dated Apr. 26, 2022, from corresponding U.S. Appl. No. 17/151,334.
Office Action, dated Apr. 28, 2020, from corresponding U.S. Appl. No. 16/798,818.
Office Action, dated Apr. 28, 2020, from corresponding U.S. Appl. No. 16/808,500.
Office Action, dated Apr. 28, 2021, from corresponding U.S. Appl. No. 16/808,497.
Office Action, dated Apr. 29, 2020, from corresponding U.S. Appl. No. 16/791,337.
Office Action, dated Apr. 5, 2019, from corresponding U.S. Appl. No. 16/278,119.
Office Action, dated Apr. 7, 2020, from corresponding U.S. Appl. No. 16/788,633.
Office Action, dated Apr. 7, 2020, from corresponding U.S. Appl. No. 16/791,589.
Office Action, dated Apr. 8, 2022, from corresponding U.S. Appl. No. 16/938,509.
Office Action, dated Aug. 12, 2022, from corresponding U.S. Appl. No. 17/679,734.
Office Action, dated Aug. 13, 2019, from corresponding U.S. Appl. No. 16/505,430.
Office Action, dated Aug. 13, 2019, from corresponding U.S. Appl. No. 16/512,033.
Office Action, dated Aug. 15, 2019, from corresponding U.S. Appl. No. 16/505,461.
Office Action, dated Aug. 17, 2022, from corresponding U.S. Appl. No. 17/373,444.
Office Action, dated Aug. 17, 2022, from corresponding U.S. Appl. No. 17/836,430.
Office Action, dated Aug. 18, 2021, from corresponding U.S. Appl. No. 17/222,725.
Office Action, dated Aug. 19, 2019, from corresponding U.S. Appl. No. 16/278,122.
Office Action, dated Aug. 19, 2022, from corresponding U.S. Appl. No. 17/584,187.
Office Action, dated Aug. 2, 2022, from corresponding U.S. Appl. No. 17/670,354.
Office Action, dated Aug. 20, 2020, from corresponding U.S. Appl. No. 16/817,136.
Office Action, dated Aug. 23, 2017, from corresponding U.S. Appl. No. 15/626,052.
Office Action, dated Aug. 24, 2017, from corresponding U.S. Appl. No. 15/169,643.
Office Action, dated Aug. 24, 2017, from corresponding U.S. Appl. No. 15/619,451.
Office Action, dated Aug. 24, 2020, from corresponding U.S. Appl. No. 16/595,327.
Office Action, dated Aug. 27, 2019, from corresponding U.S. Appl. No. 16/410,296.
Office Action, dated Aug. 27, 2021, from corresponding U.S. Appl. No. 17/187,329.
Office Action, dated Aug. 27, 2021, from corresponding U.S. Appl. No. 17/334,948.
Office Action, dated Aug. 29, 2017, from corresponding U.S. Appl. No. 15/619,237.
Office Action, dated Aug. 30, 2017, from corresponding U.S. Appl. No. 15/619,212.
Office Action, dated Aug. 30, 2017, from corresponding U.S. Appl. No. 15/619,382.
Office Action, dated Aug. 30, 2021, from corresponding U.S. Appl. No. 16/938,520.
Office Action, dated Aug. 4, 2022, from corresponding U.S. Appl. No. 17/828,953.
Office Action, dated Aug. 6, 2019, from corresponding U.S. Appl. No. 16/404,491.
Office Action, dated Aug. 6, 2020, from corresponding U.S. Appl. No. 16/862,956.
Office Action, dated Dec. 11, 2019, from corresponding U.S. Appl. No. 16/578,712.
Office Action, dated Dec. 13, 2021, from corresponding U.S. Appl. No. 17/476,209.
Office Action, dated Dec. 14, 2018, from corresponding U.S. Appl. No. 16/104,393.
Office Action, dated Dec. 15, 2016, from corresponding U.S. Appl. No. 15/256,419.
Office Action, dated Dec. 16, 2019, from corresponding U.S. Appl. No. 16/563,754.
Office Action, dated Dec. 16, 2019, from corresponding U.S. Appl. No. 16/565,265.
Office Action, dated Dec. 16, 2020, from corresponding U.S. Appl. No. 17/020,275.
Office Action, dated Dec. 17, 2021, from corresponding U.S. Appl. No. 17/395,759.
Office Action, dated Dec. 17, 2021, from corresponding U.S. Appl. No. 17/499,582.
Office Action, dated Dec. 18, 2020, from corresponding U.S. Appl. No. 17/030,714.
Office Action, dated Dec. 19, 2019, from corresponding U.S. Appl. No. 16/410,866.
Office Action, dated Dec. 2, 2019, from corresponding U.S. Appl. No. 16/560,963.
Office Action, dated Dec. 2, 2021, from corresponding U.S. Appl. No. 17/504,102.
Office Action, dated Dec. 23, 2019, from corresponding U.S. Appl. No. 16/593,639.
Office Action, dated Dec. 24, 2020, from corresponding U.S. Appl. No. 17/068,454.
Office Action, dated Dec. 27, 2021, from corresponding U.S. Appl. No. 17/493,332.
Office Action, dated Dec. 29, 2021, from corresponding U.S. Appl. No. 17/479,807.

(56) References Cited

OTHER PUBLICATIONS

Office Action, dated Dec. 3, 2018, from corresponding U.S. Appl. No. 16/055,998.
Office Action, dated Dec. 30, 2021, from corresponding U.S. Appl. No. 17/149,421.
Office Action, dated Dec. 31, 2018, from corresponding U.S. Appl. No. 16/160,577.
Office Action, dated Dec. 7, 2021, from corresponding U.S. Appl. No. 17/499,609.
Office Action, dated Dec. 8, 2020, from corresponding U.S. Appl. No. 17/013,758.
Office Action, dated Dec. 8, 2020, from corresponding U.S. Appl. No. 17/068,198.
Office Action, dated Feb. 10, 2021, from corresponding U.S. Appl. No. 16/862,944.
Office Action, dated Feb. 10, 2021, from corresponding U.S. Appl. No. 17/106,469.
Office Action, dated Feb. 15, 2019, from corresponding U.S. Appl. No. 16/220,899.
Office Action, dated Feb. 16, 2022, from corresponding U.S. Appl. No. 16/872,031.
Office Action, dated Feb. 17, 2021, from corresponding U.S. Appl. No. 16/862,948.
Office Action, dated Feb. 18, 2021, from corresponding U.S. Appl. No. 16/862,952.
Office Action, dated Feb. 2, 2021, from corresponding U.S. Appl. No. 17/101,915.
Office Action, dated Feb. 26, 2019, from corresponding U.S. Appl. No. 16/228,250.
Office Action, dated Feb. 3, 2021, from corresponding U.S. Appl. No. 17/013,757.
Office Action, dated Feb. 5, 2020, from corresponding U.S. Appl. No. 16/586,202.
Office Action, dated Feb. 6, 2020, from corresponding U.S. Appl. No. 16/707,762.
Office Action, dated Feb. 8, 2021, from corresponding U.S. Appl. No. 17/139,650.
Office Action, dated Feb. 9, 2021, from corresponding U.S. Appl. No. 16/808,493.
Office Action, dated Feb. 9, 2022, from corresponding U.S. Appl. No. 17/543,546.
Office Action, dated Jan. 14, 2022, from corresponding U.S. Appl. No. 17/499,595.
Office Action, dated Jan. 18, 2019, from corresponding U.S. Appl. No. 16/055,984.
Office Action, dated Jan. 21, 2022, from corresponding U.S. Appl. No. 17/499,624.
Office Action, dated Jan. 22, 2021, from corresponding U.S. Appl. No. 17/099,270.
Office Action, dated Jan. 24, 2020, from corresponding U.S. Appl. No. 16/505,426.
Office Action, dated Jan. 24, 2020, from corresponding U.S. Appl. No. 16/700,049.
Office Action, dated Jan. 25, 2022, from corresponding U.S. Appl. No. 17/494,220.
Office Action, dated Jan. 27, 2020, from corresponding U.S. Appl. No. 16/656,895.
Office Action, dated Jan. 28, 2020, from corresponding U.S. Appl. No. 16/712,104.
Office Action, dated Jan. 29, 2021, from corresponding U.S. Appl. No. 17/101,106.
Office Action, dated Jan. 31, 2022, from corresponding U.S. Appl. No. 17/493,290.
Office Action, dated Jan. 4, 2019, from corresponding U.S. Appl. No. 16/159,566.
Office Action, dated Jan. 4, 2019, from corresponding U.S. Appl. No. 16/159,628.
Office Action, dated Jan. 4, 2021, from corresponding U.S. Appl. No. 17/013,756.
Office Action, dated Jan. 4, 2022, from corresponding U.S. Appl. No. 17/480,377.
Office Action, dated Jan. 7, 2020, from corresponding U.S. Appl. No. 16/572,182.
Office Action, dated Jan. 7, 2022, from corresponding U.S. Appl. No. 17/387,421.
Office Action, dated Jul. 13, 2021, from corresponding U.S. Appl. No. 17/306,496.
Office Action, dated Jul. 15, 2021, from corresponding U.S. Appl. No. 17/020,275.
Office Action, dated Jul. 18, 2019, from corresponding U.S. Appl. No. 16/410,762.
Office Action, dated Jul. 19, 2021, from corresponding U.S. Appl. No. 17/316,179.
Office Action, dated Jul. 21, 2017, from corresponding U.S. Appl. No. 15/256,430.
Office Action, dated Jul. 21, 2021, from corresponding U.S. Appl. No. 16/901,654.
Office Action, dated Jul. 23, 2019, from corresponding U.S. Appl. No. 16/436,616.
Office Action, dated Jul. 24, 2020, from corresponding U.S. Appl. No. 16/404,491.
Office Action, dated Jul. 27, 2020, from corresponding U.S. Appl. No. 16/595,342.
Office Action, dated Jul. 27, 2022, from corresponding U.S. Appl. No. 17/831,713.
Office Action, dated Jul. 28, 2022, from corresponding U.S. Appl. No. 16/925,550.
Office Action, dated Jul. 7, 2022, from corresponding U.S. Appl. No. 17/370,650.
Office Action, dated Jun. 1, 2020, from corresponding U.S. Appl. No. 16/862,952.
Office Action, dated Jun. 1, 2022, from corresponding U.S. Appl. No. 17/306,496.
Office Action, dated Jun. 14, 2022, from corresponding U.S. Appl. No. 17/346,586.
Office Action, dated Jun. 16, 2022, from corresponding U.S. Appl. No. 17/689,683.
Office Action, dated Jun. 24, 2019, from corresponding U.S. Appl. No. 16/410,336.
Office Action, dated Jun. 24, 2021, from corresponding U.S. Appl. No. 17/234,205.
Office Action, dated Jun. 27, 2019, from corresponding U.S. Appl. No. 16/404,405.
Office Action, dated Jun. 7, 2021, from corresponding U.S. Appl. No. 17/200,698.
Office Action, dated Jun. 9, 2021, from corresponding U.S. Appl. No. 17/222,523.
Office Action, dated Mar. 1, 2022, from corresponding U.S. Appl. No. 17/119,080.
Office Action, dated Mar. 11, 2019, from corresponding U.S. Appl. No. 16/220,978.
Office Action, dated Mar. 12, 2019, from corresponding U.S. Appl. No. 16/221,153.
Office Action, dated Mar. 15, 2021, from corresponding U.S. Appl. No. 17/149,421.
Office Action, dated Mar. 16, 2020, from corresponding U.S. Appl. No. 16/719,488.
Office Action, dated Mar. 17, 2020, from corresponding U.S. Appl. No. 16/565,395.
Office Action, dated Mar. 17, 2020, from corresponding U.S. Appl. No. 16/719,071.
Office Action, dated Mar. 2, 2022, from corresponding U.S. Appl. No. 17/020,275.
Office Action, dated Mar. 2, 2022, from corresponding U.S. Appl. No. 17/161,159.
Office Action, dated Mar. 2, 2022, from corresponding U.S. Appl. No. 17/200,698.
Office Action, dated Mar. 20, 2020, from corresponding U.S. Appl. No. 16/778,709.
Office Action, dated Mar. 21, 2022, from corresponding U.S. Appl. No. 17/571,871.

(56) References Cited

OTHER PUBLICATIONS

Office Action, dated Mar. 22, 2022, from corresponding U.S. Appl. No. 17/187,329.
Office Action, dated Mar. 23, 2020, from corresponding U.S. Appl. No. 16/671,444.
Office Action, dated Mar. 25, 2019, from corresponding U.S. Appl. No. 16/278,121.
Office Action, dated Mar. 25, 2020, from corresponding U.S. Appl. No. 16/701,043.
Office Action, dated Mar. 25, 2020, from corresponding U.S. Appl. No. 16/791,006.
Hodge, et al., "Managing Virtual Data Marts with Metapointer Tables," pp. 1-7 (Year: 2002).
Horrall et al., "Evaluating Risk: IBM's Country Financial Risk and Treasury Risk Scorecards," Jul. 21, 2014, IBM, vol. 58, issue 4, pp. 2:1-2:9 (Year: 2014).
Hu, et al., "Attribute Considerations for Access Control Systems," NIST Special Publication 800-205, Jun. 2019, pp. 1-42 (Year: 2019).
Hu, et al., "Guide to Attribute Based Access Control (ABAC) Definition and Considerations (Draft)," NIST Special Publication 800-162, pp. 1-54 (Year: 2013).
Huang, et al., "A Study on Information Security Management with Personal Data Protection," IEEE, Dec. 9, 2011, pp. 624-630 (Year: 2011).
Huettner, "Digital Risk Management: Protecting Your Privacy, Improving Security, and Preparing for Emergencies," EEE, pp. 136-138 (Year: 2006).
Huner et al., "Towards a Maturity Model for Corporate Data Quality Management", ACM, pp. 231-238, 2009 (Year: 2009).
Hunton & Williams LLP, The Role of Risk Management in Data Protection, Privacy Risk Framework and the Risk-based Approach to Privacy, Centre for Information Policy Leadership, Workshop II, Nov. 23, 2014.
Huo et al., "A Cloud Storage Architecture Model for Data-Intensive Applications," IEEE, pp. 1-4 (Year: 2011).
Imran et al., "Searching in Cloud Object Storage by Using a Metadata Model", IEEE, 2014, retrieved online on Apr. 1, 2020, pp. 121-128. Retrieved from the Internet: URL: https://ieeeexplore.ieee.org/stamp/stamp.jsp? (Year: 2014).
Iordanou et al., "Tracing Cross Border Web Tracking," Oct. 31, 2018, pp. 329-342, ACM (Year: 2018).
Islam, et al., "Mixture Model Based Label Association Techniques for Web Accessibility," ACM, pp. 67-76 (Year: (2010).
Jayasinghe et al., "Matching Facial Images Using Age Related Morphing Changes," ISSRI, 2009, pp. 2901-2907 (Year: 2009).
Jensen, et al., "Temporal Data Management," IEEE Transactions on Knowledge and Data Engineering, vol. 11, No. 1, Jan./Feb. 1999, pp. 36-44 (Year: 1999).
Jiahao Chen et al. "Fairness Under Unawareness: Assessing Disparity when Protected Class is Unobserved," arxiv.org, Cornell University Library, 201 Olin Library Cornell University, Ithaca, NY 14853, Nov. 27, 2018 (Nov. 27, 2018), Section 2, Figure 2. (Year 2018).
Joel Reardon et al., Secure Data Deletion from Persistent Media, ACM, Nov. 4, 2013, retrieved online on Jun. 13, 2019, pp. 271-283. Retrieved from the Internet: URL: http://delivery.acm.org/10.1145/2520000/2516699/p271-reardon.pdf? (Year: 2013).
Jones et al., "AI and the Ethics of Automating Consent," IEEE, pp. 64-72, May 2018 (Year: 2018).
Joonbakhsh et al., "Mining and Extraction of Personal Software Process measures through IDE Interaction logs," ACM/IEEE, 2018, retrieved online on Dec. 2, 2019, pp. 78-81. Retrieved from the Internet: URL: http://delivery.acm.org/10.1145/3200000/3196462/p78-joonbakhsh.pdf? (Year: 2018).
Jun et al., "Scalable Multi-Access Flash Store for Big Data Analytics," ACM, pp. 55-64 (Year: 2014).
Khan et al., "Wrinkles Energy Based Age Estimation Using Discrete Cosine Transform," IEEE, 2015, pp. 1-4 (Year: (2015).
Kirkham, et al., "A Personal Data Store for an Internet of Subjects," IEEE, pp. 92-97 (Year: 2011).
Korba, Larry et al.; "Private Data Discovery for Privacy Compliance in Collaborative Environments"; Cooperative Design, Visualization, and Engineering; Springer Berlin Heidelberg; Sep. 21, 2008; pp. 142-150.
Kristian et al., "Human Facial Age Classification Using Active Shape Module, Geometrical Feature, and Support Vendor Machine on Early Growth Stage," ISICO, 2015, pp. 1-8 (Year: 2015).
Krol, Kat, et al., Control versus Effort in Privacy Warnings for Webforms, ACM, Oct. 24, 2016, pp. 13-23.
Lamb et al., "Role-Based Access Control for Data Service Integration", ACM, pp. 3-11 (Year: 2006).
Lasierra et al., "Data Management in Home Scenarios Using an Autonomic Ontology-Based Approach," IEEE, pp. 94-99 (Year: 2012).
Leadbetter, et al., "Where Big Data Meets Linked Data: Applying Standard Data Models to Environmental Data Streams," IEEE, pp. 2929-2937 (Year: 2016).
Lenzerini et al., "Ontology-based Data Management," ACM, pp. 5-6 (Year: 2011).
Lewis, James et al., "Microservices," Mar. 25, 2014 (Mar. 25, 2014),XP055907494, Retrieved from the Internet: https://martinfowler.com/articles/micr oservices.html. [retrieved on Mar. 31, 2022].
Li, Ninghui, et al., t-Closeness: Privacy Beyond k-Anonymity and l-Diversity, IEEE, 2014, p. 106-115.
Liu et al., "A Novel Approach for Detecting Browser-based Silent Miner," IEEE, pp. 490-497 (Year: 2018).
Liu et al., "Cross-Geography Scientific Data Transferring Trends and Behavior," ACM, pp. 267-278 (Year: 2018).
Liu et al., "Overview on Ontology Mapping and Approach," IEEE, pp. 592-595 (Year: 2011).
Liu, Kun, et al., A Framework for Computing the Privacy Scores of Users in Online Social Networks, ACM Transactions on Knowledge Discovery from Data, vol. 5, No. 1, Article 6, Dec. 2010, 30 pages.
Lu et al., "An HTTP Flooding Detection Method Based on Browser Behavior," IEEE, pp. 1151-1154 (Year: 2006).
Lu, "How Machine Learning Mitigates Racial Bias in the US Housing Market," Available as SSRN 3489519, pp. 1-73, Nov. 2019 (Year: 2019).
Luu, et al., "Combined Local and Holistic Facial Features for Age-Determination," 2010 11th Int. Conf. Control, Automation, Robotics and Vision, Singapore, Dec. 7, 2010, IEEE, pp. 900-904 (Year: 2010).
Maret et al., "Multimedia Information Interchange: Web Forms Meet Data Servers", IEEE, pp. 499-505 (Year: 1999).
Martin, et al., "Hidden Surveillance by Web Sites: Web Bugs in Contemporary Use," Communications of the ACM, vol. 46, No. 12, Dec. 2003, pp. 258-264. Internet source https://doi.org/10.1145/953460.953509. (Year: 2003).
Matte et al., "Do Cookie Banners Respect my Choice ?: Measuring Legal Compliance of Banners from IAB Europe's Transparency and Consent Framework," 2020 IEEE Symposium on Security and Privacy (SP), 2020, pp. 791-809 (Year: 2020).
McGarth et al., "Digital Library Technology for Locating and Accessing Scientific Data", ACM, pp. 188-194 (Year: 1999).
Mesbah et al., "Crawling Ajax-Based Web Applications Through Dynamic Analysis of User Interface State Changes," ACM Transactions on the Web (TWEB) vol. 6, No. 1, Article 3, Mar. 2012, pp. 1-30 (Year: 2012).
Milic et al., "Comparative Analysis of Metadata Models on e-Government Open Data Platforms," IEEE, pp. 119-130 (Year: 2021).
Moscoso-Zea et al., "Datawarehouse Design for Educational Data Mining," IEEE, pp. 1-6 (Year: 2016).
Mudepalli et al., "An efficient data retrieval approach using blowfish encryption on cloud CipherText Retrieval in Cloud Computing" IEEE, pp. 267-271 (Year: 2017).
Mundada et al., "Half-Baked Cookies: Hardening Cookie-Based Authentication for the Modern Web," Proceedings of the 11th ACM on Asia Conference on Computer and Communications Security, 2016, pp. 675-685 (Year: 2016).

(56) References Cited

OTHER PUBLICATIONS

Nemec et al., "Assessment of Query Execution Performance Using Selected Business Intelligence Tools and Experimental Agile Oriented Data Modeling Approach," Sep. 16, 2015, IEEE, pp. 1327-1333. (Year: 2015).
Newman et al., "High Speed Scientific Data Transfers using Software Defined Networking," ACM, pp. 1-9 (Year: 2015).
Newman, "Email Archive Overviews using Subject Indexes", ACM, pp. 652-653, 2002 (Year: 2002).
Nishikawa, Taiji, English Translation of JP 2019154505, Aug. 27, 2019 (Year: 2019).
Advisory Action, dated Jan. 13, 2021, from corresponding U.S. Appl. No. 16/808,493.
Advisory Action, dated Jan. 13, 2021, from corresponding U.S. Appl. No. 16/862,944.
Advisory Action, dated Jan. 13, 2021, from corresponding U.S. Appl. No. 16/862,948.
Advisory Action, dated Jan. 13, 2021, from corresponding U.S. Appl. No. 16/862,952.
Advisory Action, dated Jan. 6, 2021, from corresponding U.S. Appl. No. 16/808,497.
Advisory Action, dated Jun. 19, 2020, from corresponding U.S. Appl. No. 16/595,342.
Advisory Action, dated Jun. 2, 2020, from corresponding U.S. Appl. No. 16/404,491.
Advisory Action, dated May 21, 2020, from corresponding U.S. Appl. No. 16/557,392.
Final Office Action, dated Apr. 1, 2022, from corresponding U.S. Appl. No. 17/370,650.
Final Office Action, dated Apr. 23, 2020, from corresponding U.S. Appl. No. 16/572,347.
Final Office Action, dated Apr. 25, 2022, from corresponding U.S. Appl. No. 17/149,421.
Final Office Action, dated Apr. 27, 2021, from corresponding U.S. Appl. No. 17/068,454.
Final Office Action, dated Apr. 28, 2022, from corresponding U.S. Appl. No. 16/925,550.
Final Office Action, dated Apr. 5, 2022, from corresponding U.S. Appl. No. 17/013,756.
Final Office Action, dated Apr. 7, 2020, from corresponding U.S. Appl. No. 16/595,327.
Final Office Action, dated Aug. 10, 2020, from corresponding U.S. Appl. No. 16/791,589.
Final Office Action, dated Aug. 27, 2021, from corresponding U.S. Appl. No. 17/161,159.
Final Office Action, dated Aug. 28, 2020, from corresponding U.S. Appl. No. 16/410,336.
Final Office Action, dated Aug. 5, 2020, from corresponding U.S. Appl. No. 16/719,071.
Final Office Action, dated Aug. 9, 2021, from corresponding U.S. Appl. No. 17/119,080.
Final Office Action, dated Dec. 10, 2021, from corresponding U.S. Appl. No. 17/187,329.
Final Office Action, dated Dec. 7, 2020, from corresponding U.S. Appl. No. 16/862,956.
Final Office Action, dated Dec. 9, 2019, from corresponding U.S. Appl. No. 16/410,336.
Final Office Action, dated Feb. 19, 2020, from corresponding U.S. Appl. No. 16/404,491.
Final Office Action, dated Feb. 25, 2022, from corresponding U.S. Appl. No. 17/346,586.
Final Office Action, dated Feb. 3, 2020, from corresponding U.S. Appl. No. 16/557,392.
Final Office Action, dated Feb. 8, 2021, from corresponding U.S. Appl. No. 16/927,658.
Final Office Action, dated Jan. 17, 2018, from corresponding U.S. Appl. No. 15/619,278.
Final Office Action, dated Jan. 21, 2020, from corresponding U.S. Appl. No. 16/410,762.
Final Office Action, dated Jan. 23, 2018, from corresponding U.S. Appl. No. 15/619,479.
Final Office Action, dated Jan. 23, 2020, from corresponding U.S. Appl. No. 16/505,430.
Final Office Action, dated Jul. 1, 2022, from corresponding U.S. Appl. No. 17/187,329.
Final Office Action, dated Jul. 21, 2021, from corresponding U.S. Appl. No. 17/151,334.
Final Office Action, dated Jul. 6, 2022, from corresponding U.S. Appl. No. 17/200,698.
Final Office Action, dated Jul. 7, 2021, from corresponding U.S. Appl. No. 17/149,421.
Final Office Action, dated Jun. 10, 2022, from corresponding U.S. Appl. No. 17/161,159.
Final Office Action, dated Jun. 29, 2022, from corresponding U.S. Appl. No. 17/020,275.
Final Office Action, dated Jun. 9, 2022, from corresponding U.S. Appl. No. 17/494,220.
Final Office Action, dated Mar. 21, 2022, from corresponding U.S. Appl. No. 17/373,444.
Final Office Action, dated Mar. 22, 2022, from corresponding U.S. Appl. No. 17/380,485.
Final Office Action, dated Mar. 26, 2021, from corresponding U.S. Appl. No. 17/020,275.
Final Office Action, dated Mar. 5, 2019, from corresponding U.S. Appl. No. 16/055,961.
Final Office Action, dated Mar. 6, 2020, from corresponding U.S. Appl. No. 16/595,342.
Final Office Action, dated May 12, 2022, from corresponding U.S. Appl. No. 17/499,624.
Final Office Action, dated May 14, 2021, from corresponding U.S. Appl. No. 17/013,756.
Final Office Action, dated May 16, 2022, from corresponding U.S. Appl. No. 17/480,377.
Final Office Action, dated May 2, 2022, from corresponding U.S. Appl. No. 17/499,595.
Final Office Action, dated May 24, 2022, from corresponding U.S. Appl. No. 17/499,582.
Final Office Action, dated Nov. 29, 2017, from corresponding U.S. Appl. No. 15/619,237.
Final Office Action, dated Nov. 8, 2022, from corresponding U.S. Appl. No. 17/151,334.
Restriction Requirement, dated Sep. 15, 2020, from corresponding U.S. Appl. No. 16/925,628.
Restriction Requirement, dated Sep. 9, 2019, from corresponding U.S. Appl. No. 16/505,426.
Notice of Allowance, dated Apr. 12, 2017, from corresponding U.S. Appl. No. 15/256,419.
Notice of Allowance, dated Apr. 12, 2022, from corresponding U.S. Appl. No. 17/479,807.
Notice of Allowance, dated Apr. 14, 2022, from corresponding U.S. Appl. No. 17/572,276.
Notice of Allowance, dated Apr. 17, 2020, from corresponding U.S. Appl. No. 16/593,639.
Notice of Allowance, dated Apr. 19, 2021, from corresponding U.S. Appl. No. 17/164,029.
Notice of Allowance, dated Apr. 2, 2019, from corresponding U.S. Appl. No. 16/160,577.
Notice of Allowance, dated Apr. 2, 2021, from corresponding U.S. Appl. No. 17/162,006.
Notice of Allowance, dated Apr. 20, 2022, from corresponding U.S. Appl. No. 17/573,808.
Notice of Allowance, dated Apr. 22, 2021, from corresponding U.S. Appl. No. 17/163,701.
Notice of Allowance, dated Apr. 25, 2018, from corresponding U.S. Appl. No. 15/883,041.
Notice of Allowance, dated Apr. 27, 2022, from corresponding U.S. Appl. No. 17/573,999.
Notice of Allowance, dated Apr. 28, 2021, from corresponding U.S. Appl. No. 17/135,445.
Notice of Allowance, dated Apr. 28, 2021, from corresponding U.S. Appl. No. 17/181,828.

(56) References Cited

OTHER PUBLICATIONS

Notice of Allowance, dated Apr. 28, 2022, from corresponding U.S. Appl. No. 17/592,922.
Notice of Allowance, dated Apr. 28, 2022, from corresponding U.S. Appl. No. 17/670,352.
Notice of Allowance, dated Apr. 29, 2020, from corresponding U.S. Appl. No. 16/700,049.
Notice of Allowance, dated Apr. 29, 2022, from corresponding U.S. Appl. No. 17/387,421.
Notice of Allowance, dated Apr. 30, 2020, from corresponding U.S. Appl. No. 16/565,265.
Notice of Allowance, dated Apr. 30, 2020, from corresponding U.S. Appl. No. 16/820,346.
Notice of Allowance, dated Apr. 30, 2021, from corresponding U.S. Appl. No. 16/410,762.
Notice of Allowance, dated Apr. 4, 2022, from corresponding U.S. Appl. No. 17/493,332.
Notice of Allowance, dated Apr. 4, 2022, from corresponding U.S. Appl. No. 17/572,298.
Notice of Allowance, dated Apr. 8, 2019, from corresponding U.S. Appl. No. 16/228,250.
Notice of Allowance, dated Apr. 8, 2020, from corresponding U.S. Appl. No. 16/791,348.
Notice of Allowance, dated Apr. 9, 2020, from corresponding U.S. Appl. No. 16/791,075.
Notice of Allowance, dated Aug. 10, 2020, from corresponding U.S. Appl. No. 16/671,444.
Notice of Allowance, dated Aug. 10, 2020, from corresponding U.S. Appl. No. 16/788,633.
Notice of Allowance, dated Aug. 12, 2020, from corresponding U.S. Appl. No. 16/719,488.
Notice of Allowance, dated Aug. 12, 2021, from corresponding U.S. Appl. No. 16/881,832.
Notice of Allowance, dated Aug. 14, 2018, from corresponding U.S. Appl. No. 15/989,416.
Notice of Allowance, dated Aug. 18, 2017, from corresponding U.S. Appl. No. 15/619,455.
Notice of Allowance, dated Aug. 20, 2019, from corresponding U.S. Appl. No. 16/241,710.
Notice of Allowance, dated Aug. 22, 2022, from corresponding U.S. Appl. No. 17/499,595.
Notice of Allowance, dated Aug. 24, 2018, from corresponding U.S. Appl. No. 15/619,479.
Notice of Allowance, dated Aug. 26, 2019, from corresponding U.S. Appl. No. 16/443,374.
Notice of Allowance, dated Aug. 26, 2020, from corresponding U.S. Appl. No. 16/808,503.
Notice of Allowance, dated Aug. 28, 2019, from corresponding U.S. Appl. No. 16/278,120.
Notice of Allowance, dated Aug. 3, 2022, from corresponding U.S. Appl. No. 17/668,714.
Notice of Allowance, dated Aug. 30, 2018, from corresponding U.S. Appl. No. 15/996,208.
Notice of Allowance, dated Aug. 31, 2021, from corresponding U.S. Appl. No. 17/326,901.
Notice of Allowance, dated Aug. 4, 2021, from corresponding U.S. Appl. No. 16/895,278.
Notice of Allowance, dated Aug. 4, 2022, from corresponding U.S. Appl. No. 17/670,349.
Notice of Allowance, dated Aug. 7, 2020, from corresponding U.S. Appl. No. 16/901,973.
Notice of Allowance, dated Aug. 9, 2018, from corresponding U.S. Appl. No. 15/882,989.
Notice of Allowance, dated Aug. 9, 2021, from corresponding U.S. Appl. No. 16/881,699.
Notice of Allowance, dated Aug. 9, 2022, from corresponding U.S. Appl. No. 17/832,313.
Notice of Allowance, dated Dec. 10, 2018, from corresponding U.S. Appl. No. 16/105,602.
Notice of Allowance, dated Dec. 11, 2019, from corresponding U.S. Appl. No. 16/278,122.
Notice of Allowance, dated Dec. 11, 2019, from corresponding U.S. Appl. No. 16/593,634.
Notice of Allowance, dated Dec. 12, 2017, from corresponding U.S. Appl. No. 15/169,643.
Notice of Allowance, dated Dec. 12, 2017, from corresponding U.S. Appl. No. 15/619,212.
Notice of Allowance, dated Dec. 12, 2017, from corresponding U.S. Appl. No. 15/619,382.
Notice of Allowance, dated Dec. 13, 2019, from corresponding U.S. Appl. No. 16/512,033.
Notice of Allowance, dated Dec. 13, 2021, from corresponding U.S. Appl. No. 16/908,081.
Notice of Allowance, dated Dec. 13, 2021, from corresponding U.S. Appl. No. 17/347,853.
Notice of Allowance, dated Dec. 15, 2020, from corresponding U.S. Appl. No. 16/989,086.
Notice of Allowance, dated Dec. 16, 2019, from corresponding U.S. Appl. No. 16/505,461.
Notice of Allowance, dated Dec. 17, 2020, from corresponding U.S. Appl. No. 17/034,772.
Notice of Allowance, dated Dec. 18, 2019, from corresponding U.S. Appl. No. 16/659,437.
Notice of Allowance, dated Dec. 2, 2021, from corresponding U.S. Appl. No. 16/901,654.
Notice of Allowance, dated Dec. 23, 2019, from corresponding U.S. Appl. No. 16/656,835.
Notice of Allowance, dated Dec. 23, 2020, from corresponding U.S. Appl. No. 17/068,557.
Notice of Allowance, dated Dec. 3, 2019, from corresponding U.S. Appl. No. 16/563,749.
Notice of Allowance, dated Dec. 30, 2021, from corresponding U.S. Appl. No. 16/938,520.
Notice of Allowance, dated Dec. 31, 2018, from corresponding U.S. Appl. No. 16/159,634.
Notice of Allowance, dated Dec. 31, 2019, from corresponding U.S. Appl. No. 16/404,399.
Notice of Allowance, dated Dec. 4, 2019, from corresponding U.S. Appl. No. 16/594,670.
Notice of Allowance, dated Dec. 5, 2017, from corresponding U.S. Appl. No. 15/633,703.
Notice of Allowance, dated Dec. 6, 2017, from corresponding U.S. Appl. No. 15/619,451.
Notice of Allowance, dated Dec. 6, 2017, from corresponding U.S. Appl. No. 15/619,459.
Notice of Allowance, dated Dec. 7, 2020, from corresponding U.S. Appl. No. 16/817,136.
Notice of Allowance, dated Dec. 8, 2021, from corresponding U.S. Appl. No. 17/397,472.
Notice of Allowance, dated Dec. 9, 2019, from corresponding U.S. Appl. No. 16/565,261.
Notice of Allowance, dated Dec. 9, 2020, from corresponding U.S. Appl. No. 16/404,491.
Notice of Allowance, dated Feb. 1, 2022, from corresponding U.S. Appl. No. 17/346,509.
Notice of Allowance, dated Feb. 10, 2020, from corresponding U.S. Appl. No. 16/552,765.
Notice of Allowance, dated Feb. 11, 2021, from corresponding U.S. Appl. No. 17/086,732.
Notice of Allowance, dated Feb. 12, 2020, from corresponding U.S. Appl. No. 16/572,182.
Notice of Allowance, dated Feb. 13, 2019, from corresponding U.S. Appl. No. 16/041,563.
Notice of Allowance, dated Feb. 14, 2019, from corresponding U.S. Appl. No. 16/226,272.
Notice of Allowance, dated Feb. 14, 2022, from corresponding U.S. Appl. No. 16/623,157.
Notice of Allowance, dated Feb. 19, 2019, from corresponding U.S. Appl. No. 16/159,632.
Notice of Allowance, dated Feb. 19, 2021, from corresponding U.S. Appl. No. 16/832,451.

(56) References Cited

OTHER PUBLICATIONS

Notice of Allowance, dated Feb. 22, 2022, from corresponding U.S. Appl. No. 17/535,065.
Notice of Allowance, dated Feb. 24, 2021, from corresponding U.S. Appl. No. 17/034,355.
Notice of Allowance, dated Feb. 24, 2021, from corresponding U.S. Appl. No. 17/068,198.
Notice of Allowance, dated Feb. 24, 2021, from corresponding U.S. Appl. No. 17/101,106.
Notice of Allowance, dated Feb. 24, 2021, from corresponding U.S. Appl. No. 17/101,253.
Notice of Allowance, dated Feb. 24, 2022, from corresponding U.S. Appl. No. 17/234,205.
Notice of Allowance, dated Feb. 24, 2022, from corresponding U.S. Appl. No. 17/549,170.
Notice of Allowance, dated Feb. 25, 2020, from corresponding U.S. Appl. No. 16/714,355.
Notice of Allowance, dated Feb. 25, 2021, from corresponding U.S. Appl. No. 17/106,469.
Notice of Allowance, dated Feb. 26, 2021, from corresponding U.S. Appl. No. 17/139,650.
Notice of Allowance, dated Feb. 27, 2019, from corresponding U.S. Appl. No. 16/041,468.
Notice of Allowance, dated Feb. 27, 2019, from corresponding U.S. Appl. No. 16/226,290.
Notice of Allowance, dated Feb. 3, 2021, from corresponding U.S. Appl. No. 16/827,039.
Notice of Allowance, dated Feb. 3, 2021, from corresponding U.S. Appl. No. 17/068,558.
Notice of Allowance, dated Feb. 4, 2022, from corresponding U.S. Appl. No. 17/520,272.
Final Office Action, dated Mar. 16, 2022, from corresponding U.S. Appl. No. 17/838,939.
Final Office Action, dated Mar. 16, 2023, from corresponding U.S. Appl. No. 17/670,341.
Final Office Action, dated Mar. 16, 2023, from corresponding U.S. Appl. No. 17/836,454.
Final Office Action, dated Mar. 2, 2023, from corresponding U.S. Appl. No. 17/836,865.
Final Office Action, dated Mar. 3, 2023, from corresponding U.S. Appl. No. 17/670,354.
Final Office Action, dated Mar. 9, 2023, from corresponding U.S. Appl. No. 17/679,734.
Notice of Allowance, dated Mar. 6, 2023, from corresponding U.S. Appl. No. 17/836,430.
Office Action, dated Feb. 2, 2023, from corresponding U.S. Appl. No. 17/510,001.
Office Action, dated Jan. 19, 2023, from corresponding U.S. Appl. No. 17/205,165.
Office Action, dated Jan. 31, 2023, from corresponding U.S. Appl. No. 17/836,872.
Office Action, dated Mar. 27, 2019, from corresponding U.S. Appl. No. 16/278,120.
Office Action, dated Mar. 30, 2018, from corresponding U.S. Appl. No. 15/894,890.
Office Action, dated Mar. 30, 2018, from corresponding U.S. Appl. No. 15/896,790.
Office Action, dated Mar. 30, 2021, from corresponding U.S. Appl. No. 17/151,399.
Office Action, dated Mar. 4, 2019, from corresponding U.S. Appl. No. 16/237,083.
Office Action, dated May 12, 2022, from corresponding U.S. Appl. No. 17/509,974.
Office Action, dated May 14, 2020, from corresponding U.S. Appl. No. 16/808,497.
Office Action, dated May 14, 2020, from corresponding U.S. Appl. No. 16/808,503.
Office Action, dated May 15, 2020, from corresponding U.S. Appl. No. 16/808,493.
Office Action, dated May 16, 2018, from corresponding U.S. Appl. No. 15/882,989.
Office Action, dated May 16, 2022, from corresponding U.S. Appl. No. 17/679,750.
Office Action, dated May 17, 2019, from corresponding U.S. Appl. No. 16/277,539.
Office Action, dated May 18, 2021, from corresponding U.S. Appl. No. 17/196,570.
Office Action, dated May 2, 2018, from corresponding U.S. Appl. No. 15/894,809.
Office Action, dated May 2, 2019, from corresponding U.S. Appl. No. 16/104,628.
Office Action, dated May 24, 2022, from corresponding U.S. Appl. No. 17/674,187.
Office Action, dated May 29, 2020, from corresponding U.S. Appl. No. 16/862,944.
Office Action, dated May 29, 2020, from corresponding U.S. Appl. No. 16/862,948.
Office Action, dated May 29, 2020, from corresponding U.S. Appl. No. 16/863,226.
Office Action, dated May 5, 2020, from corresponding U.S. Appl. No. 16/410,336.
Office Action, dated May 9, 2022, from corresponding U.S. Appl. No. 16/840,943.
Office Action, dated Nov. 1, 2017, from corresponding U.S. Appl. No. 15/169,658.
Office Action, dated Nov. 10, 2021, from corresponding U.S. Appl. No. 17/380,485.
Office Action, dated Nov. 10, 2021, from corresponding U.S. Appl. No. 17/409,999.
Office Action, dated Nov. 10, 2022, from corresponding U.S. Appl. No. 17/670,341.
Office Action, dated Nov. 12, 2020, from corresponding U.S. Appl. No. 17/034,355.
Office Action, dated Nov. 12, 2020, from corresponding U.S. Appl. No. 17/034,772.
Office Action, dated Nov. 12, 2021, from corresponding U.S. Appl. No. 17/346,586.
Office Action, dated Nov. 12, 2021, from corresponding U.S. Appl. No. 17/373,444.
Office Action, dated Nov. 15, 2018, from corresponding U.S. Appl. No. 16/059,911.
Office Action, dated Nov. 15, 2019, from corresponding U.S. Appl. No. 16/552,758.
Office Action, dated Nov. 15, 2022, from corresponding U.S. Appl. No. 17/200,698.
Office Action, dated Nov. 16, 2021, from corresponding U.S. Appl. No. 17/370,650.
Office Action, dated Nov. 16, 2021, from corresponding U.S. Appl. No. 17/486,350.
Office Action, dated Nov. 18, 2019, from corresponding U.S. Appl. No. 16/560,885.
Office Action, dated Nov. 18, 2019, from corresponding U.S. Appl. No. 16/560,889.
Office Action, dated Nov. 18, 2019, from corresponding U.S. Appl. No. 16/572,347.
Office Action, dated Nov. 18, 2022, from corresponding U.S. Appl. No. 17/836,454.
Office Action, dated Nov. 19, 2019, from corresponding U.S. Appl. No. 16/595,342.
Office Action, dated Nov. 20, 2019, from corresponding U.S. Appl. No. 16/595,327.
Office Action, dated Nov. 23, 2018, from corresponding U.S. Appl. No. 16/042,673.
Office Action, dated Nov. 23, 2021, from corresponding U.S. Appl. No. 17/013,756.
Office Action, dated Nov. 24, 2020, from corresponding U.S. Appl. No. 16/925,628.
Office Action, dated Nov. 26, 2021, from corresponding U.S. Appl. No. 16/925,550.
Office Action, dated Nov. 29, 2022, from corresponding U.S. Appl. No. 17/838,939.

(56) References Cited

OTHER PUBLICATIONS

Office Action, dated Nov. 4, 2021, from corresponding U.S. Appl. No. 17/491,906.
Office Action, dated Nov. 8, 2021, from corresponding U.S. Appl. No. 16/872,130.
Office Action, dated Oct. 10, 2018, from corresponding U.S. Appl. No. 16/041,563.
Office Action, dated Oct. 10, 2018, from corresponding U.S. Appl. No. 16/055,083.
Office Action, dated Oct. 10, 2018, from corresponding U.S. Appl. No. 16/055,944.
Notice of Allowance, dated Oct. 17, 2019, from corresponding U.S. Appl. No. 16/563,741.
Notice of Allowance, dated Oct. 18, 2022, from corresponding U.S. Appl. No. 16/840,943.
Notice of Allowance, dated Oct. 21, 2019, from corresponding U.S. Appl. No. 16/404,405.
Notice of Allowance, dated Oct. 21, 2020, from corresponding U.S. Appl. No. 16/834,812.
Notice of Allowance, dated Oct. 22, 2021, from corresponding U.S. Appl. No. 17/346,847.
Notice of Allowance, dated Oct. 25, 2022, from corresponding U.S. Appl. No. 17/711,331.
Notice of Allowance, dated Oct. 3, 2019, from corresponding U.S. Appl. No. 16/511,700.
Notice of Allowance, dated Sep. 1, 2021, from corresponding U.S. Appl. No. 17/196,570.
Notice of Allowance, dated Sep. 1, 2021, from corresponding U.S. Appl. No. 17/222,556.
Notice of Allowance, dated Sep. 1, 2022, from corresponding U.S. Appl. No. 17/480,377.
Notice of Allowance, dated Sep. 12, 2019, from corresponding U.S. Appl. No. 16/512,011.
Notice of Allowance, dated Sep. 12, 2022, from corresponding U.S. Appl. No. 17/674,187.
Notice of Allowance, dated Sep. 13, 2018, from corresponding U.S. Appl. No. 15/894,809.
Notice of Allowance, dated Sep. 13, 2018, from corresponding U.S. Appl. No. 15/894,890.
Notice of Allowance, dated Sep. 14, 2021, from corresponding U.S. Appl. No. 16/808,497.
Notice of Allowance, dated Sep. 16, 2020, from corresponding U.S. Appl. No. 16/915,097.
Notice of Allowance, dated Sep. 17, 2020, from corresponding U.S. Appl. No. 16/863,226.
Notice of Allowance, dated Sep. 18, 2018, from corresponding U.S. Appl. 15/,894,819.
Notice of Allowance, dated Sep. 18, 2018, from corresponding U.S. Appl. No. 16/041,545.
Notice of Allowance, dated Sep. 18, 2020, from corresponding U.S. Appl. No. 16/812,795.
Notice of Allowance, dated Sep. 2, 2022, from corresponding U.S. Appl. No. 17/380,485.
Notice of Allowance, dated Sep. 23, 2020, from corresponding U.S. Appl. No. 16/811,793.
Notice of Allowance, dated Sep. 23, 2021, from corresponding U.S. Appl. No. 17/068,454.
Notice of Allowance, dated Sep. 24, 2021, from corresponding U.S. Appl. No. 17/334,939.
Notice of Allowance, dated Sep. 25, 2020, from corresponding U.S. Appl. No. 16/983,536.
Notice of Allowance, dated Sep. 27, 2017, from corresponding U.S. Appl. No. 15/626,052.
Notice of Allowance, dated Sep. 27, 2021, from corresponding U.S. Appl. No. 17/222,523.
Notice of Allowance, dated Sep. 28, 2018, from corresponding U.S. Appl. No. 16/041,520.
Notice of Allowance, dated Sep. 28, 2022, from corresponding U.S. Appl. No. 17/509,974.
Notice of Allowance, dated Sep. 28, 2022, from corresponding U.S. Appl. No. 17/689,683.
Notice of Allowance, dated Sep. 29, 2021, from corresponding U.S. Appl. No. 17/316,179.
Notice of Allowance, dated Sep. 30, 2022, from corresponding U.S. Appl. No. 17/867,068.
Notice of Allowance, dated Sep. 4, 2018, from corresponding U.S. Appl. No. 15/883,041.
Notice of Allowance, dated Sep. 4, 2020, from corresponding U.S. Appl. No. 16/808,500.
Notice of Allowance, dated Sep. 4, 2020, from corresponding U.S. Appl. No. 16/901,662.
Notice of Allowance, dated Sep. 9, 2021, from corresponding U.S. Appl. No. 17/334,909.
Agrawal et al., "Securing Electronic Health Records Without Impeding the Flow of Information," International Journal of Medical Informatics 76, 2007, pp. 471-479 (Year: 2007).
Bang et al., "Building an Effective and Efficient Continuous Web Application Security Program," 2016 International Conference on Cyber Security Situational Awareness, Data Analytics and Assessment (CyberSA), London, 2016, pp. 1-4 (Year: 2016).
Binns, et al., "Data Havens, or Privacy Sans Frontières? A Study of International Personal Data Transfers," ACM, pp. 273-274 (Year: 2002).
Czeskis et al., "Lightweight Server Support for Browser-based CSRF Protection," Proceedings of the 22nd International Conference on World Wide Web, 2013, pp. 273-284 (Year: 2013).
Falahrastegar, Marjan, et al., Tracking Personal Identifiers Across the Web, Medical Image Computing and Computer-Assisted Intervention—Miccai 2015, 18th International Conference, Oct. 5, 2015, Munich, Germany.
Friedman et al., "Informed Consent in the Mozilla Browser: Implementing Value-Sensitive Design," Proceedings of the 35th Annual Hawaii International Conference on System Sciences, 2002, IEEE, pp. 1-10 (Year: 2002).
Ghiglieri, Marco et al. .; Personal DLP for Facebook, 2014 IEEE International Conference on Pervasive Computing and Communication Workshops (Percom Workshops); IEEE; Mar. 24, 2014; pp. 629-634.
Gilda, et al., "Blockchain for Student Data Privacy and Consent," 2018 International Conference on Computer Communication and Informatics, Jan. 4-6, 2018, IEEE, pp. 1-5 (Year: 2018).
Halevy, et al., "Schema Mediation in Peer Data Management Systems," IEEE, Proceedings of the 19th International Conference on Data Engineering, 2003, pp. 505-516 (Year: 2003).
IAPP, Daily Dashboard, PIA Tool Stocked With New Templates for DPI, Infosec, International Association of Privacy Professionals, Apr. 22, 2014.
International Search Report, dated Apr. 12, 2022, from corresponding International Application No. PCT/US2022/016735.
International Search Report, dated Aug. 15, 2017, from corresponding International Application No. PCT/US2017/036919.
Notice of Allowance, dated Jun. 16, 2022, from corresponding U.S. Appl. No. 17/119,080.
Notice of Allowance, dated Jun. 17, 2020, from corresponding U.S. Appl. No. 16/656,895.
Notice of Allowance, dated Jun. 18, 2019, from corresponding U.S. Appl. No. 16/410,566.
Notice of Allowance, dated Jun. 19, 2018, from corresponding U.S. Appl. No. 15/894,890.
Notice of Allowance, dated Jun. 19, 2019, from corresponding U.S. Appl. No. 16/042,673.
Notice of Allowance, dated Jun. 19, 2019, from corresponding U.S. Appl. No. 16/055,984.
Notice of Allowance, dated Jun. 2, 2021, from corresponding U.S. Appl. No. 17/198,581.
Notice of Allowance, dated Jun. 2, 2022, from corresponding U.S. Appl. No. 17/493,290.
Notice of Allowance, dated Jun. 21, 2019, from corresponding U.S. Appl. No. 16/404,439.
Notice of Allowance, dated Jun. 22, 2020, from corresponding U.S. Appl. No. 16/791,337.

(56) References Cited

OTHER PUBLICATIONS

Notice of Allowance, dated Jun. 23, 2022, from corresponding U.S. Appl. No. 17/588,645.
Notice of Allowance, dated Jun. 27, 2018, from corresponding U.S. Appl. No. 15/882,989.
Notice of Allowance, dated Jun. 29, 2022, from corresponding U.S. Appl. No. 17/675,118.
Notice of Allowance, dated Jun. 4, 2019, from corresponding U.S. Appl. No. 16/159,566.
Notice of Allowance, dated Jun. 5, 2019, from corresponding U.S. Appl. No. 16/220,899.
Notice of Allowance, dated Jun. 5, 2019, from corresponding U.S. Appl. No. 16/357,260.
Notice of Allowance, dated Jun. 6, 2018, from corresponding U.S. Appl. No. 15/875,570.
Notice of Allowance, dated Jun. 6, 2019, from corresponding U.S. Appl. No. 16/159,628.
Notice of Allowance, dated Jun. 7, 2021, from corresponding U.S. Appl. No. 17/099,270.
Notice of Allowance, dated Jun. 8, 2020, from corresponding U.S. Appl. No. 16/712,104.
Notice of Allowance, dated Jun. 8, 2022, from corresponding U.S. Appl. No. 17/722,551.
Notice of Allowance, dated Mar. 1, 2018, from corresponding U.S. Appl. No. 15/853,674.
Notice of Allowance, dated Mar. 1, 2019, from corresponding U.S. Appl. No. 16/059,911.
Notice of Allowance, dated Mar. 10, 2021, from corresponding U.S. Appl. No. 16/925,628.
Notice of Allowance, dated Mar. 10, 2021, from corresponding U.S. Appl. No. 17/128,666.
Notice of Allowance, dated Mar. 13, 2019, from corresponding U.S. Appl. No. 16/055,083.
Notice of Allowance, dated Mar. 14, 2019, from corresponding U.S. Appl. No. 16/055,944.
Notice of Allowance, dated Mar. 16, 2020, from corresponding U.S. Appl. No. 16/778,704.
Notice of Allowance, dated Mar. 16, 2021, from corresponding U.S. Appl. No. 17/149,380.
Notice of Allowance, dated Mar. 16, 2022, from corresponding U.S. Appl. No. 17/486,350.
Notice of Allowance, dated Mar. 17, 2020, from corresponding U.S. Appl. No. 16/560,885.
Notice of Allowance, dated Mar. 18, 2020, from corresponding U.S. Appl. No. 16/560,963.
Notice of Allowance, dated Mar. 19, 2021, from corresponding U.S. Appl. No. 17/013,757.
Notice of Allowance, dated Mar. 2, 2018, from corresponding U.S. Appl. No. 15/858,802.
Notice of Allowance, dated Mar. 2, 2022, from corresponding U.S. Appl. No. 16/872,130.
Notice of Allowance, dated Mar. 2, 2022, from corresponding U.S. Appl. No. 17/535,098.
Notice of Allowance, dated Mar. 21, 2022, from corresponding U.S. Appl. No. 17/366,754.
Notice of Allowance, dated Mar. 22, 2022, from corresponding U.S. Appl. No. 17/475,244.
Notice of Allowance, dated Mar. 22, 2022, from corresponding U.S. Appl. No. 17/504,102.
Notice of Allowance, dated Mar. 24, 2020, from corresponding U.S. Appl. No. 16/552,758.
Notice of Allowance, dated Mar. 25, 2019, from corresponding U.S. Appl. No. 16/054,780.
Notice of Allowance, dated Mar. 26, 2020, from corresponding U.S. Appl. No. 16/560,889.
Notice of Allowance, dated Mar. 26, 2020, from corresponding U.S. Appl. No. 16/578,712.
Notice of Allowance, dated Mar. 27, 2019, from corresponding U.S. Appl. No. 16/226,280.
Notice of Allowance, dated Mar. 28, 2022, from corresponding U.S. Appl. No. 17/499,609.
Notice of Allowance, dated Mar. 29, 2019, from corresponding U.S. Appl. No. 16/055,998.
Notice of Allowance, dated Mar. 31, 2020, from corresponding U.S. Appl. No. 16/563,744.
Notice of Allowance, dated Mar. 31, 2021, from corresponding U.S. Appl. No. 17/013,758.
Notice of Allowance, dated Mar. 31, 2021, from corresponding U.S. Appl. No. 17/162,205.
Notice of Allowance, dated Mar. 31, 2022, from corresponding U.S. Appl. No. 17/476,209.
Notice of Allowance, dated Mar. 4, 2022, from corresponding U.S. Appl. No. 17/409,999.
Notice of Allowance, dated May 1, 2020, from corresponding U.S. Appl. No. 16/586,202.
Notice of Allowance, dated May 11, 2020, from corresponding U.S. Appl. No. 16/786,196.
Notice of Allowance, dated May 11, 2022, from corresponding U.S. Appl. No. 17/395,759.
Notice of Allowance, dated May 13, 2021, from corresponding U.S. Appl. No. 17/101,915.
Notice of Allowance, dated May 18, 2022, from corresponding U.S. Appl. No. 17/670,354.
Notice of Allowance, dated May 19, 2020, from corresponding U.S. Appl. No. 16/505,430.
Notice of Allowance, dated May 19, 2020, from corresponding U.S. Appl. No. 16/808,496.
Notice of Allowance, dated May 20, 2020, from corresponding U.S. Appl. No. 16/707,762.
Notice of Allowance, dated May 21, 2018, from corresponding U.S. Appl. No. 15/896,790.
Notice of Allowance, dated May 25, 2022, from corresponding U.S. Appl. No. 16/872,031.
Notice of Allowance, dated May 26, 2021, from corresponding U.S. Appl. No. 16/808,493.
Notice of Allowance, dated May 26, 2021, from corresponding U.S. Appl. No. 16/865,874.
Notice of Allowance, dated May 26, 2021, from corresponding U.S. Appl. No. 17/199,514.
Notice of Allowance, dated May 27, 2020, from corresponding U.S. Appl. No. 16/820,208.
Notice of Allowance, dated May 27, 2021, from corresponding U.S. Appl. No. 16/927,658.
Notice of Allowance, dated May 27, 2021, from corresponding U.S. Appl. No. 17/198,757.
Notice of Allowance, dated May 27, 2022, from corresponding U.S. Appl. No. 17/543,546.
Notice of Allowance, dated May 28, 2019, from corresponding U.S. Appl. No. 16/277,568.
Notice of Allowance, dated May 28, 2020, from corresponding U.S. Appl. No. 16/799,279.
Notice of Allowance, dated May 28, 2021, from corresponding U.S. Appl. No. 16/862,944.
Notice of Allowance, dated May 31, 2022, from corresponding U.S. Appl. No. 17/679,715.
Notice of Allowance, dated May 5, 2017, from corresponding U.S. Appl. No. 15/254,901.
Notice of Allowance, dated May 5, 2020, from corresponding U.S. Appl. No. 16/563,754.
Notice of Allowance, dated May 6, 2022, from corresponding U.S. Appl. No. 17/666,886.
Notice of Allowance, dated May 7, 2020, from corresponding U.S. Appl. No. 16/505,426.
Notice of Allowance, dated May 7, 2021, from corresponding U.S. Appl. No. 17/194,662.
Notice of Allowance, dated Nov. 14, 2019, from corresponding U.S. Appl. No. 16/436,616.
Notice of Allowance, dated Nov. 16, 2021, from corresponding U.S. Appl. No. 17/491,871.
Notice of Allowance, dated Nov. 16, 2022, from corresponding U.S. Appl. No. 17/860,255.

(56) References Cited

OTHER PUBLICATIONS

Notice of Allowance, dated Nov. 2, 2018, from corresponding U.S. Appl. No. 16/054,762.
Notice of Allowance, dated Nov. 21, 2022, from corresponding U.S. Appl. No. 17/831,713.
Notice of Allowance, dated Nov. 22, 2021, from corresponding U.S. Appl. No. 17/383,889.
Notice of Allowance, dated Nov. 22, 2022, from corresponding U.S. Appl. No. 17/828,953.
Notice of Allowance, dated Nov. 23, 2020, from corresponding U.S. Appl. No. 16/791,589.
Notice of Allowance, dated Nov. 24, 2020, from corresponding U.S. Appl. No. 17/027,019.
Notice of Allowance, dated Nov. 25, 2020, from corresponding U.S. Appl. No. 17/019,771.
Notice of Allowance, dated Nov. 26, 2019, from corresponding U.S. Appl. No. 16/563,735.
Notice of Allowance, dated Nov. 27, 2019, from corresponding U.S. Appl. No. 16/570,712.
Notice of Allowance, dated Nov. 27, 2019, from corresponding U.S. Appl. No. 16/577,634.
Notice of Allowance, dated Nov. 3, 2020, from corresponding U.S. Appl. No. 16/719,071.
Notice of Allowance, dated Nov. 5, 2019, from corresponding U.S. Appl. No. 16/560,965.
Notice of Allowance, dated Nov. 7, 2017, from corresponding U.S. Appl. No. 15/671,073.
Notice of Allowance, dated Nov. 8, 2018, from corresponding U.S. Appl. No. 16/042,642.
Notice of Allowance, dated Nov. 9, 2020, from corresponding U.S. Appl. No. 16/595,342.
Notice of Allowance, dated Nov. 9, 2022, from corresponding U.S. Appl. No. 17/187,329.
Notice of Allowance, dated Oct. 1, 2021, from corresponding U.S. Appl. No. 17/340,395.
Notice of Allowance, dated Oct. 10, 2019, from corresponding U.S. Appl. No. 16/277,539.
Notice of Allowance, dated Oct. 17, 2018, from corresponding U.S. Appl. No. 15/896,790.
Notice of Allowance, dated Oct. 17, 2018, from corresponding U.S. Appl. No. 16/054,672.
Niu, et al., "Achieving Data Truthfulness and Privacy Preservation in Data Markets", IEEE Transactions on Knowledge and Data Engineering, IEEE Service Centre, Los Alamitos, CA, US, vol. 31, No. 1, Jan. 1, 2019, pp. 105-119 (Year 2019).
Notice of Filing Date for Petition for Post-Grant Review of related U.S. Pat. No. 9,691,090 dated Apr. 12, 2018.
Nouwens et al., "Dark Patterns after the GDPR: Scraping Consent Pop-ups and Demonstrating their Influence," ACM, pp. 1-13, Apr. 25, 2020 (Year: 2020).
O'Keefe et al., "Privacy-Preserving Data Linkage Protocols," Proceedings of the 2004 ACM Workshop on Privacy in the Electronic Society, 2004, pp. 94-102 (Year: 2004).
Olenski, Steve, For Consumers, Data is s Matter of Trust, CMO Network, Apr. 18, 2016, https://www.forbes.com/sites/steveolenski/2016/04/18/for-consumers-data-is-a-matter-of-trust/#2e48496278b3.
Ozdikis et al., "Tool Support for Transformation from an OWL Ontology to an HLA Object Model," ACM, pp. 1-6 (Year: 2010).
Paes, "Student Research Abstract: Automatic Detection of Cross-Browser Incompatibilities using Machine Learning and Screenshot Similarity," ACM, pp. 697-698, Apr. 3, 2017 (Year: 2017).
Pearson, et al., "A Model-Based Privacy Compliance Checker," IJEBR, vol. 5, No. 2, pp. 63-83, 2009, Nov. 21, 2008. [Online]. Available: http://dx.doi.org/10.4018/jebr.2009040104 (Year: 2008).
Pechenizkiy et al., "Process Mining Online Assessment Data," Educational Data Mining, pp. 279-288 (Year: 2009).
Petition for Post-Grant Review of related U.S. Pat. No. 9,691,090 dated Mar. 27, 2018.

Petrie et al., "The Relationship between Accessibility and Usability of Websites", ACM, pp. 397-406 (Year: 2007).
Ping et al., "Wide Area Placement of Data Replicas for Fast and Highly Available Data Access," ACM, pp. 1-8 (Year: 2011).
Popescu-Zeletin, "The Data Access and Transfer Support in a Local Heterogeneous Network (HMINET)", IEEE, pp. 147-152 (Year: 1979).
Porter, "De-Identified Data and Third Party Data Mining: The Risk of Re-Identification of Personal Information," Shidler JL Com. & Tech. 5, 2008, pp. 1-9 (Year: 2008).
Pretorius, et al., "Attributing Users Based on Web Browser History," 2017 IEEE Conference on Application, Information and Network Security (AINS), 2017, pp. 69-74 (Year: 2017).
Preuveneers et al., "Access Control with Delegated Authorization Policy Evaluation for Data-Driven Microservice Workflows," Future Internet 2017, MDPI, pp. 1-21 (Year: 2017).
Qiu, et al., "Design and Application of Data Integration Platform Based on Web Services and XML," IEEE, pp. 253-256 (Year: 2016).
Qu et al., "Metadata Type System: Integrate Presentation, Data Models and Extraction to Enable Exploratory Browsing Interfaces," ACM, pp. 107-116 (Year: 2014).
Radu, et al., "Analyzing Risk Evaluation Frameworks and Risk Assessment Methods," IEEE, Dec. 12, 2020, pp. 1-6 (Year 2020).
Rakers, "Managing Professional and Personal Sensitive Information," ACM, pp. 9-13, Oct. 24-27, 2010 (Year: 2010).
Reardon et al., User-Level Secure Deletion on Log-Structured File Systems, ACM, 2012, retrieved online on Apr. 22, 2021, pp. 1-11. Retrieved from the Internet: URL: http://citeseerx.ist.psu.edu/viewdoc/download; sessionid=450713515DC7F19F8ED09AE961D4B60E. (Year: 2012).
Regulation (Eu) 2016/679, "On the protection of natural persons with regard to the processing of personal data and on the free movement of such data, and repealing Directive 95/46/EC (General Data Protection Regulation)," Official Journal of the European Union, May 4, 2016, pp. L 119/1-L 119/88 (Year: 2016).
Roesner et al., "Detecting and Defending Against Third-Party Tracking on the Web," 9th USENIX Symposium on Networked Systems Design and Implementation, Apr. 11, 2013, pp. 1-14, ACM (Year: 2013).
Rozepz, "What is Google Privacy Checkup? Everything You Need to Know," Tom's Guide web post, Apr. 26, 2018, pp. 1-11 (Year: 2018).
Sachinopoulou et al., "Ontology-Based Approach for Managing Personal Health and Wellness Information," IEEE, pp. 1802-1805 (Year: 2007).
Salim et al., "Data Retrieval and Security using Lightweight Directory Access Protocol", IEEE, pp. 685-688 (Year: 2009).
Sanchez-Rola et al., "Can I Opt Out Yet ?: GDPR and the Global Illusion of Cookie Control," Proceedings of the 2019 ACM Asia Conference on Computer and Communications Security, 2019, pp. 340-351 (Year: 2019).
Santhisree, et al., "Web Usage Data Clustering Using Dbscan Algorithm and Set Similarities," IEEE, pp. 220-224 (Year: 2010).
Sanzo et al., "Analytical Modeling of Lock-Based Concurrency Control with Arbitrary Transaction Data Access Patterns," ACM, pp. 69-78 (Year: 2010).
Sarkar et al., "Towards Enforcement of the EU GDPR: Enabling Data Erasure," 2018 IEEE Confs on Internet of Things, Green Computing and Communications, Cyber, Physical and Social Computing, Smart Data, Blockchain, Computer and Information Technology, Congress on Cybermatics, 2018, pp. 222-229, IEEE (Year: 2018).
Schwartz, Edward J., et al., 2010 IEEE Symposium on Security and Privacy: All You Ever Wanted to Know About Dynamic Analysis and forward Symbolic Execution (but might have been afraid to ask), Carnegie Mellon University, IEEE Computer Society, 2010, p. 317-331.
Sedinic et al., "Security Risk Management in Complex Organization," May 29, 2015, IEEE, pp. 1331-1337 (Year: (2015).
Shahriar et al., "A Model-Based Detection of Vulnerable and Malicious Browser Extensions," IEEE, pp. 198-207 (Year: 2013).

(56) References Cited

OTHER PUBLICATIONS

Shankar et al., "Doppleganger: Better Browser Privacy Without the Bother," Proceedings of the 13th ACM Conference on Computer and Communications Security; [ACM Conference on Computer and Communications Security], New York, NY : ACM, US, Oct. 30, 2006, pp. 154-167 (Year: 2006).
Shulz et al., "Generative Data Models for Validation and Evaluation of Visualization Techniques," ACM, pp. 1-13 (Year: 2016).
Singh, et al., "A Metadata Catalog Service for Data Intensive Applications," ACM, pp. 1-17 (Year: 2003).
Sjosten et al., "Discovering Browser Extensions via Web Accessible Resources," ACM, pp. 329-336, Mar. 22, 2017 (Year: 2017).
Slezak, et al., "Brighthouse: An Analytic Data Warehouse for Ad-hoc Queries," ACM, pp. 1337-1345 (Year: 2008).
Soceanu, et al., "Managing the Privacy and Security of eHealth Data," May 29, 2015, IEEE, pp. 1-8 (Year: 2015).
Srinivasan et al., "Descriptive Data Analysis of File Transfer Data," ACM, pp. 1-8 (Year: 2014).
Stack Overflow, "Is there a way to force a user to scroll to the bottom of a div?," Stack Overflow, pp. 1-11, Nov. 2013. [Online]. Available: https://stackoverflow.com/questions/2745935/is-there-a-way-to-force-a-user-to-scroll-to-the-bottom-of-a-div (Year: 2013).
Stern, Joanna, "iPhone Privacy Is Broken . . . and Apps Are to Blame", The Wall Street Journal, wsj.com, May 31, 2019.
Strodl, et al., "Personal & SOHO Archiving," Vienna University of Technology, Vienna, Austria, JCDL '08, Jun. 16-20, 2008, Pittsburgh, Pennsylvania, USA, pp. 115-123 (Year: 2008).
Sukumar et al., "Review on Modern Data Preprocessing Techniques in Web Usage Mining (WUM)," IEEE, 2016, pp. 64-69 (Year: 2016).
Symantec, Symantex Data Loss Prevention—Discover, monitor, and protect confidential data; 2008; Symantec Corporation; http://www.mssuk.com/images/Symantec%2014552315_IRC_BR_DLP_03.09_sngl.pdf.
Tanasa et al., "Advanced Data Preprocessing for Intersites Web Usage Mining," IEEE, Mar. 2004, pp. 59-65 (Year: 2004).
The Cookie Collective, Optanon Cookie Policy Generator, The Cookie Collective, Year 2016, http://web.archive.org/web/20160324062743/https:/optanon.com/.
Thomas et al., "MooM—A Prototype Framework for Management of Ontology Mappings," IEEE, pp. 548-555 (Year: 2011).
TRUSTe Announces General Availability of Assessment Manager for Enterprises to Streamline Data Privacy Management with Automation, PRNewswire, Mar. 4, 2015.
Tsai et al., "Determinants of Intangible Assets Value: The Data Mining Approach," Knowledge Based System, pp. 67-77 http://www.elsevier.com/locate/knosys (Year: 2012).
International Search Report, dated Aug. 21, 2017, from corresponding International Application No. PCT/US2017/036914.
International Search Report, dated Aug. 29, 2017, from corresponding International Application No. PCT/US2017/036898.
International Search Report, dated Aug. 8, 2017, from corresponding International Application No. PCT/US2017/036889.
International Search Report, dated Aug. 8, 2017, from corresponding International Application No. PCT/US2017/036890.
International Search Report, dated Aug. 8, 2017, from corresponding International Application No. PCT/US2017/036893.
International Search Report, dated Aug. 8, 2017, from corresponding International Application No. PCT/US2017/036901.
International Search Report, dated Aug. 8, 2017, from corresponding International Application No. PCT/US2017/036913.
International Search Report, dated Aug. 8, 2017, from corresponding International Application No. PCT/US2017/036920.
International Search Report, dated Dec. 14, 2018, from corresponding International Application No. PCT/US2018/045296.
International Search Report, dated Dec. 22, 2021, from corresponding International Application No. PCT/US2021/051217.
International Search Report, dated Feb. 11, 2022, from corresponding International Application No. PCT/US2021/053518.
International Search Report, dated Feb. 14, 2022, from corresponding International Application No. PCT/US2021/058274.
International Search Report, dated Jan. 14, 2019, from corresponding International Application No. PCT/US2018/046949.
International Search Report, dated Jan. 5, 2022, from corresponding International Application No. PCT/US2021/050497.
International Search Report, dated Jan. 7, 2019, from corresponding International Application No. PCT/US2018/055772.
International Search Report, dated Jun. 1, 2022, from corresponding International Application No. PCT/US2022/016930.
International Search Report, dated Jun. 21, 2017, from corresponding International Application No. PCT/US2017/025600.
International Search Report, dated Jun. 22, 2022, from corresponding International Application No. PCT/US2022/019358.
International Search Report, dated Jun. 24, 2022, from corresponding International Application No. PCT/US2022/019882.
International Search Report, dated Jun. 6, 2017, from corresponding International Application No. PCT/US2017/025605.
International Search Report, dated Jun. 6, 2017, from corresponding International Application No. PCT/US2017/025611.
International Search Report, dated Mar. 14, 2019, from corresponding International Application No. PCT/US2018/055736.
International Search Report, dated Mar. 18, 2022, from corresponding International Application No. PCT/US2022/013733.
International Search Report, dated Mar. 4, 2019, from corresponding International Application No. PCT/US2018/055773.
International Search Report, dated Mar. 4, 2019, from corresponding International Application No. PCT/US2018/055774.
International Search Report, dated May 12, 2022, from corresponding International Application No. PCT/US2022/015929.
International Search Report, dated May 17, 2022, from corresponding International Application No. PCT/US2022/015241.
International Search Report, dated May 19, 2022, from corresponding International Application No. PCT/US2022/015637.
International Search Report, dated Nov. 12, 2021, from corresponding International Application No. PCT/US2021/043481.
International Search Report, dated Nov. 19, 2018, from corresponding International Application No. PCT/US2018/046939.
International Search Report, dated Nov. 3, 2021, from corresponding International Application No. PCT/US2021/040893.
International Search Report, dated Nov. 3, 2021, from corresponding International Application No. PCT/US2021/044910.
International Search Report, dated Oct. 11, 2018, from corresponding International Application No. PCT/US2018/043975.
International Search Report, dated Oct. 11, 2018, from corresponding International Application No. PCT/US2018/043976.
International Search Report, dated Oct. 11, 2018, from corresponding International Application No. PCT/US2018/043977.
International Search Report, dated Oct. 11, 2018, from corresponding International Application No. PCT/US2018/044026.
International Search Report, dated Oct. 11, 2018, from corresponding International Application No. PCT/US2018/045240.
International Search Report, dated Oct. 12, 2017, from corresponding International Application No. PCT/US2017/036888.
International Search Report, dated Oct. 12, 2018, from corresponding International Application No. PCT/US2018/044046.
International Search Report, dated Oct. 16, 2018, from corresponding International Application No. PCT/US2018/045243.
International Search Report, dated Oct. 18, 2018, from corresponding International Application No. PCT/US2018/045249.
International Search Report, dated Oct. 20, 2017, from corresponding International Application No. PCT/US2017/036917.
International Search Report, dated Oct. 3, 2017, from corresponding International Application No. PCT/US2017/036912.
International Search Report, dated Sep. 1, 2017, from corresponding International Application No. PCT/US2017/036896.
International Search Report, dated Sep. 12, 2018, from corresponding International Application No. PCT/US2018/037504.
International Search Report, dated Sep. 15, 2021, from corresponding International Application No. PCT/US2021/033631.
Invitation to Pay Additional Search Fees, dated Aug. 10, 2017, from corresponding International Application No. PCT/US2017/036912.

(56) References Cited

OTHER PUBLICATIONS

Invitation to Pay Additional Search Fees, dated Aug. 10, 2017, from corresponding International Application No. PCT/US2017/036917.
Invitation to Pay Additional Search Fees, dated Aug. 24, 2017, from corresponding International Application No. PCT/US2017/036888.
Invitation to Pay Additional Search Fees, dated Jan. 18, 2019, from corresponding International Application No. PCT/US2018/055736.
Notice of Allowance, dated Feb. 8, 2022, from corresponding U.S. Appl. No. 17/342,153.
Notice of Allowance, dated Jan. 1, 2021, from corresponding U.S. Appl. No. 17/026,727.
Notice of Allowance, dated Jan. 11, 2022, from corresponding U.S. Appl. No. 17/371,350.
Notice of Allowance, dated Jan. 12, 2022, from corresponding U.S. Appl. No. 17/334,948.
Notice of Allowance, dated Jan. 12, 2022, from corresponding U.S. Appl. No. 17/463,775.
Notice of Allowance, dated Jan. 14, 2020, from corresponding U.S. Appl. No. 16/277,715.
Notice of Allowance, dated Jan. 15, 2021, from corresponding U.S. Appl. No. 17/030,714.
Notice of Allowance, dated Jan. 18, 2018, from corresponding U.S. Appl. No. 15/619,478.
Notice of Allowance, dated Jan. 18, 2019 from corresponding U.S. Appl. No. 16/159,635.
Notice of Allowance, dated Jan. 2, 2020, from corresponding U.S. Appl. No. 16/410,296.
Notice of Allowance, dated Jan. 23, 2018, from corresponding U.S. Appl. No. 15/619,251.
Notice of Allowance, dated Jan. 24, 2022, from corresponding U.S. Appl. No. 17/340,699.
Notice of Allowance, dated Jan. 25, 2021, from corresponding U.S. Appl. No. 16/410,336.
Notice of Allowance, dated Jan. 26, 2018, from corresponding U.S. Appl. No. 15/619,469.
Notice of Allowance, dated Jan. 26, 2022, from corresponding U.S. Appl. No. 17/491,906.
Notice of Allowance, dated Jan. 29, 2020, from corresponding U.S. Appl. No. 16/278,119.
Notice of Allowance, dated Jan. 31, 2022, from corresponding U.S. Appl. No. 17/472,948.
Notice of Allowance, dated Jan. 5, 2022, from corresponding U.S. Appl. No. 17/475,241.
Notice of Allowance, dated Jan. 6, 2021, from corresponding U.S. Appl. No. 16/595,327.
Notice of Allowance, dated Jan. 6, 2022, from corresponding U.S. Appl. No. 17/407,765.
Notice of Allowance, dated Jan. 7, 2022, from corresponding U.S. Appl. No. 17/222,725.
Notice of Allowance, dated Jan. 8, 2020, from corresponding U.S. Appl. No. 16/600,879.
Notice of Allowance, dated Jul. 10, 2019, from corresponding U.S. Appl. No. 16/237,083.
Notice of Allowance, dated Jul. 10, 2019, from corresponding U.S. Appl. No. 16/403,358.
Notice of Allowance, dated Jul. 12, 2019, from corresponding U.S. Appl. No. 16/278,121.
Notice of Allowance, dated Jul. 14, 2020, from corresponding U.S. Appl. No. 16/701,043.
Notice of Allowance, dated Jul. 15, 2020, from corresponding U.S. Appl. No. 16/791,006.
Notice of Allowance, dated Jul. 16, 2020, from corresponding U.S. Appl. No. 16/901,979.
Notice of Allowance, dated Jul. 17, 2019, from corresponding U.S. Appl. No. 16/055,961.
Notice of Allowance, dated Jul. 17, 2020, from corresponding U.S. Appl. No. 16/778,709.
Notice of Allowance, dated Jul. 19, 2021, from corresponding U.S. Appl. No. 17/306,252.
Notice of Allowance, dated Jul. 20, 2022, from corresponding U.S. Appl. No. 16/938,509.
Notice of Allowance, dated Jul. 21, 2020, from corresponding U.S. Appl. No. 16/557,392.
Notice of Allowance, dated Jul. 23, 2019, from corresponding U.S. Appl. No. 16/220,978.
Notice of Allowance, dated Jul. 26, 2019, from corresponding U.S. Appl. No. 16/409,673.
Notice of Allowance, dated Jul. 26, 2021, from corresponding U.S. Appl. No. 17/151,399.
Notice of Allowance, dated Jul. 26, 2021, from corresponding U.S. Appl. No. 17/207,316.
Notice of Allowance, dated Jul. 27, 2022, from corresponding U.S. Appl. No. 17/679,750.
Notice of Allowance, dated Jul. 29, 2022, from corresponding U.S. Appl. No. 17/670,341.
Notice of Allowance, dated Jul. 31, 2019, from corresponding U.S. Appl. No. 16/221,153.
Notice of Allowance, dated Jul. 7, 2022, from corresponding U.S. Appl. No. 17/571,871.
Notice of Allowance, dated Jul. 8, 2021, from corresponding U.S. Appl. No. 17/201,040.
Notice of Allowance, dated Jun. 1, 2020, from corresponding U.S. Appl. No. 16/813,321.
Notice of Allowance, dated Jun. 11, 2021, from corresponding U.S. Appl. No. 16/862,948.
Notice of Allowance, dated Jun. 11, 2021, from corresponding U.S. Appl. No. 16/862,952.
Notice of Allowance, dated Jun. 11, 2021, from corresponding U.S. Appl. No. 17/216,436.
Notice of Allowance, dated Jun. 12, 2019, from corresponding U.S. Appl. No. 16/278,123.
Notice of Allowance, dated Jun. 12, 2019, from corresponding U.S. Appl. No. 16/363,454.
Notice of Allowance, dated Jun. 14, 2022, from corresponding U.S. Appl. No. 17/679,734.
Notice of Allowance, dated Jun. 16, 2020, from corresponding U.S. Appl. No. 16/798,818.
Castro et al., "Creating Lightweight Ontologies for Dataset Description," IEEE, pp. 1-4 (Year: 2014).
Cerpzone, "How to Access Data on Data Archival Storage and Recovery System", https://www.saj.usace.army.mil/Portals/44/docs/Environmental/Lake%20O%20Watershed/15February2017/How%20To%20Access%20Model%20Data%20on%20DASR.pdf?ver=2017-02-16-095535-633, Feb. 16, 2017.
Cha et al., "A Data-Driven Security Risk Assessment Scheme for Personal Data Protection," IEEE, pp. 50510-50517 (Year: 2018).
Cha, et al., "Process-Oriented Approach for Validating Asset Value for Evaluating Information Security Risk," IEEE, Aug. 31, 2009, pp. 379-385 (Year: 2009).
Chang et al., "A Ranking Approach for Human Age Estimation Based on Face Images," IEEE, 2010, pp. 3396-3399 (Year: 2010).
Chapados et al., "Scoring Models for Insurance Risk Sharing Pool Optimization," 2008, IEEE, pp. 97-105 (Year: 2008).
Cheng, Raymond, et al., "Radiatus: A Shared-Nothing Server-Side Web Architecture," Proceedings of the Seventh ACM Symposium on Cloud Computing, Oct. 5, 2016, pp. 237-250 (Year: 2016).
Choi et al., "A Survey on Ontology Mapping," ACM, pp. 34-41 (Year: 2006).
Choi et al., "Retrieval Effectiveness of Table of Contents and Subject Headings," ACM, pp. 103-104 (Year: 2007).
Chowdhury et al., "A System Architecture for Subject-Centric Data Sharing", ACM, pp. 1-10 (Year: 2018).
Chowdhury et al., "Managing Data Transfers in Computer Clusters with Orchestra," ACM, pp. 98-109 (Year: 2011).
Civili et al., "Mastro Studio: Managing Ontology-Based Data Access Applications," ACM, pp. 1314-1317, Aug. 26-30, 2013 (Year: 2013).
Cruz et al., "Interactive User Feedback in Ontology Matching Using Signature Vectors," IEEE, pp. 1321-1324 (Year: (2012).
Cudre-Mauroux, "ESWC 2008 Ph.D. Symposium," The ESWC 2008 Ph. D. Symposium is sponsored by the Okkam project (http://fp7.okkam.org/), MIT, pp. 1-92 (Year: 2008).

(56) References Cited

OTHER PUBLICATIONS

Cui et al., "Domain Ontology Management Environment," IEEE, pp. 1-9 (Year: 2000).
Decision Regarding Institution of Post-Grant Review in Case PGR2018-00056 for U.S. Pat. No. 9,691,090 B1, Oct. 11, 2018.
Degeling et al., "We Value Your Privacy . . . Now Take Some Cookies: Measuring the GDPRs Impact on Web Privacy," arxiv.org, Cornell University Library, 201 Olin Library Cornell University, Ithaca, NY 14853, Aug. 15, 2018, pp. 1-15 (Year: 2019).
Dimou et al., "Machine-Interpretable Dataset and Service Descriptions for Heterogeneous Data Access and Retrieval", ACM, pp. 145-152 (Year: 2015).
Dokholyan et al., "Regulatory and Ethical Considerations for Linking Clinical and Administrative Databases," American Heart Journal 157.6 (2009), pp. 971-982 (Year: 2009).
Dowling, "Auditing Global HR Compliance," published May 23, 2014, retrieved from https://www.shrm.org/resourcesandtools/hr-topics/ global-hr/pages/auditing-global-hr-compliance.aspx Jul. 2, 2022 (Year: 2014).
Dunkel et al., "Data Organization and Access for Efficient Data Mining", IEEE, pp. 522-529 (Year: 1999).
Edinger et al., "Age and Gender Estimation of Unfiltered Faces," IEEE, 2014, pp. 2170-2179 (Year: 2014).
Emerson, et al., "A Data Mining Driven Risk Profiling Method for Road Asset Management," ACM, pp. 1267-1275 (Year: 2013).
Enck, William, et al., TaintDroid: An Information-Flow Tracking System for Realtime Privacy Monitoring on Smartphones, ACM Transactions on Computer Systems, vol. 32, No. 2, Article 5, Jun. 2014, p. 5:1-5:29.
Everypixel Team, "A New Age Recognition API Detects the Age of People on Photos," May 20, 2019, pp. 1-5 (Year: 2019).
Falbo et al., "An Ontological Approach to Domain Engineering," ACM, pp. 351-358 (Year: 2002).
Fan et al., "Intrusion Investigations with Data-hiding for Computer Log-file Forensics," IEEE, pp. 1-6 (Year: 2010).
Final Written Decision Regarding Post-Grant Review in Case PGR2018-00056 for U.S. Pat. No. 9,691,090 B1, Oct. 10, 2019.
Francis, Andre, Business Mathematics and Statistics, South-Western Cengage Learning, 2008, Sixth Edition.
Friedman et al., "Data Mining with Differential Privacy," ACM, Jul. 2010, pp. 493-502 (Year: 2010).
Frikken, Keith B., et al., Yet Another Privacy Metric for Publishing Micro-data, Miami University, Oct. 27, 2008, p. 117-121.
Fung et al., "Discover Information and Knowledge from Websites using an Integrated Summarization and Visualization Framework", IEEE, pp. 232-235 (Year: 2010).
Gajare et al., "Improved Automatic Feature Selection Approach for Health Risk Prediction," Feb. 16, 2018, IEEE, pp. 816-819 (Year: 2018).
Geko et al., "An Ontology Capturing the Interdependence of the General Data Protection Regulation (GDPR) and Information Security," ACM, pp. 1-6, Nov. 15-16, 2018 (Year: 2018).
Golab, et al., "Issues in Data Stream Management," ACM, SIGMOD Record, vol. 32, No. 2, Jun. 2003, pp. 5-14 (Year: 2003).
Golfarelli et al., "Beyond Data Warehousing: What's Next in Business Intelligence?," ACM, pp. 1-6 (Year: 2004).
Gonçalves et al., "The XML Log Standard for Digital Libraries: Analysis, Evolution, and Deployment," IEEE, pp. 312-314 (Year: 2003).
Goni, Kyriaki, "Deletion Process_Only you can see my history: Investigating Digital Privacy, Digital Oblivion, and Control on Personal Data Through an Interactive Art Installation," ACM, 2016, retrieved online on Oct. 3, 2019, pp. 324-333. Retrieved from the Internet URL: http://delivery.acm.org/10.1145/2920000/291.
Gowadia et al., "RDF Metadata for XML Access Control," ACM, pp. 31-48 (Year: 2003).
Grolinger, et al., "Data Management in Cloud Environments: NoSQL and NewSQL Data Stores," Journal of Cloud Computing: Advances, Systems and Applications, pp. 1-24 (Year: 2013).
Guo, et al., "OPAL: A Passe-partout for Web Forms," ACM, pp. 353-356 (Year: 2012).
Gustarini, et al., "Evaluation of Challenges in Human Subject Studies "In-the-Wild" Using Subjects' Personal Smartphones," ACM, pp. 1447-1456 (Year: 2013).
HacigümüS, Hakan, et al., Executing SQL over Encrypted Data in the Database-Service-Provider Model, ACM, Jun. 4, 2002, pp. 216-227.
Han et al., "Demographic Estimation from Face Images: Human vs. Machine Performance," IEEE, 2015, pp. 1148-1161 (Year: 2015).
Hauch, et al., "Information Intelligence: Metadata for Information Discovery, Access, and Integration," ACM, pp. 793-798 (Year: 2005).
He et al., "A Crowdsourcing Framework for Detecting of Cross-Browser Issues in Web Application," ACM, pp. 1-4, Nov. 6, 2015 (Year: 2015).
Heil et al., "Downsizing and Rightsizing," https://web.archive.org/web/20130523153311/https://www.referenceforbusiness.com/management/De-Ele/Downsizing-and-Rightsizing.html (Year: 2013).
Hernandez, et al., "Data Exchange with Data-Metadata Translations," ACM, pp. 260-273 (Year: 2008).
Hinde, "A Model to Assess Organisational Information Privacy Maturity Against the Protection of Personal Information Act" Dissertation University of Cape Town 2014, pp. 1-121 (Year: 2014).
Invitation to Pay Additional Search Fees, dated Jan. 7, 2019, from corresponding International Application No. PCT/US2018/055773.
Invitation to Pay Additional Search Fees, dated Jan. 8, 2019, from corresponding International Application No. PCT/US2018/055774.
Invitation to Pay Additional Search Fees, dated Oct. 23, 2018, from corresponding International Application No. PCT/US2018/045296.
Lebeau, Franck, et al., "Model-Based Vulnerability Testing for Web Applications," 2013 IEEE Sixth International Conference on Software Testing, Verification and Validation Workshops, pp. 445-452, IEEE, 2013 (Year: 2013).
Liu, Yandong, et al., "Finding the Right Consumer: Optimizing for Conversion in Display Advertising Campaigns," Proceedings of the Fifth ACM International Conference on Web Search and Data Mining, Feb. 2, 2012, pp. 473-428 (Year: 2012).
Lizar et al., "Usable Consents: Tracking and Managing Use of Personal Data with a Consent Transaction Receipt," Proceedings of the 2014 ACM International Joint Conference on Pervasive and Ubiquitous Computing: Adjunct Publication, 2014, pp. 647-652 (Year: 2014).
Ma Ziang, et al., "LibRadar: Fast and Accurate Detection of Third-Party Libraries in Android Apps," 2016 IEEE/ACM 38th IEEE International Conference on Software Engineering Companion (ICSE-C), ACM, May 14, 2016, pp. 653-656, DOI: http://dx.doi.org/10.1145/2889160.2889178, p. 653, r.col, par. 1-3; figure 3 (Year: 2016).
Mandal, et al., "Automated Age Prediction Using Wrinkles Features of Facial Images and Neural Network," International Journal of Emerging Engineering Research and Technology, vol. 5, Issue 2, Feb. 2017, pp. 12-20 (Year: 2017).
Moiso et al., "Towards a User-Centric Personal Data Ecosystem The Role of the Bank of Individual's Data," 2012 16th International Conference on Intelligence in Next Generation Networks, Berlin, 2012, pp. 202-209 (Year: 2012).
Pfeifle, Sam, The Privacy Advisor, IAPP and AvePoint Launch New Free PIA Tool, International Association of Privacy Professionals, Mar. 5, 2014.
Pfeifle, Sam, The Privacy Advisor, IAPP Heads to Singapore with APIA Template in Tow, International Association of Privacy Professionals, https://iapp.org/news/a/iapp-heads-to-singapore-with-apia-template_in_tow/, Mar. 28, 2014, p. 1-3.
Qing-Jiang et al., "The (P, a, K) Anonymity Model for Privacy Protection of Personal Information in the Social Networks," 2011 6th IEEE Joint International Information Technology and Artificial Intelligence Conference, vol. 2 IEEE, 2011, pp. 420-423 (Year: 2011).
Srivastava, Agrima, et al., Measuring Privacy Leaks in Online Social Networks, International Conference on Advances in Computing, Communications and Informatics (ICACCI), 2013.

(56) References Cited

OTHER PUBLICATIONS

Tanwar, et al., "Live Forensics Analysis: Violations of Business Security Policy," 2014 International Conference on Contemporary Computing and Informatics (IC31), 2014, pp. 971-976 (Year: 2014).
Thuraisingham, "Security Issues for the Semantic Web," Proceedings 27th Annual International Computer Software and Applications Conference, COMPSAC 2003, Dallas, TX, USA, 2003, pp. 633-638 (Year: 2003).
Written Opinion of the International Searching Authority, dated Jun. 6, 2017, from corresponding International Application No. PCT/US2017/025611.
Written Opinion of the International Searching Authority, dated Apr. 12, 2022, from corresponding International Application No. PCT/US2022/016735.
Written Opinion of the International Searching Authority, dated Aug. 15, 2017, from corresponding International Application No. PCT/US2017/036919.
Written Opinion of the International Searching Authority, dated Aug. 21, 2017, from corresponding International Application No. PCT/US2017/036914.
Written Opinion of the International Searching Authority, dated Aug. 29, 2017, from corresponding International Application No. PCT/US2017/036898.
Written Opinion of the International Searching Authority, dated Aug. 8, 2017, from corresponding International Application No. PCT/US2017/036889.
Written Opinion of the International Searching Authority, dated Aug. 8, 2017, from corresponding International Application No. PCT/US2017/036890.
Written Opinion of the International Searching Authority, dated Aug. 8, 2017, from corresponding International Application No. PCT/US2017/036893.
Written Opinion of the International Searching Authority, dated Aug. 8, 2017, from corresponding International Application No. PCT/US2017/036901.
Written Opinion of the International Searching Authority, dated Aug. 8, 2017, from corresponding International Application No. PCT/US2017/036913.
Written Opinion of the International Searching Authority, dated Aug. 8, 2017, from corresponding International Application No. PCT/US2017/036920.
Written Opinion of the International Searching Authority, dated Dec. 14, 2018, from corresponding International Application No. PCT/US2018/045296.
Written Opinion of the International Searching Authority, dated Dec. 22, 2021, from corresponding International Application No. PCT/US2021/051217.
Written Opinion of the International Searching Authority, dated Feb. 11, 2022, from corresponding International Application No. PCT/US2021/053518.
Written Opinion of the International Searching Authority, dated Feb. 14, 2022, from corresponding International Application No. PCT/US2021/058274.
Written Opinion of the International Searching Authority, dated Jan. 14, 2019, from corresponding International Application No. PCT/US2018/046949.
Written Opinion of the International Searching Authority, dated Jan. 5, 2022, from corresponding International Application No. PCT/US2021/050497.
Written Opinion of the International Searching Authority, dated Jan. 7, 2019, from corresponding International Application No. PCT/US2018/055772.
Written Opinion of the International Searching Authority, dated Jun. 1, 2022, from corresponding International Application No. PCT/US2022/016930.
Written Opinion of the International Searching Authority, dated Jun. 21, 2017, from corresponding International Application No. PCT/US2017/025600.
Written Opinion of the International Searching Authority, dated Jun. 22, 2022, from corresponding International Application No. PCT/US2022/019358.
Written Opinion of the International Searching Authority, dated Jun. 24, 2022, from corresponding International Application No. PCT/US2022/019882.
Written Opinion of the International Searching Authority, dated Jun. 6, 2017, from corresponding International Application No. PCT/US2017/025605.
Written Opinion of the International Searching Authority, dated Mar. 14, 2019, from corresponding International Application No. PCT/US2018/055736.
Written Opinion of the International Searching Authority, dated Mar. 18, 2022, from corresponding International Application No. PCT/US2022/013733.
Written Opinion of the International Searching Authority, dated Mar. 4, 2019, from corresponding International Application No. PCT/US2018/055773.
Written Opinion of the International Searching Authority, dated Mar. 4, 2019, from corresponding International Application No. PCT/US2018/055774.
Written Opinion of the International Searching Authority, dated May 12, 2022, from corresponding International Application No. PCT/US2022/015929.
Written Opinion of the International Searching Authority, dated May 17, 2022, from corresponding International Application No. PCT/US2022/015241.
Written Opinion of the International Searching Authority, dated May 19, 2022, from corresponding International Application No. PCT/US2022/015637.
Written Opinion of the International Searching Authority, dated Nov. 12, 2021, from corresponding International Application No. PCT/US2021/043481.
Written Opinion of the International Searching Authority, dated Nov. 19, 2018, from corresponding International Application No. PCT/US2018/046939.
Written Opinion of the International Searching Authority, dated Nov. 3, 2021, from corresponding International Application No. PCT/US2021/040893.
Written Opinion of the International Searching Authority, dated Nov. 3, 2021, from corresponding International Application No. PCT/US2021/044910.
Written Opinion of the International Searching Authority, dated Oct. 11, 2018, from corresponding International Application No. PCT/US2018/043975.
Office Action, dated Oct. 12, 2021, from corresponding U.S. Appl. No. 17/346,509.
Office Action, dated Oct. 14, 2020, from corresponding U.S. Appl. No. 16/927,658.
Office Action, dated Oct. 15, 2018, from corresponding U.S. Appl. No. 16/054,780.
Office Action, dated Oct. 15, 2021, from corresponding U.S. Appl. No. 16/908,081.
Office Action, dated Oct. 16, 2019, from corresponding U.S. Appl. No. 16/557,392.
Office Action, dated Oct. 16, 2020, from corresponding U.S. Appl. No. 16/808,489.
Office Action, dated Oct. 23, 2018, from corresponding U.S. Appl. No. 16/055,961.
Office Action, dated Oct. 25, 2022, from corresponding U.S. Appl. No. 17/836,865.
Office Action, dated Oct. 26, 2018, from corresponding U.S. Appl. No. 16/041,468.
Office Action, dated Oct. 27, 2022, from corresponding U.S. Appl. No. 17/161,159.
Office Action, dated Oct. 8, 2019, from corresponding U.S. Appl. No. 16/552,765.
Office Action, dated Sep. 1, 2017, from corresponding U.S. Appl. No. 15/619,459.
Office Action, dated Sep. 11, 2017, from corresponding U.S. Appl. No. 15/619,375.
Office Action, dated Sep. 11, 2017, from corresponding U.S. Appl. No. 15/619,478.

(56) References Cited

OTHER PUBLICATIONS

Office Action, dated Sep. 15, 2021, from corresponding U.S. Appl. No. 16/623,157.
Office Action, dated Sep. 16, 2019, from corresponding U.S. Appl. No. 16/277,715.
Office Action, dated Sep. 16, 2022, from corresponding U.S. Appl. No. 17/306,438.
Office Action, dated Sep. 19, 2017, from corresponding U.S. Appl. No. 15/671,073.
Office Action, dated Sep. 2, 2022, from corresponding U.S. Appl. No. 17/499,624.
Office Action, dated Sep. 22, 2017, from corresponding U.S. Appl. No. 15/619,278.
Office Action, dated Sep. 24, 2021, from corresponding U.S. Appl. No. 17/342,153.
Office Action, dated Sep. 4, 2020, from corresponding U.S. Appl. No. 16/989,086.
Office Action, dated Sep. 5, 2017, from corresponding U.S. Appl. No. 15/619,469.
Office Action, dated Sep. 6, 2017, from corresponding U.S. Appl. No. 15/619,479.
Office Action, dated Sep. 7, 2017, from corresponding U.S. Appl. No. 15/633,703.
Office Action, dated Sep. 8, 2017, from corresponding U.S. Appl. No. 15/619,251.
Office Action, dated Sep. 8, 2022, from corresponding U.S. Appl. No. 17/850,244.
Ex Parte Quayle Action, dated May 10, 2022, from corresponding U.S. Appl. No. 17/668,714.
Restriction Requirement, dated Apr. 10, 2019, from corresponding U.S. Appl. No. 16/277,715.
Restriction Requirement, dated Apr. 12, 2022, from corresponding U.S. Appl. No. 17/584,187.
Restriction Requirement, dated Apr. 13, 2020, from corresponding U.S. Appl. No. 16/817,136.
Restriction Requirement, dated Apr. 24, 2019, from corresponding U.S. Appl. No. 16/278,122.
Restriction Requirement, dated Aug. 7, 2019, from corresponding U.S. Appl. No. 16/410,866.
Restriction Requirement, dated Aug. 9, 2019, from corresponding U.S. Appl. No. 16/404,399.
Restriction Requirement, dated Dec. 17, 2021, from corresponding U.S. Appl. No. 17/475,244.
Restriction Requirement, dated Dec. 31, 2018, from corresponding U.S. Appl. No. 15/169,668.
Restriction Requirement, dated Dec. 9, 2019, from corresponding U.S. Appl. No. 16/565,395.
Restriction Requirement, dated Jan. 18, 2017, from corresponding U.S. Appl. No. 15/256,430.
Restriction Requirement, dated Jul. 28, 2017, from corresponding U.S. Appl. No. 15/169,658.
Restriction Requirement, dated Jun. 15, 2021, from corresponding U.S. Appl. No. 17/187,329.
Restriction Requirement, dated Jun. 15, 2021, from corresponding U.S. Appl. No. 17/222,556.
Restriction Requirement, dated Jun. 9, 2021, from corresponding U.S. Appl. No. 17/222,725.
Restriction Requirement, dated May 5, 2020, from corresponding U.S. Appl. No. 16/808,489.
Restriction Requirement, dated Nov. 10, 2021, from corresponding U.S. Appl. No. 17/366,754.
Restriction Requirement, dated Nov. 14, 2022, from corresponding U.S. Appl. No. 17/836,872.
Restriction Requirement, dated Nov. 15, 2019, from corresponding U.S. Appl. No. 16/586,202.
Restriction Requirement, dated Nov. 21, 2016, from corresponding U.S. Appl. No. 15/254,901.
Restriction Requirement, dated Nov. 5, 2019, from corresponding U.S. Appl. No. 16/563,744.
Restriction Requirement, dated Oct. 17, 2018, from corresponding U.S. Appl. No. 16/055,984.
Restriction Requirement, dated Oct. 6, 2021, from corresponding U.S. Appl. No. 17/340,699.
Written Opinion of the International Searching Authority, dated Oct. 11, 2018, from corresponding International Application No. PCT/US2018/043976.
Written Opinion of the International Searching Authority, dated Oct. 11, 2018, from corresponding International Application No. PCT/US2018/043977.
Written Opinion of the International Searching Authority, dated Oct. 11, 2018, from corresponding International Application No. PCT/US2018/044026.
Written Opinion of the International Searching Authority, dated Oct. 11, 2018, from corresponding International Application No. PCT/US2018/045240.
Written Opinion of the International Searching Authority, dated Oct. 12, 2017, from corresponding International Application No. PCT/US2017/036888.
Written Opinion of the International Searching Authority, dated Oct. 12, 2018, from corresponding International Application No. PCT/US2018/044046.
Written Opinion of the International Searching Authority, dated Oct. 16, 2018, from corresponding International Application No. PCT/US2018/045243.
Written Opinion of the International Searching Authority, dated Oct. 18, 2018, from corresponding International Application No. PCT/US2018/045249.
Written Opinion of the International Searching Authority, dated Oct. 20, 2017, from corresponding International Application No. PCT/US2017/036917.
Written Opinion of the International Searching Authority, dated Oct. 3, 2017, from corresponding International Application No. PCT/US2017/036912.
Written Opinion of the International Searching Authority, dated Sep. 1, 2017, from corresponding International Application No. PCT/US2017/036896.
Written Opinion of the International Searching Authority, dated Sep. 12, 2018, from corresponding International Application No. PCT/US2018/037504.
Written Opinion of the International Searching Authority, dated Sep. 15, 2021, from corresponding International Application No. PCT/US2021/033631.
Abdullah et al, "The Mapping Process of Unstructured Data to the Structured Data", ACM, pp. 151-155 (Year: 2013).
Acar, Gunes, et al., The Web Never Forgets, Computer and Communications Security, ACM, Nov. 3, 2014, pp. 674-689.
Aghasian, Erfan, et al., Scoring Users' Privacy Disclosure Across Multiple Online Social Networks,IEEE Access, Multidisciplinary Rapid Review Open Access Journal, Jul. 31, 2017, vol. 5, 2017.
Agosti et al., "Access and Exchange of Hierarchically Structured Resources on the Web with the NESTOR Framework", IEEE, pp. 659-662 (Year: 2009).
Ahmad et al., "Task-Oriented Access Model for Secure Data Sharing Over Cloud," ACM, pp. 1-7 (Year: 2015).
Ahmad, et al., "Performance of Resource Management Algorithms for Processable Bulk Data Transfer Tasks in Grid Environments," ACM, pp. 177-188 (Year: 2008).
Alaa et al., "Personalized Risk Scoring for Critical Care Prognosis Using Mixtures of Gaussian Processes," Apr. 27, 2017, IEEE, vol. 65, issue 1, pp. 207-217 (Year: 2017).
Ali et al., "Age Estimation from Facial Images Using Biometric Ratios and Wrinkle Analysis," IEEE, 2015, pp. 1-5 (Year: 2015).
Alkalha et al., "Investigating the Effects of Human Resource Policies on Organizational Performance: An Empirical Study on Commercial Banks Operating in Jordan," European Journal of Economics, Finance and Administrative Science, pp. 1-22 (Year: 2012).
Aman et al., "Detecting Data Tampering Attacks in Synchrophasor Networks using Time Hopping," IEEE, pp. 1-6 (Year: 2016).
Amar et al., "Privacy-Aware Infrastructure for Managing Personal Data," ACM, pp. 571-572, Aug. 22-26, 2016 (Year: 2016).

(56) References Cited

OTHER PUBLICATIONS

Antunes et al., "Preserving Digital Data in Heterogeneous Environments", ACM, pp. 345-348, 2009 (Year: 2009).
Ardagna, et al., "A Privacy-Aware Access Control System," Journal of Computer Security, 16:4, pp. 369-397 (Year: (2008).
Avepoint, AvePoint Privacy Impact Assessment 1: User Guide, Cumulative Update 2, Revision E, Feb. 2015, AvePoint, Inc.
Ball, et al., "Aspects of the Computer-Based Patient Record," Computers in Healthcare, Springer-Verlag New York Inc., pp. 1-23 (Year: 1992).
Banerjee et al., "Link Before You Share: Managing Privacy Policies through Blockchain," IEEE, pp. 4438-4447 (Year: 2017).
Bansal et al., "Integrating Big Data: A Semantic Extract-Transform-Load Framework," IEEE, pp. 42-50 (Year: 2015).
Bao et al., "Performance Modeling and Workflow Scheduling of Microservice-Based Applications in Clouds," IEEE Transactions on Parallel and Distributed Systems, vol. 30, No. 9, Sep. 2019, pp. 2101-2116 (Year: 2019).
Barker, "Personalizing Access Control by Generalizing Access Control," ACM, pp. 149-158 (Year: 2010).
Barr, "Amazon Rekognition Update—Estimated Age Range for Faces," AWS News Blog, Feb. 10, 2017, pp. 1-5 (Year: 2017).
Bayardo et al., "Technological Solutions for Protecting Privacy," Computer 36.9 (2003), pp. 115-118, (Year: 2003).
Berezovskiy et al., "A framework for dynamic data source identification and orchestration on the Web", ACM, pp. 1-8 (Year: 2010).
Bertino et al., "On Specifying Security Policies for Web Documents with an XML-based Language," ACM, pp. 57-65 (Year: 2001).
Bertino et al., "Towards Mechanisms for Detection and Prevention of Data Exfiltration by Insiders," Mar. 22, 2011, ACM, pp. 10-19 (Year: 2011).
Bhargav-Spantzel et al., Receipt Management-Transaction History based Trust Establishment, 2007, ACM, p. 82-91.
Bhuvaneswaran et al., "Redundant Parallel Data Transfer Schemes for the Grid Environment", ACM, pp. 18 (Year: 2006).
Bieker, et al., "Privacy-Preserving Authentication Solutions—Best Practices for Implementation and EU Regulatory Perspectives," Oct. 29, 2014, IEEE, pp. 1-10 (Year: 2014).
Bin, et al., "Research on Data Mining Models for the Internet of Things," IEEE, pp. 1-6 (Year: 2010).
Bindschaedler et al., "Privacy Through Fake Yet Semantically Real Traces," arxiv.org, Cornell University Library, 201 Olin Library Cornell University Ithaca, NY 14853, May 27, 2015 (Year: 2015).
Bjorn Greif, "Cookie Pop-up Blocker: Cliqz Automatically Denies Consent Requests," Cliqz.com, pp. 1-9, Aug. 11, 2019 (Year: 2019).
Borgida, "Description Logics in Data Management," IEEE Transactions on Knowledge and Data Engineering, vol. 7, No. 5, Oct. 1995, pp. 671-682 (Year: 1995).
Brandt et al, "Efficient Metadata Management in Large Distributed Storage Systems," IEEE, pp. 1-9 (Year: 2003).
Bujlow et al, "Web Tracking: Mechanisms, Implications, and Defenses," Proceedings of the IEEE, Aug. 1, 2017, vol. 5, No. 8, pp. 1476-1510 (Year: 2017).
Byun, Ji-Won, Elisa Bertino, and Ninghui Li. "Purpose based access control of complex data for privacy protection." Proceedings of the tenth ACM symposium on Access control models and technologies. ACM, 2005. (Year: 2005).
Carminati et al., "Enforcing Access Control Over Data Streams," ACM, pp. 21-30 (Year: 2007).
Carpineto et al., "Automatic Assessment of Website Compliance to the European Cookie Law with CoolCheck," Proceedings of the 2016 ACM on Workshop on Privacy in the Electronic Society, 2016, pp. 135-138 (Year: 2016).

* cited by examiner

| ISO 27002-2013 Relevance | Appendix J Section and Line Reference | FFIEC CAT Tool June 2015 | PCI 3.2 April 2016 | FFIEC IT Mgmt Handbook Nov 2015 |
|---|---|---|---|---|
| 6.1.2 Information Security Risk Assessment | Significant TSP Continuity Scenarios lines 146-147 | D3.CC.RA.1, D5.IR.PST.B.1, D5.IR.PST.B.3, D5.IR.PST.Int.1, D5.IR.PST.Int.3, D5.IR.PST.Int.4, D5.IR.PST.A.1, D5.IR.PST.A.2 | 12.2, A3.3.2 | 1.A.1, 3198 |
| 6.1.2 Information Security Risk Assessment | | D3.CC.RA.1, D5.IR.PST.B.1, D5.IR.PST.B.3, D5.IR.PST.Int.1, D5.IR.PST.Int.3, D5.IR.PST.Int.4, D5.IR.PST.A.1, D5.IR.PST.A.2 | 12.2 | |
| 6.1.2 Information Security Risk Assessment | | D3.CC.RA.1, D5.IR.PST.B.1, D5.IR.PST.B.3, D5.IR.PST.Int.1, D5.IR.PST.Int.3, D5.IR.PST.Int.4, D5.IR.PST.A.1, D5.IR.PST.A.2 | 12.2 | |
| | | D3.CC.RA.1, D5.IR.PST.B.1, D5.IR.PST.B.3, D5.IR.PST.Int.1 | | |

FIG. 3A

| NIST SP 800-53 (Rev. 4) | NIST Cybersecurity Framework February 2014 | HIPAA Simplification March 2013 | EU General Data Protection Regulation (GDPR) 2016 | Custom Policy #1 |
|---|---|---|---|---|
| CA-1.a.1, CA-2.a.1, CA-2.a.3 | ID.GV-4, ID.RA-3, ID.RA-4, ID.RA-5, ID.RM-1, ID.RM-2 | §164.105(2)(iii), §164.306(b)(2), §164.308(1)(iii)(B), §164.308(a)(8) | §IV.2.32.1, §IV.2.32.1.(b), §IV.2.32.1.(d), §IV.2.32.2, §IV.4.37.1, §IV.4.38.1, §IV.4.39.1. | |
| CA-1.a.1, CA-2.a.1, CA-2.a.3 | ID.RA-5, ID.RM-1, ID.RM-2 | §164.105(2)(iii), §164.308(1)(iii)(B), §164.308(a)(8) | | |
| CA-1.a.1, CA-2.a.3 | ID.RA-5 | §164.306(b)(2), §164.308(1)(iii)(B), §164.308(a)(8) | | |

FIG. 3B

| | Significant TSP Continuity Scenarios lines 146-147 | | | | |
|---|---|---|---|---|---|
| 6.1.2 Information Security Risk Assessment | D5.IR.PST.Int.3, D5.IR.PST.Int.4, D5.IR.PST.A.1, D5.IR.PST.A.2, D5.IR.PST.B.1, | 12.2 | | | |
| 6.1.2 Information Security Risk Assessment | D3.CC.RA.1, D5.IR.PST.B.3, D5.IR.PST.Int.1, D5.IR.PST.Int.3, D5.IR.PST.Int.4, D5.IR.PST.A.1, D5.IR.PST.A.2, | 12.2 | | | |
| 6.1.2 Information Security Risk Assessment 8.2 Information Security Risk Assessment | D3.CC.RA.1, D4.RM.OM.B.1, D5.IR.PST.B.1, D5.IR.PST.B.3, D5.IR.PST.Int.1, D5.IR.PST.Int.3, D5.IR.PST.Int.4, D5.IR.PST.A.1, D5.IR.PST.A.2, | A3.2.2 | | 1.A.2, 4412 | |
| 6.1.2 Information Security Risk Assessment 8.2 Information Security Risk Assessment | D3.CC.RA.1, D4.RM.OM.B.1 | | A3.2.2 | | 1.B.7(b), 4413 |

FIG. 3C

| | | | | |
|---|---|---|---|---|
| CA-1.a.1 | ID.GV-4, ID.RA-3, ID.RA-5 | §164.306(b)(2), §164.308(1)(ii)(B), §164.308(a)(8) | | |
| CA-1.a.1 | ID.RA-4, ID.RA-5 | §164.308(1)(ii)(B), §164.308(a)(8) | | |
| CA-1.a.1, CA-1.b.1, CA-1.b.2, CA-2.b, CA-6.c, CA-7.c, CA-7.d, IR-10 | ID.RM-3 | | | |
| CA-1.a.1, CA-2.b, CA-7.c, CA-7.d, IR-10 | ID.RM-3 | | | §III.[1]5.1.(a), §III.[1]5.1.(c), §III.1.12.3, |

FIG. 3D

OT AIR

Low    Medium    High    Very High

What is OT AIR?
OT AIR or OneTrust Auto-Inherent Risk can help you identify and prioritize your third parties that pose the most risk to your business. You can then determine which vendors send out assessments for first using our Assessment Coordination services.

How is it calculated?
OT AIR uses data points gathered from organizations similar to yours on how a vendor impacts their business. Based on the answers to these questions, we use a proprietary methodology to determine the OT AIR for that vendor.

| Category | Question |
| --- | --- |
| Business Process | Does the vendor perform a critical service or business function? |
| Reputation | Does the vendor provide a customer facing service or function or does the vendor represent our brand? |
| Redundancy | Is this the only vendor that provides this product/service for us? |
| Revenue | If the vendor could not perform the function or service would it negatively impact revenues? |
| Availability - Hourly | Would the business be negatively impacted if the vendor was not available for an hour? |
| Availability - Daily | Would the business be negatively impacted if the vendor was not available for a day? |
| Availability - Weekly | Would the business be negatively impacted if the vendor was not available for a week? |
| Network Access | Does the vendor connect to our IT infrastructure? |
| Data Access & Management | Does the vendor store, process, or interact with sensitive employee or customer data? |

Close

ASSESSING AND MANAGING COMPUTATIONAL RISK INVOLVED WITH INTEGRATING THIRD PARTY COMPUTING FUNCTIONALITY WITHIN A COMPUTING SYSTEM

CROSS-REFERENCE TO RELATED APPLICATIONS

This application is a continuation of U.S. patent application Ser. No. 17/722,551, filed Apr. 18, 2022, which claims the benefit of U.S. Provisional Patent Application Ser. No. 63/176,185, filed Apr. 16, 2021, which is hereby incorporated herein by reference in its entirety.

TECHNICAL FIELD

The present disclosure is generally related to data processing systems and methods for assisting entities in a manner to ensure proper access control, usage control, and protection of data involved with computer-implemented functionality provided by a vendor from maliciously caused destruction, unauthorized modification, or unauthorized disclosure.

BACKGROUND

Significant technical challenges are often encountered by entities (e.g., organizations, companies, institutes, and/or the like) with respect to integrating computing systems of the entities with computer-implemented functionality (e.g., services, software applications, computing system capacity, and/or the like) provided by independent third party entities, also referred to as vendors. For example, a particular entity may use a computing system in supporting an e-commerce website. Here, the entity may integrate computer-implemented functionality in the form of a service with the computing system that is provided through a vendor to validate the identity of visitors to a website. Visitors to the website may provide identifying information that the computing system submits to the integrated service to validate the visitors' identities. For example, the service may be provided in a software-as-a-service environment. Therefore, the integration of the service in the computing system may involve installing an application programming interface (API) within the computing system to provide access to the service over a network such as the Internet.

However, an entity's integration of the service with its computing system can expose the computing system to significant risk. For example, installing the API within the computing system can provide a channel for a nefarious third-party to gain access to the computing system through the vendor's service. Such access can expose the computing system to experiencing a data breach, being hacked, having malware (e.g., a virus and/or ransomware) installed within the computing system, and/or the like. Therefore, any entity that is onboarding computer-implemented functionality provided through a vendor with a computing system of the entity must be able to recognize, manage, and mitigate risks associated with such integration in an effective manner to ensure integrity of the computing system is maintained. Accordingly, a need exists in the art for improved systems and methods to facilitate and assist an entity in successfully recognizing, managing, and mitigating risks associated with integrating computing systems of the entity with computer-implemented functionality (e.g., services, software applications, computing system capacity, and/or the like) provided by vendors.

SUMMARY

In general, various aspects of the present disclosure provide methods, apparatuses, systems, computing devices, computing entities, and/or the like. In accordance various aspects, a method is provided that comprises: providing, by computing hardware, a first question from a set of questions found in an electronic assessment for display on a user interface, wherein the user interface solicits a first answer to the first question, and the set of questions relates to computer-implemented functionality provided by a vendor; receiving, by the computing hardware and via the user interface, the first answer to the first question to provide a first question/answer pairing; mapping, by the computing hardware, the first question/answer pairing to an attribute related to the computing-implemented functionality; mapping, by the computing hardware, the attribute to a second question/answer pairing, wherein the second question/answer pairing: is related to the attribute, comprises a second question of the set of questions, and comprises a second answer provided to the second question; comparing, by the computing hardware, the first answer to the second answer to identify an inconsistency in the first answer with respect to the second answer; determining, by the computing hardware, to address the inconsistency; and responsive to determining to address the inconsistency, performing, by the computing hardware, an action to address the inconsistency, wherein the action comprises at least one of: (1) prompting, via the user interface, to provide at least one of supporting information or supporting documentation to address the inconsistency, (2) providing, via the user interface, a follow up question related to the inconsistency, or (3) requesting, via the user interface, the inconsistency in the first answer to be redressed.

In some aspects, determining to address the inconsistency comprises processing the inconsistency via a decision engine to generate a relevance of the inconsistency, the decision engine comprising a rules-based model configured to use a set of rules in determining a level of the inconsistency as a measure of the relevance of the inconsistency. In some aspects, the method further comprises determining, by the computing hardware, the action to perform by: processing at least one of the first question/answer pairing or the second question/answer pairing using a machine-learning model to generate a data representation having a set of predictions in which each prediction is associated with a particular action to take to address the inconsistency; and selecting, based on the set of predictions, the action to address the inconsistency. In some aspects, the machine-learning model is trained using training data derived from responses to follow up requests previously provided for inconsistencies detected in past assessment question/answer pairings that comprises at least one of (1) whether the inconsistencies detected in the past assessment question/answer pairings were ignored, (2) whether related follow up actions for the inconsistencies detected in the past assessment question/answer pairings were ignored, (3) particular types of actions taken in response to the inconsistencies detected in the past assessment question/answer pairings, or (4) at least one of a framework or standard that is mapped to the past assessment question/answer pairings.

In some aspects, mapping the first question/answer pairing to the attribute related to the computing-implemented functionality and mapping the attribute to the second question/answer pairing is performed via a data structure that maps the first question/answer pairing and the second question/answer pairing to the attribute. In some aspects, the first answer and the second answer are in a freeform text format and comparing the first answer to the second answer to identify the inconsistency in the first answer with respect to the second answer involves: performing a natural language processing technique on the first answer to generate a first embedded representation of the first answer, performing the natural language processing technique on the second answer to generate a second embedded representation of the second answer, and comprising the first embedded representation to the second embedded representation to identify the inconsistency. In some aspects, the method further comprises determining, by the computing hardware, the action to take to address the inconsistency based on at least one of a type of the attribute or a past response to a past inconsistency related to the attribute.

In accordance with various aspects, a system is provided comprising a non-transitory computer-readable medium storing instructions and a processing device communicatively coupled to the non-transitory computer-readable medium. In particular aspects, the processing device is configured to execute the instructions and thereby perform operations comprising: providing a first question found in an electronic assessment for display on a user interface, wherein the user interface solicits a first answer to the first question, and the first question relates to computer-implemented functionality; receiving, via the user interface, the first answer to the first question to provide a first question/answer pairing; mapping the first question/answer pairing to a plurality of attributes related to the computing-implemented functionality; mapping the plurality of attributes to a second question/answer pairing, wherein the second question/answer pairing comprises a second question, and a second answer provided to the second question; comparing the first answer to the second answer to identify an inconsistency in the first answer with respect to the second answer; determining to address the inconsistency; and responsive to determining to address the inconsistency, performing an action to address the inconsistency, wherein the action comprises at least one of: (1) prompting, via the user interface, to provide at least one of supporting information or supporting documentation to address the inconsistency, (2) providing, via the user interface, a follow up question related to the inconsistency, or (3) requesting, via the user interface, the inconsistency in the first answer to be redressed.

In some aspects, determining to address the inconsistency comprises processing the inconsistency using a rules-based model configured to use a set of rules in determining a level of the inconsistency as a measure of a relevance of the inconsistency. In some aspects, the operations further comprise determining the action to perform by: processing at least one of the first question/answer pairing or the second question/answer pairing using a machine-learning model to generate a data representation having a set of predictions in which each prediction is associated with a particular action to take to address the inconsistency; and selecting, based on the set of predictions, the action to address the inconsistency. In some aspects, the machine-learning model is trained using training data derived from responses to follow up requests previously provided for inconsistencies detected in past assessment question/answer pairings that comprises at least one of (1) whether the inconsistencies detected in the past assessment question/answer pairings were ignored, (2) whether related follow up actions for the inconsistencies detected in the past assessment question/answer pairings were ignored, (3) particular types of actions taken in response to the inconsistencies detected in the past assessment question/answer pairings, or (4) at least one of a framework or standard that is mapped to the past assessment question/answer pairings.

In some aspects, mapping the first question/answer pairing to the plurality of attributes related to the computing-implemented functionality and mapping the plurality of attributes to the second question/answer pairing is performed via a data structure that maps the first question/answer pairing and the second question/answer pairing to the plurality of attributes. In some aspects, the first answer and the second answer are in a freeform text format and comparing the first answer to the second answer to identify the inconsistency in the first answer with respect to the second answer involves: performing a natural language processing technique on the first answer to generate a first embedded representation of the first answer, performing the natural language processing technique on the second answer to generate a second embedded representation of the second answer, and comprising the first embedded representation to the second embedded representation to identify the inconsistency. In some aspects, the operations further comprise determining the action to take to address the inconsistency based on at least one of (1) a number of the plurality of attributes, (2) a type of each of the plurality of attributes, or (3) one or more past responses to at least one of the first question/answer pairing being flagged or similar question/answering pairings being flagged that are mapped to attributes similar to the plurality of attributes.

In addition, in accordance with various aspects, a non-transitory computer-readable medium having program code stored thereon is provided. In particular aspects, the program code is executable by one or more processing devices to perform operations comprising: providing a first question found in an electronic assessment for display on a user interface, wherein the user interface solicits a first answer to the first question, and the first question relates to computer-implemented functionality; receiving, via the user interface, the first answer to the first question to provide a first question/answer pairing; mapping the first question/answer pairing to an attribute related to the computing-implemented functionality; mapping the attribute to a second question/answer pairing, wherein the second question/answer pairing comprises a second question, and a second answer provided to the second question; comparing the first answer to the second answer to identify an inconsistency in the first answer with respect to the second answer;

determining to address the inconsistency; and responsive to determining to address the inconsistency, performing an action to address the inconsistency, wherein the action comprises at least one of: (1) prompting, via the user interface, to provide at least one of supporting information or supporting documentation to address the inconsistency, (2) providing, via the user interface, a follow up question related to the inconsistency, or (3) requesting, via the user interface, the inconsistency in the first answer to be redressed.

In some aspects, determining to address the inconsistency comprises processing the inconsistency using a rules-based model configured to use a set of rules in determining a level of the inconsistency as a measure of a relevance of the inconsistency. In some aspects, the operations further comprise determining the action to perform by: processing at least one of the first question/answer pairing or the second question/answer pairing using a machine-learning model to generate a data representation having a set of predictions in which each prediction is associated with a particular action to take to address the inconsistency; and selecting, based on the set of predictions, the action to address the inconsistency.

In some aspects, mapping the first question/answer pairing to the attribute related to the computing-implemented functionality and mapping the attribute to the second question/answer pairing is performed via a data structure that maps the first question/answer pairing and the second question/answer pairing to the attribute. In some aspects, the first answer and the second answer are in a freeform text format and comparing the first answer to the second answer to identify the inconsistency in the first answer with respect to the second answer involves: performing a natural language processing technique on the first answer to generate a first embedded representation of the first answer, performing the natural language processing technique on the second answer to generate a second embedded representation of the second answer, and comprising the first embedded representation to the second embedded representation to identify the inconsistency. In some aspects, the operations further comprise determining the action to take to address the inconsistency based on at least one of a type of the attribute or a past response to a past inconsistency related to the attribute.

BRIEF DESCRIPTION OF THE DRAWINGS

In the course of this description, reference will be made to the accompanying drawings, which are not necessarily drawn to scale, and wherein:

FIGS. 3A-3D depict an example of a mapping of assessment questions to standards, controls, and/or frameworks that can be used in accordance with various aspects of the present disclosure;

FIG. 8 depicts an example of a listing of assessment questions related to an entity's use of a particular vendor that can be used in accordance with various aspects of the present disclosure;

DETAILED DESCRIPTION

Overview

Figure 1:
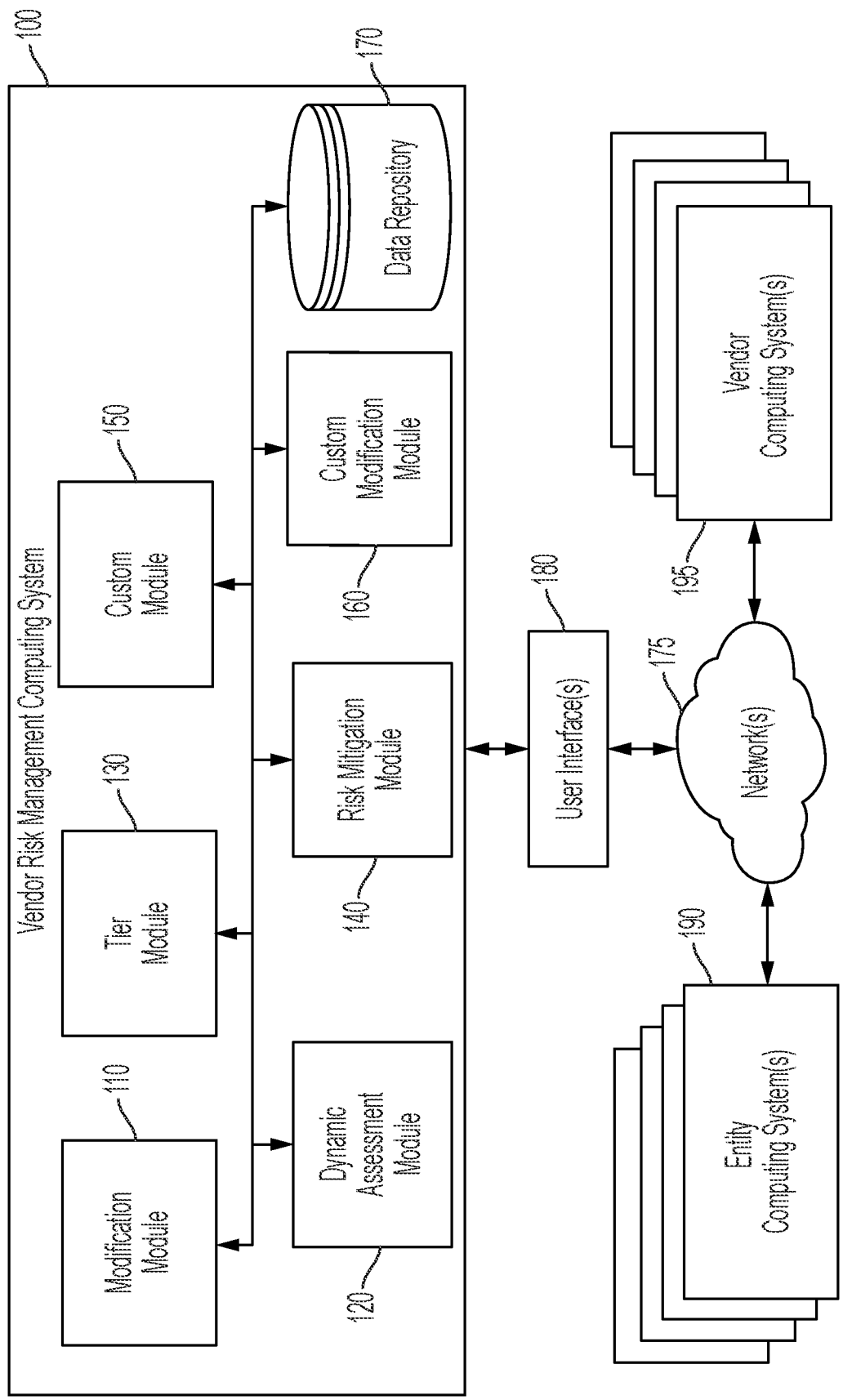
FIG. 1 depicts an example of a computing environment that can be used for recognizing, managing, and mitigating risks associated with an entity integrating computer-implemented functionality provided by vendors with computing systems of the entity in accordance with various aspects of the present disclosure.

As noted above, significant technical challenges are often encountered by entities (e.g., organizations, companies, institutes, and/or the like) with respect to integrating computing systems of the entities with computer-implemented functionality (e.g., services, software applications, computing system capacity, and/or the like) provided by independent third party entities, also referred to as vendors. For example, integrating computer-implemented functionality provided through a vendor with a computing system of an entity can introduce the computing system to vulnerabilities such as experiencing a data breach, being compromised by having malware installed on the computing system, losing functionality due to a hacker breaking into the computing system and taking control, and/or the like.

As a specific example, an entity may subscribe to computer-implemented functionality in the form of a service (e.g., software-as-a-service) for providing human resource management functionality. Here, the service may be integrated with a computing system of the entity to provide the entity with human resource management functionality within the computing system. The service may need to gain access to personal data of employees stored within the computing system (e.g., data repository thereof) in performing certain functionality. Therefore, the service may need to have credentials to gain access to the personal data. The service may store such credentials in a cloud computing environment that is used in supporting the service. In addition, the computing system and service may communicate over a network such as the Internet. Accordingly, the integration of the service with the computing system may involve installing an application programming interface (API) within the computing system to facilitate communication between the cloud computing environment supporting the service and the computing system.

However, the cloud computing environment supporting the service is normally under the control of the vendor. Therefore, the entity does not generally have any say as to how the vendor goes about storing the credentials in the cloud environment such as, for example, the security controls that are put into place by the vendor in ensuring the credentials are properly protected from being involved in a data-related incident such as a data breach. As a result, the entity's use of the service can expose the computing system of the entity to significant risk if the vendor is handling the credentials in a poorly secure manner. For example, the vendor may experience a data-related incident involving the cloud computing environment in which the credentials are stolen. This can happen without the vendor's knowledge. The third-party who has stolen the credentials may then be able to use the credentials to gain access to the computing system of the entity. Therefore, any entity that is interested in integrating computer-implemented functionality provided by vendors within a computing system of the entity must be able to successfully recognize, manage, and mitigate risks associated with such integrations.

To combat this problem, many entities will perform an assessment of a vendor when considering integrating computer-implemented functionality provided by the vendor with a computing system of the entity. For example, an entity may have the vendor complete a questionnaire that includes questions on various attributes of the computer-implemented functionality that may influence an amount of risk that may be involved in using the functionality. The entity may then evaluate the vendor's answers to the questions to determine a risk (e.g., risk rating) associated with integrating the computer-implemented functionality with the entity's computing system.

However, a first drawback of performing such an assessment is that the entity's assessment may be lacking in some area that may not necessarily identify a particular risk (and/or level thereof) that is associated with the entity's integration of the vendor's computer-implemented functionality. For example, the questionnaire provided to the vendor may not include the proper questions to identify the particular risk. In addition, the vendor may not always be accurate and/or truthful in answering the questions provided in the questionnaire.

In addition, a second drawback of performing such an assessment is that the assessment may only be performed at a time when the vendor is being considered for providing the computer-implemented functionality, or performed only occasionally once the vendor has been onboarded and the vendor's computer-implemented functionality has been integrated with the entity's computing system. Therefore, any changes instituted by the vendor that may affect the risk (and/or level thereof) associated with providing the computer-implemented functionality may not be recognized and/or appreciated by the entity. For example, the vendor may change the identity verification process used for controlling access to a data repository used in storing credentials used by the vendor in accessing the entity's computing system. As a result, the entity's computing system may be exposed to a risk and/or an increased level of risk due to the change in the identity verification process that the entity is unaware of and/or does not fully appreciate.

Various aspects of the present disclosure overcome many of the technical challenges associated with integrating computing systems of an entity with computer-implemented functionality (e.g., services, software applications, computing system capacity, and/or the like) provided by vendors, such as those discussed above. Specifically, various aspects of the disclosure are directed to a computer-implemented process that facilitates and assists an entity in successfully recognizing, managing, and mitigating risks associated with integrating computing systems of the entity with computer-implemented functionality (e.g., services, software applications, computing system capacity, and/or the like) provided by vendors. In various aspects, a vendor risk management computing system is used in executing the computer-implemented process.

In some aspects, the vendor risk management computing system receives a first assessment dataset for computer-implemented functionality provided by a vendor that is to be integrated with a computing system of an entity. For example, the first assessment dataset may involve question/answer pairings. As a specific example, the entity, or some other entity, may provide the vendor with a questionnaire that includes questions on the computer-implemented functionality. Personnel for the vendor may then provide answers to the questions which in turn become the question/answer pairings found in the first assessment dataset.

The vendor risk management computing system may access a second assessment dataset for the computer-implemented functionality from a data repository that stores risk assessment data on a plurality of computer-implemented functionality provided by different vendors. In various aspects, the data repository serves as a centralized data source for storing assessment datasets collected on various computer-implemented functionality provided by different vendors. For example, the different assessment datasets may be collected through multiple questionnaires that have been provided to the vendors during times when entities are evaluating the vendors with respect to integrating the various computer-implemented functionality with computing systems of the entities.

As a specific example, a first entity may be evaluating a vendor with respect to integrating computer-implemented functionality that involves a service provided by the entity with a computing system of the first entity. For example, integrating the computer-implemented functionality with the computing system may involve installing an application programming interface (API) in the computing system to call the service.

Here, the first entity may provide the vendor with a questionnaire that includes questions on the vendor's computer-implemented functionality. For example, the questionnaire may include one or more questions on the access controls that the vendor has put in place for accessing the service. In addition, the questionnaire may include one or more questions on security controls that the vendor has put into place with respect to sensitive data that the service may use that is collected through the first entity's computing system. In turn, personnel for the vendor may then complete the questionnaire by providing answers to the questions. Multiple personnel may complete the questionnaire so that the first entity may receive multiple sets of answers to the questions that results in multiple assessment datasets. The first entity may then submit the assessment datasets to be stored in the data repository.

Besides the first entity, other entities that are evaluating the vendor with respect to integrating the computer-implemented functionality with computing systems for the entities may do the same in submitting assessment datasets to store in the data repository. Therefore, the data repository can be viewed as a crowdsourcing resource in that the data repository can store assessment datasets that have been collected by multiple entities in evaluating the vendor and corresponding computer-implemented functionality. Accordingly, the data repository can be used in storing assessment datasets for other computer-implemented functionality provided by the vendor, as well as computer-implemented functionality provided by other vendors. Therefore, the data repository can serve as a centralized data source for assessment datasets collected by various entities in evaluating different vendors and different computer-implemented functionality provided by the different vendors.

In various aspects, the vendor risk management computing system detects an inconsistency between a value of an attribute for the computer-implemented functionality that is specified in the first assessment dataset and a corresponding value of the attribute that is specified in the second assessment dataset. For example, the attribute may involve a particular process, control, procedure, function, and/or the like that the vendor has implemented in providing the computer-implemented functionality to various entities. Here, the vendor risk management computing system may detect a different value has been provided for the attribute in the first assessment dataset and the second assessment dataset.

In some aspects, the vendor risk management computing system may identify the value for the attribute based on a mapping of a first question/answer pairing provided in the first assessment dataset. For example, the first question/answer pairing can include a first question provided in a first questionnaire filled out by the vendor and a first answer provided by the vendor to the first question where the value is the first answer. Likewise, the vendor risk management computing system may identify the corresponding value for the attribute based on a mapping of a second question/answer pairing provided in the second assessment dataset. For example, the second question/answer pairing can include a second question provided in a second questionnaire filled out by the vendor and a second answer provided by the vendor to the second question where the value is the second answer.

In some aspects, the vendor risk management computing system modifies a risk rating for the vendor to generate a modified risk rating for the vendor based on the inconsistency. For example, the modified risk rating identifies a risk to the entity of having the computer-implemented functionality integrated with the computing system. Therefore, the entity can use the modified risk rating in determining whether to use the vendor in providing the computer-implemented functionality to integrate with the entity's computing system. In some instances, the vendor risk management computing system may identify the inconsistency and generate the modified risk rating after the entity has already onboarded the vendor and has already integrated the computer-implemented functionality with the computing system. Therefore, the vendor risk management computing system may assist the entity in identifying a change in risk in using the computer-implemented functionality provided by the vendor after the entity has already started using the computer-implemented functionality. Furthermore, the vendor risk management computing system may identify the inconsistency and generate the modified risk rating for the entity based on assessment datasets that did not originate from the entity. Therefore, the vendor risk management computing system may provide the entity with the benefit of recognizing a change in risk in using the computer-implemented functionality based on other entities evaluation of the computer-implemented functionality.

The entity may have multiple computer-implemented functionality provided by various vendors with one or more computing systems of the entity. In some aspects, the vendor risk management computing system may assist the entity in identifying, monitoring, managing, and/or the like risk related to using of the multiple computer-implement functionality by placing vendors into different risk tiers based on the risk rating assigned to the vendors. For example, the risk tiers may include "Low," "Medium," "High," and "Very High." The risk tiers can allow personnel for the entity to quickly recognize the risk involved in using computer-implemented functionality for various vendors.

Accordingly, the modified risk rating can move the vendor from a first risk tier for the entity to a second risk tier for the entity. As a result, the vendor risk management computing system may cause performance of one or more actions with respect to the computing system of the entity to address the modified risk rating. For example, the one or more actions may involve sending an electronic notification, such as an email, to personnel of the entity that identifies the inconsistency and the attribute for the computer-implemented functionality. Similarly, the one or more actions may involve sending, in addition or instead, an electronic notification to personnel of the vendor that identifies the inconsistency and the attribute for the computer-implemented functionality. In another example, the one or more actions may involve directly affecting the use of the computer-implemented functionality within the computing system such as causing the computer-implemented functionality to be disabled in the computing system (e.g., disabling the API from calling the service). In some aspects, the one or more actions are defined for the risk tier for the entity. Therefore, the vendor risk management computing system may cause the one or more actions to be performed based on the vendor being moved from a first risk tier to a second risk tier.

As noted, the data repository can serve as a centralized resource for various assessment datasets collected by different entities on different computer-implemented functionality provided by different vendors. Therefore, the vendor risk management computing system may assist multiple entities with identifying, monitoring, managing, and/or the like risk related to the use of multiple computer-implement functionality from different vendors. For example, the computer-implemented functionality being used by the first entity may also be integrated with a second computing system of a second entity that is different from the entity. Accordingly, the modified risk rating may also identify a risk to the second entity of having the computer-implemented functionality integrated with the second computing system and again, the modified risk rating may move the vendor from a first risk tier for the second entity to a second risk tier for the second entity. Therefore, like the first entity, the vendor risk management computing system may cause performance of one or more actions with respect to the second computing system of the second entity to address the modified risk rating.

In some aspects, the vendor risk management computing system may allow for each entity to generate a customized risk rating for a particular vendor if desired. For example, the vendor risk management computing system may provide the first and second entities with a questionnaire that includes questions on each entity's specific integration of computer-implemented functionality with the first and second computing systems. Accordingly, the customized risk rating can be fine-tuned to the entity's particular use of computer-implemented functionality provided by a vendor. Therefore, the vendor risk management computing system may also modify a second risk rating that is unique to the second entity, in addition to the risk rating that is unique to the first entity, to generate a second modified risk rating for the vendor based on the inconsistency that is unique for the second entity.

Accordingly, various aspects of the disclosure provided herein are effective, efficient, reliable, and accurate in assisting various entities with identifying, monitoring, managing, and/or the like risk associated with integrating computer-implemented functionality provided by different vendors with computing systems of the entities. In addition, various aspects of the disclosure provided herein facilitate a centralized resource on assessment datasets provided through various entities that are collected with respect to integrating computer-implemented functionality provided by vendors with computing systems of the entities. This can be a significant advantage in that the centralized resource can serve as a crowdsourcing data source that can allow for an entity to obtain a risk rating for a vendor that may be better representative of the risk of integrating computer-implemented functionality provided by the vendor with a computing system of the entity. Thus, various aspects of the present disclosure make major technical contributions to improving the computational efficiency, security, and reliability of various computing systems in using computer-implemented functionality provided through various vendors. Further detail is now provided for various aspects of the disclosure.

Example Computing Environment

FIG. 1 depicts an example of a computing environment 5 that can assist entities in identifying, monitoring, managing, and/or the like risk associated with integrating computer-implemented functionality provided by different vendors with computing systems of the entities in accordance with various aspects of the present disclosure. Accordingly, FIG. 1 depicts examples of hardware components of a vendor risk management computing system 100 according to some aspects. The vendor risk management computing system 100 is a specialized computing system that can be used for performing risk analysis related to the integration of computer-implemented functionality provided through various vendor computing systems 195 to various entity computing systems 190 of entities. In addition, the vendor risk management computing system 100 can assist entities in identifying, monitoring, managing, and/or the like risk associated with the entities integrating computer-implemented functionality with the various entity computing systems 190.

In various aspects, the vendor risk management computing system 100 may be configured to host a vendor risk management service (e.g., software as a service) used by the different entities that is accessible over one or more networks 175. Here, the vendor risk management computing system 100 includes software components and/or hardware components for facilitating the vendor risk management service. For example, the vendor risk management computing system 100 may be hosting the vendor risk management service as one or more microservices within the vendor risk management computing system 100. The vendor risk management computing system 100 may provide access to the vendor risk management service over the one or more networks 175 (e.g., the Internet) to an entity (e.g., an entity computing system 190 associated with the entity) that has subscribed to the service and is considered a "tenant" of the vendor risk management computing system 100. Personnel of the entity may access the vendor risk management service over the one or more networks 175 through one or more graphical user interfaces (e.g., webpages) 180 and use the vendor risk management service. In addition to the graphical user interfaces 180, the vendor risk management computing system 100 may include one or more interfaces (e.g., application programming interfaces (APIs)) and/or components for communicating and/or accessing the entity computing systems 190 and/or vendor computing systems 195 over the network(s) 175.

Here, an entity computing system 190 for an entity may include computing hardware and/or software that may involve the integration of various computer-implemented functionality provided through a vendor computing system 195. For example, the entity computing system 190 may integrate computer-implemented functionality provided through the vendor computing system 195 by installing an API within the entity computing system 190 that is used to communicate with a service provided through the vendor computing system 195. In another example, the entity computing system 190 may integrate computer-implemented functionality provide through the vendor computing system 195 by utilizing data storage found within the vendor computing system 195.

Accordingly, the vendor computing system 195 is operated by a vendor other than the particular entity. Thus, the vendor computing system 195 generally includes computing hardware and software that the particular entity has no control over or access to, but which provides the computer-implemented functionality that is integrated with the entity computing system 190 for the particular entity. Therefore, the entity computing system 190 can be exposed to risk introduced by integrating the computer-implemented functionality provided through the vendor computing system 195.

For example, the entity computing system 190 may be exposed to risk of experiencing a data-related incident such as a data breach as a result of integrating the computer-implemented functionality provided through the vendor computing system 195. Therefore, the entity may be interested in using the vendor risk management service in performing a risk analysis on integrating the computer-implemented functionality provided through the vendor computing system 195 with the entity computing system 190. In addition, the entity may be interested in using the vendor risk management service in monitoring and managing the risk involved with using the computer-implemented functionality once the computer-implemented functionality has been integrated with the entity computing system 190.

In various aspects, the vendor risk management computing system 100 includes a data repository 170 that can be used as a centralized resource for assessment datasets gathered on computer-implemented functionality provided by different vendors. For example, the data repository 170 may comprise one or more databases used in storing the assessment datasets. In addition, the data repository 170 may be used in storing other data utilized within the vendor risk management computing system such as questionnaires that may be completed by vendors on the different computer-implemented functionality they may provide, as well as questionnaires that may be completed by entities on different computer-implemented functionality provided by vendors that the entities have (or plan to) integrate with entity computing systems 190.

In various aspects, the vendor risk management computing system 100 can receive the assessment datasets from entities (e.g., entity computing systems 190) and/or vendors (e.g., vendor computing system 195). Accordingly, the vendor risk management computing system 100 can use the assessment datasets in performing certain functionality associated with evaluating risk associated with the integration of computer-implemented functionality provided by the vendors with entity computing systems 195, as well as assist entities in identifying, monitoring, and managing the risk.

The vendor risk management computing system 100 may include computing hardware performing a number of different processes in providing functionality associated with the vendor risk management service. Specifically, in various aspects, the vendor risk management computing system 100 executes: (1) a modification module 110 to modify a risk rating for a vendor based on an inconsistency detected between assessment datasets; (2) a dynamic assessment module 120 to generate a dynamic assessment completed by a vendor; (3) a tier module 130 to place vendors in tiers; (4) a risk mitigation module 140 to process vendors for various tiers; (5) a custom module 150 to generate a customized risk rating of a vendor for an entity; and/or (6) a custom modification module 160 to modify a risk rating of a vendor for an entity. Further detail is provided below regarding the configuration and functionality of the modification module 110, the dynamic assessment module 120, the tier module 130, the risk mitigation module 140, the custom module 150, and the custom modification module 160 according to various aspects of the disclosure.

Modification Module

Figure 2:
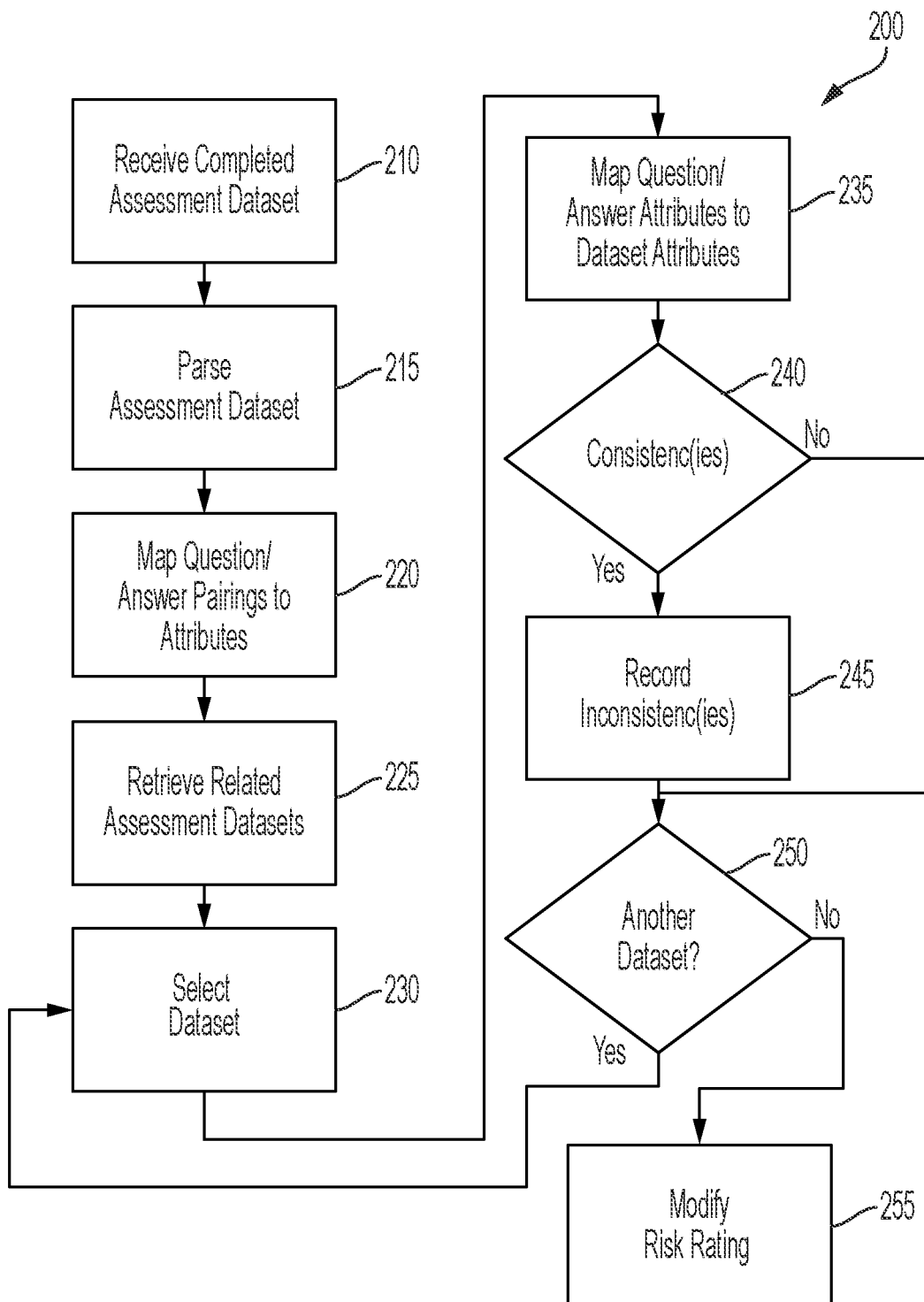
FIG. 2 depicts an example of a process for modifying a risk rating for a vendor in accordance with various aspects of the present disclosure.

Turning now to FIG. 2, additional details are provided regarding a modification module 110 for modifying a risk rating for a vendor based on an inconsistency detected between assessment datasets in accordance with various aspects of the disclosure. For instance, the flow diagram shown in FIG. 2 may correspond to operations carried out, for example, by computing hardware found in the vendor risk management computing system 100 as described herein, as the computing hardware executes the modification module 110.

As previously noted, a vendor may receive risk assessments from various entities that may be interested in integrating computer-implemented functionality provided by the vendor with entity computing systems 190 for the entities. For example, the risk assessments may be in the form of a questionnaire that asks the vendor certain questions with respect to the computer-implemented functionality. The risk assessments are generally used in evaluating the risk of integrating the computer-implemented functionality with the entity computing systems 190. For example, a questionnaire may ask the vendor to indication whether the vendor is using certain access controls such as two-factor authentication for the computer-implemented functionality. Accordingly, the use or lack of use of the access controls can indicate to an entity a level (e.g., amount) of risk that is involved with integrating the computer-implemented functionality with an entity computing system 190.

Therefore, the vendor risk management computing system 100 may receive and store completed risk assessments in the form of assessment datasets for the particular vendor from different entities, as well as different sources within the particular vendor (e.g., from personnel in different departments within the particular vendor, from different personnel within the same department within the particular vendor, from different subsidiaries of the particular vendor, etc.). In turn, the assessment datasets may be stored in a data repository 170 within the vendor risk management computing system 100 as previously discussed. Therefore, the data repository 170 can serve as a centralized resource of assessment datasets that may have been collected by a number of different entities to facilitate crowdsourcing of assessments on the vendor.

In various aspects, each of the assessment datasets may include respective answers (e.g., values) to each question within the completed risk assessment to form question/answer pairings. In some aspects, each question/answer pairing may correspond to one or more attributes associated with the particular computer-implemented functionality being provided by the vendor. Therefore, the assessment datasets collected on the particular computer-implemented functionality can be compared to identify whether the vendor has provided consistent information in the assessments. If not, then a risk rating for the vendor may be modified to reflect the inconsistency. For example, such a comparison may be performed when a new completed assessment dataset is uploaded to the vendor risk management computing system 100 by an entity or the vendor for the particular computer-implemented functionality.

Accordingly, the process 200 involves the modification module 110 receiving the newly completed assessment dataset at Operation 210. At Operation 215, the modification module 110 parses the newly completed assessment dataset into question/answer pairings. For example, the newly completed assessment dataset may be based on a questionnaire provided as an electronic form. The electronic form may have been viewed by personnel for the vendor on a computing device. The electronic form may have presented the personnel with questions along with fields to provide answers to the questions. Therefore, the modification module 110 parses the questions and corresponding answers provided in the electronic form into the question/answer pairings.

At Operation 220, the modification module 110 maps the question/answer pairings to attributes for the computer-implemented functionality. In some aspects, the modification module 110 may access a data structure that provides a mapping of the question/answer pairings to the attributes. For example, the attributes may be particular controls that are to be implemented by the vendor for the computer-implemented functionality according to one or more standards and/or frameworks (e.g., FFIEC Cat Tool, PCI 3.2, FFIEC IT Mgmt Handbook, NIST SP 800-53, NIST Cybersecurity Framework, HIPPA Simplification, EU GDPR, SOC 1, SOC 2, etc.). In some aspects, multiple questions within the assessment may map to a same control associated with the one or more standards and/or frameworks.

Turning briefly to FIGS. 3A-3D, an example of a mapping 300 is provided of particular question/answer pairings to one or more standards and/or frameworks (e.g., in addition to particular controls related to each of the standards and frameworks). As may be understood from FIGS. 3A-3D, the mapping 300 may correspond to one or more fields in a data structure that indicates a particular question/answer pairing and a mapping of each particular question/answer pairing to one or more attributes (e.g., controls) as defined by various standards/frameworks.

Once the modification module 110 has mapped each of the question/answer pairings, the modification module 110 retrieves one or more assessment datasets for the vendor that are related to the computer-implemented functionality at Operation 225. For example, the modification module 110 may query the one or more assessment datasets from the data repository 170 used within the vendor risk management computing system 100 for storing the assessment datasets. Here, the modification module 110 may retrieve one or more assessment datasets that are associated with a particular entity (e.g., the entity that has provided the completed assessment dataset) or multiple entities. For example, personnel for the entity that has provided the completed assessment dataset may also provide criteria along with the assessment dataset for querying the one or more assessment datasets to use in detecting inconsistencies in the newly completed assessment dataset.

At Operation 230, the modification module 110 selects one of the retrieved assessment datasets. The modification module 110 then maps the attributes for the question/answer pairings to the attributes found in the selected assessment dataset in Operation 235. Again, the modification module 110 may use some type of data structure that provides a mapping of the values provided in the selected assessment dataset to attributes. Once mapped, the modification module 110 determines whether any inconsistencies are found in the question/answer pairings for the newly completed assessment dataset by comparing the answers (e.g. values) provided for the question/answer pairings to the values provided for the matching attributes found in the selected assessment dataset at Operation 240.

In various aspects, the modification module 110 detects inconsistencies in question/answer pairings based on detecting conflicting values from the newly completed assessment dataset and the selected assessment dataset that relate to the same particular attribute. For example, the modification module 110 may detect inconsistencies that include (1)

opposing binary (e.g., yes/no) values for a particular attribute that are specified in the newly completed assessment dataset and the select assessment dataset; (2) inconsistent response values for a particular attribute between the newly completed assessment dataset and the select assessment dataset (e.g., such as when the responses specified in the newly completed assessment dataset and the select assessment dataset to the same multiple-choice question are different); (3) inconsistent selection values for a particular attribute between the newly completed assessment dataset and the select assessment dataset (e.g., such as when the responses specified in the newly completed assessment dataset and the select assessment dataset to the same question requesting the assessment taker to select all responses that apply are inconsistent); (4) inconsistent point values for a particular attribute between the newly completed assessment dataset and the select assessment dataset (e.g., such as when a question corresponding to the particular attribute calls for a point value response); and/or (5) any other suitable inconsistency between the value of any attribute for the particular vendor that is specified in the newly completed assessment dataset and the corresponding value for the attribute for the particular vendor that is specified in the selected assessment dataset (e.g., different numeric responses, different text responses, responses in the selected assessment dataset for which there is no corresponding response in the newly completed assessment dataset as a result of a blank response, etc.). If the modification module 110 identifies any inconsistencies, then the modification module records the inconsistencies in Operation 245. This can allow for personnel of the entity that has provided the newly completed assessment dataset, personnel for another entity, and/or the vendor to review the inconsistencies.

The modification module 110 then determines whether another assessment dataset has been retrieved to compare with the newly completed assessment dataset in Operation 250. If so, then the modification module 110 returns to Operation 230, selects the next assessment dataset, and performs a comparison using the newly selected assessment dataset to identify any inconsistencies between the newly completed assessment dataset and the newly selected assessment dataset.

Once the modification module 110 has conducted a comparison of the newly completed assessment dataset to the retrieved assessment datasets, the modification module 110 modifies a risk rating for the vendor to generate a modified risk rating based on any inconsistences that have been identified for the newly completed assessment dataset in Operation 255. Accordingly, the risk rating can be in the form of a score, a level, a grade, and/or the like. In some aspects, the modification module 110 may modify a predefined risk rating (e.g., baseline risk rating) for the particular vendor in generating the modified risk rating. In other aspects, the modification module 110 may modify a prior generated risk rating for the particular vendor (e.g., which the system may have determined based on a single assessment, or any other suitable factor).

In various aspects, the modification module 110 may use a rules-based model in modifying the risk rating to generate the modified risk rating. Accordingly, the rules-based model may use a set of rules that defines how to modify the risk rating based on various factors involved in the identified inconsistencies. For example, the set of rules may provide rules for modifying the risk rating based on the attribute or type of attribute related to an inconsistency. The set of rules may provide rules for modifying the risk rating based on the type of inconsistency. The set of rules may provide rules for modifying the risk rating based on the level and/or severity of an inconsistency (e.g., the numerical values provided for a particular attribute being a certain amount apart). Different sets of rules may be defined for different computer-implemented functionality, different types of computer-implemented functionality, different vendors, different types of vendors, different entity computing systems for which the computer-implemented functionality is to be integrated with, and/or the like.

In various aspects, the modification module 110 modifies the risk rating to generate the modified risk rating by, for example: (1) increasing the risk rating based on the one or more identified inconsistencies; (2) decreasing the risk rating based on the one or more identified inconsistencies; (3) applying one or more multipliers to the risk rating based on the one or more identified inconsistencies; and/or (4) applying any other suitable modification to the risk rating for the particular vendor. In some aspects, the modification module 110 may modify an overall risk rating (e.g., crowdsourcing risk rating) for the vendor in response to detecting the one or more inconsistencies. In other aspects, the modification module 110 may modify a risk rating associated with particular computer-implemented functionality for the vendor and/or a particular attribute of the functionality associated with an identified inconsistency. In particular aspects, the modification module 110 may also output the modified risk rating by displaying the modified risk rating on a graphical user interface, storing the modified risk rating, sending an electronic communication such as an email with the modified risk rating to personnel of an entity, the vendor, and/or the like. The modification module 110 may also include information on the inconsistencies that resulted in the modified risk rating in the output.

Dynamic Assessment Module

Figure 4:
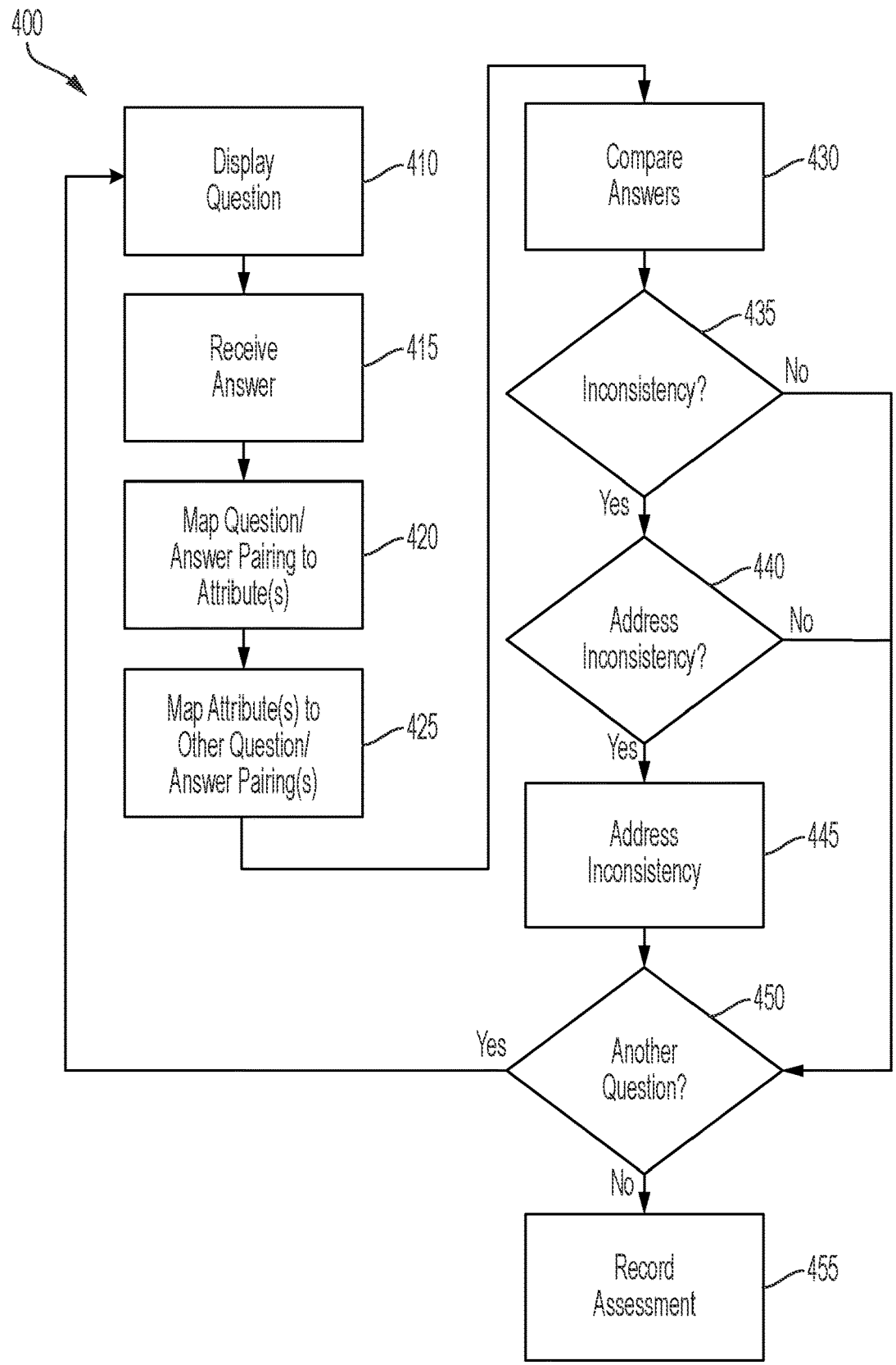
FIG. 4 depicts an example of a process for generating a dynamic assessment completed by a vendor in accordance with various aspects of the present disclosure.

Turning now to FIG. 4, additional details are provided regarding a dynamic assessment module 120 for generating a dynamic assessment completed by a vendor (e.g., personnel thereof) in accordance with various aspects of the disclosure. For instance, the flow diagram shown in FIG. 4 may correspond to operations carried out, for example, by computing hardware found in the vendor risk management computing system 100 or a vendor computing system 195 as described herein, as the computing hardware executes the dynamic assessment module 120.

For example, the dynamic assessment module 120 may provide the assessment in the form of one or more graphical user interfaces that present questions to personnel of the vendor who then provide answers to the questions via the graphical user interfaces. Here, the personnel may have accessed the vendor risk management service to complete the assessment and therefore, the dynamic assessment module 120 is executing on the vendor risk management computing system 100. In other instances, the dynamic assessment module 120 may have been sent to the vendor along with a particular assessment for the vendor to complete. Therefore, the personnel for the vendor may be executing the dynamic assessment module 120 on a vendor computing system 195 associated with the vendor. Accordingly, as the personnel provides answers to the questions presented for the assessment, the dynamic assessment module 120 detects inconsistencies in the assessment in real time and in response, flags one or more responses related to the inconsistencies for additional action.

Therefore, the process 400 involves the dynamic assessment module 120 displaying a question to the personnel in Operation 410. The personnel then enters an answer to the question. The answer to the question can be provided in various formats depending on the types of response requested for the question. For example, the question may be the form of a yes/no question, multiple choice question, freeform question, and/or the like. In addition, the question may request additional information to be provided (e.g., uploaded) along with the answer such as supporting documentation, documentation on certifications, documentation on past data-related incidents, and/or the like.

The dynamic assessment module 120 receives the answer to the question in Operation 415 and maps the question/answer pairing to one or more attributes in Operation 420. For example, the dynamic assessment module 120 may use some type of data structure that maps the question/answer pairing to one or more attributes related to computer-implemented functionality provided by the vendor. In addition, the dynamic assessment module 120 maps the one or more attributes to other question/answer pairings found in the assessment that are related to the one or more attributes in Operation 425.

In various aspects, the assessment can include multiple question/answer pairings that are related to any particular attribute. For example, the assessment may include a first question asking the personnel whether the vendor has implemented an encryption process for encrypting data that is transferred from an entity (e.g., transferred from an entity computing system 190) to the vendor (e.g., to a vendor computing system 195) to be used in a service provided by the vendor. The assessment may also include a second, different question asking the personnel whether the vendor has put any controls in place for ensuring secure data transfers. Therefore, both the first and second question/answer pairings touch on the same attribute as to whether the vendor encrypts data that is transfer from an entity to the vendor. Accordingly, the assessment is configured in this manner to require the personnel to provides multiple answers related to the same attribute to ensure the personnel is providing complete, consistent, and accurate answers (information) related to the attribute.

Therefore, in Operation 430, the dynamic assessment module 120 compares the answers for the question/answer pairings related to the one or more attributes. The dynamic assessment module 120 may perform this particular operation using various functionality depending on the form of the answers. For example, the answers may be a freeform text format. Therefore, the dynamic assessment module 120 can use one or more natural language processing techniques to compare the answers of the question/answer pairings.

For example, the dynamic assessment module 120 may compare a first answer string from a first question/answer pairing with a second answer string from a second question/answer pairing by first utilizing the natural language processing techniques to generate embedded vector representations (e.g., tokenized representations) of the first answer string and the second answer string. The dynamic assessment module 120 can then compare the embedded vector representations for the first and second answer strings to identify whether the first answer string contains an inconsistency.

In other instances, the answers may be in a structured format such as selected answers for multiple choice question, answer to a yes or no question, a numerical answer to a quantity question, and/or the like. Therefore, the dynamic assessment module 120 may compare the answers to the question/answer pairings to determine whether the answers match in identifying whether the answer to the question that was presented to the personnel contains an inconsistency.

At Operation 435, the dynamic assessment module 120 determines whether the answer to the question contains an inconsistency. If so, then the dynamic assessment module 120 determines whether to address the inconsistency in Operation 440. In various aspects, the dynamic assessment module 120 performs this particular operation by using a decision engine to determine a relevance of a particular identified inconsistency. In some aspects, the decision engine may entail a rules-based model that uses a set of rules in determining whether the inconsistency should be addressed. For example, the set of rules may include rules that apply to the level (degree) of inconsistency in determining whether the inconsistency should be address. As a specific example, the set of rules may include a rule that if the inconsistency involves numerically different answers that satisfy a threshold, then the inconsistency should be addressed. In addition, the set of rules may include rules that apply to certain attributes and/or certain types of attributes.

If the dynamic assessment module 120 determines the inconsistency should be addressed, then the dynamic assessment module 120 addresses the inconsistency in Operation 445. Accordingly, the dynamic assessment module 120 may determine one or more actions to take to address the inconsistency based on, for example: (1) a number of attributes that are mapped to the particular question/answer pairing; (2) a type of each of the one or more attributes that are mapped to the particular question/answer pairing; (3) one or more past responses by users to the question/answer paring being flagged or similar question/answer pairings being flagged (e.g., one or more past responses to a question/answer pairing with similar mapped attributes as the particular question/answer pairing); and/or (4) any other suitable factors. Accordingly, the dynamic assessment module may identify one or more actions such as, for example: (1) prompting the personnel to provide supporting information and/or documentation to address the inconsistency; (2) providing the personnel with a follow up question related to the inconsistency; (3) requesting the personnel to readdress the particular question/answer pairing involved in the inconsistency; and/or (4) taking any other suitable action related to the inconsistency (e.g., provide an indication that the inconsistency is acceptable, ignore the flagged response, etc.).

In some aspects, the dynamic assessment module 120 may use a machine-learning model to determine the one or more actions to take to address the inconsistency. For example, the machine-learning model may be a trained model such as a multi-label classification model that processes the particular question/answer pairing and/or the related question/answer pairings and generates a data representation having a set of predictions (e.g., values) in which each prediction is associated with a particular action to take to address the inconsistency. The machine-learning model may be trained, for example, using training data derived from users' responses to follow up requests previously provided for inconsistencies detected in one or more assessment question/answer pairings such as: (1) whether the user ignored the flagged question or related follow up action; (2) a particular type of action the user took in response to the flagged question and/or related follow up action (e.g., providing support for the response, implementing a remediating action, modifying one or more attributes, etc.); (3) one or more frameworks and/or standards that are mapped to the flagged question; and/or (4) any other suitable information.

At this point, the dynamic assessment module 120 determines whether the assessment includes another question to ask the personnel in Operation 450. If so, then the dynamic assessment module 120 returns to Operation 410, selects the next question, and performs the operations just discussed for the newly selected question. Once the dynamic assessment module 120 has processed all of the questions for the assessment, the dynamic assessment module 120 records the assessment in Operation 455. For example, the dynamic assessment module 120 may record the assessment by submitting the assessment as a newly completed assessment dataset to the vendor risk management computing system 100.

Tier Module

Figure 5:
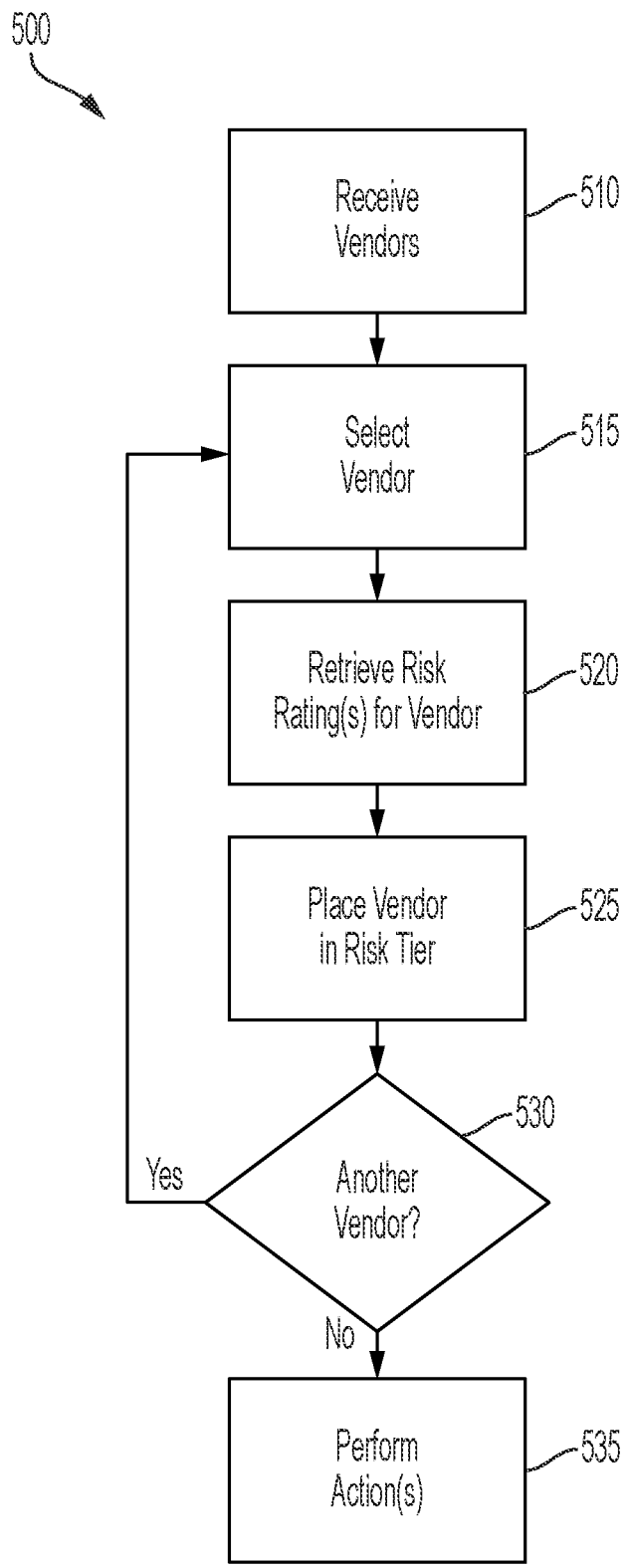
FIG. 5 depicts an example of a process for placing vendors in tiers in accordance with various aspects of the present disclosure.

Turning now to FIG. 5, additional details are provided regarding a tier module 130 for placing vendors in tiers in accordance with various aspects of the disclosure. For instance, the flow diagram shown in FIG. 5 may correspond to operations carried out, for example, by computing hardware found in the vendor risk management computing system 100 as described herein, as the computing hardware executes the tier module 130.

As previously noted, an entity may be using the vendor risk management service in evaluating, identifying, monitoring, and managing risk associated with the entity integrating computer-implemented functionality provided by a variety of vendors. In some instances, the entity may be utilizing computer-implemented functionality provided by a large number of vendors. Therefore, the entity may wish to utilize the vendor risk management service in a manner that can allow personnel for the entity to quickly assess which vendors pose risks that the entity should be concerned with and/or should address.

Accordingly, the vendor risk management computing system 100 in various aspects is configured to place the vendors associated with a particular entity into risk tiers that can allow personnel for the entity to quick identify groups of vendors that are associated with a particular level of risk (e.g., risk rating). For example, the personnel for the entity may be viewing information on various vendors provided through the vendor risk management service. Here, the personal may be viewing a graphical user interface through the vendor risk management service that displays a listing of vendors with their respective risk ratings.

However, the personnel may be interested in identifying those vendors that the entity may be using for various computer-implemented functionality and/or may be planning to use for various computer-implemented functionality that have been identified as having a certain level of risk. Therefore, the personnel may select an option provided on the graphical user interface to place the interested vendors for the personnel into risk tiers so that the personnel can quickly identify those vendors associated with the certain level of risk. As a result of selecting the option, the tier module 130 may be executed to place the vendors into the appropriate tiers.

Therefore, the process 500 involves the tier module 130 receiving a list of vendors in Operation 510. For example, the personnel may have provided criteria for identifying the vendors of interest to have placed in the different tiers. As a specific example, the personnel may have identified all of the vendors that the entity is actively using to provide computer-implemented functionality that is integrated into entity computing systems 190 for the entity.

In Operation 515, the tier module 130 selects one of the vendors from the list of vendors. The tier module 130 then retrieves one or more risk ratings that have been generated and stored for the vendor in Operation 520. For example, the tier module 130 may retrieve: a risk rating for the vendor that has been specifically developed for the particular entity; may in addition, or instead, retrieve a risk rating for the vendor that has been developed for other entities (e.g., a baseline risk rating and/or a crowdsourcing risk rating); may in addition, or instead, retrieve a risk rating for the vendor that has been specifically developed for particular computer-implemented functionality; and/or the like.

The graphical user interface may allow the personnel to provide criteria used by the tier module 130 in retrieving the one or more risk ratings for the vendor. Accordingly, such functionality can allow for the personnel to fine tune what risk ratings are used in placing the vendors into the different risk tiers.

Once the tier module 130 has retrieved the one or more risk ratings, the tier module 130 places the vendor into a particular risk tier based on the risk rating(s) in Operation 525. For example, the risk tiers may include "Low," "Medium," "High," and "Very High" and the risk ratings may be provided as scores ranging from 1-100. The tier module 130 may generate a composite risk score for the risk scores by, for example, averaging the risk scores, taking the median of the risk scores, and/or the like. The tier module 130 may then place the vendor into one of the risk tiers based on the vendor having a particular composite risk score. For example, the tier module 130 may place the vendor with a composite risk score ranging from 1 to 25 into the "Low" tier, a composite risk score ranging from 26-50 into the "Medium" tier, a composite risk score ranging from 51-75 into the "High" tier, or a composite risk score ranging from 76-100 into the "Very High" tier.

The tier module 130 then determines whether another vendor needs to be placed in one of the risk tiers in Operation 530. If so, then the tier module 130 returns to Operation 515, selects the next vendor, and places the next vendor into the appropriate risk tier as just discussed. Once the tier module 130 has placed all of the vendors into an appropriate risk tier, the tier module 130 may perform one or more actions related to the different risk tiers in Operation 535. For example, the tier module 130 may display the different risk tiers and their associated vendors to the personnel. In another example, the tier module 130 may send an electronic communication such as an email, text message, and/or the like to the personnel and/or some other personnel of the entity providing the vendors that have been placed in the different risk tiers or a particular risk tier of interest.

The tiering of vendors can be advantageous to the personnel of the entity, such as a privacy officer, because it may allow the personnel to quickly determine a general risk level associated with a group of vendors. This can be especially advantageous when the group of vendors includes a large number of vendors (e.g., 1000 or more). The personnel may then use the risk tiering to determine whether, and how, to further assess the risk associated with certain vendors. For example, the personnel may determine to take no action in regard to vendors that have been placed in the "Low" tier, have a third party conduct risk assessments for vendors placed in the "Medium" tier, and have vendors that have been placed in the "High" or "Very High" tiers complete risk impact assessments.

Risk Mitigation Module

Figure 6:
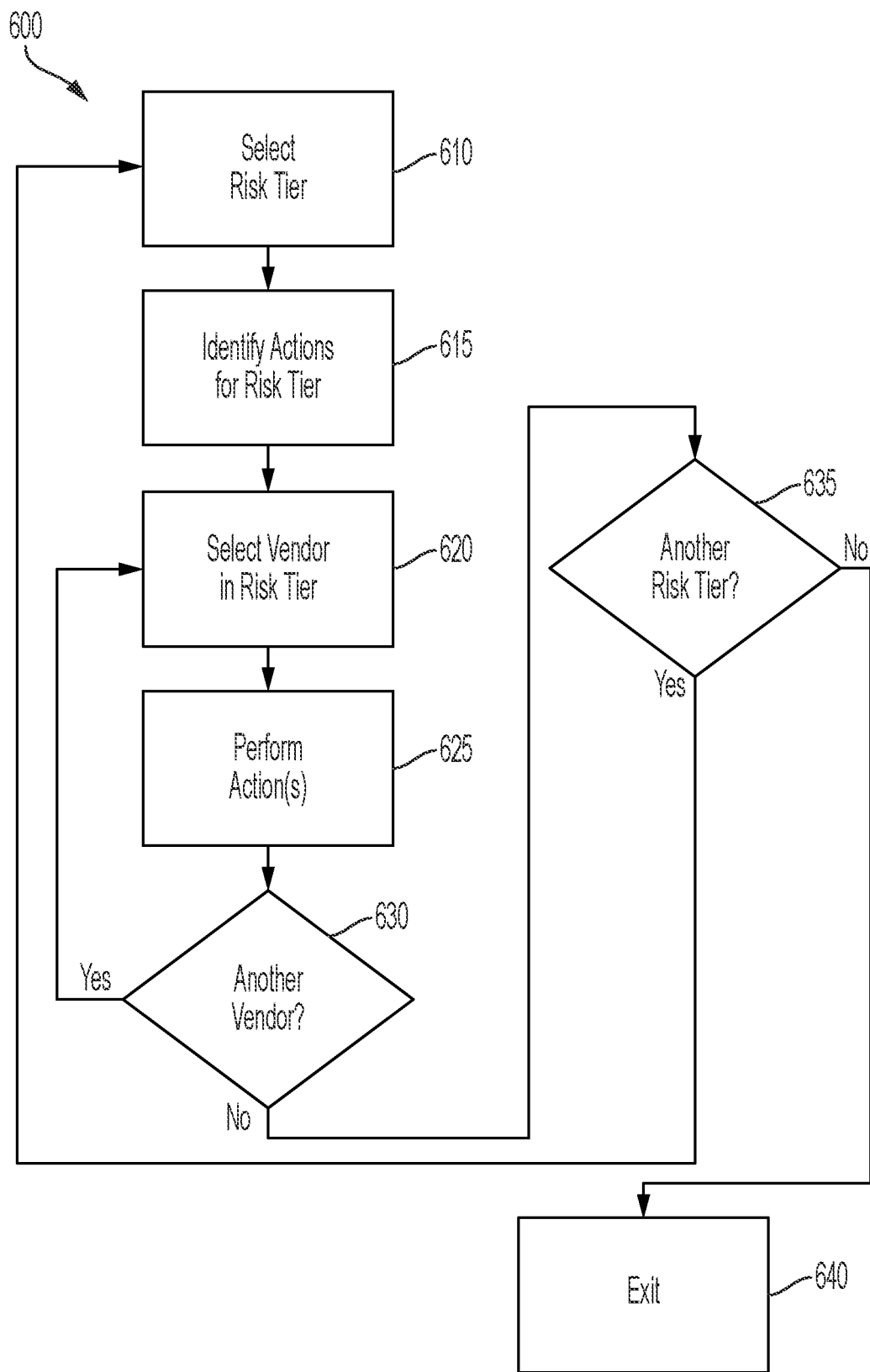
FIG. 6 depicts an example of a process for processing vendors for various tiers in accordance with various aspects of the present disclosure.

Turning now to FIG. 6, additional details are provided regarding a risk mitigation module 140 for processing vendors for various risk tiers in accordance with various aspects of the disclosure. For instance, the flow diagram shown in FIG. 6 may correspond to operations carried out, for example, by computing hardware found in the vendor risk management computing system 100 as described herein, as the computing hardware executes the risk mitigation module 140.

An entity may employ the vendor risk management service to perform certain actions for vendors that have been placed in a particular risk tier. For example, the entity may wish to have risk impact assessments automatically generated and sent to vendors that have been placed in the "Very High" tier. In another example, the entity may wish to have actions performed in instances where a vendor's risk rating changes and causes the vendor to be moved from a first risk tier to a second, different risk tier.

As a specific example, an entity may currently have computer-implemented functionality provided by a first vendor integrated with an entity computing system 190 of the entity. The first vendor's risk rating may currently place the vendor into the "Medium" tier for the entity. However, the first vendor may implement a change that affects an attribute for the first vendor that causes the first vendor's risk rating to increase with respect to the entity's integration of the computer-implemented functionality. As a result, the increased risk rating may move the first vendor from the "Medium" tier to the "Very High" tier. Here, the entity may wish to have one or more actions performed as a result of the first vendor being moved from the "Medium" tier to the "Ver High" tier.

For example, the entity may wish to have one or more electronic notifications sent to personnel of the entity to notify them of the change in risk the entity is now experiencing in integrating computer-implemented functionality. In other instances, the entity may wish to have more direct actions taken in addition, or instead, to mitigate an increase in risk due to the first vendor moving from the "Medium" tier to the "Very High" tier such as, for example, having the integration of computer-implemented functionality with the entity computing system 190 (temporarily) disabled until the increase in risk can be addressed by the entity and/or the first vendor.

In various aspects, the vendor risk management computing system 100 may provide entities with functionality to define actions that are to be performed for vendors that have been placed into certain risk tiers. For example, the vendor risk management computing system 100 may provide one or more graphical user interfaces through the vendor risk management service that allows for personnel of entities to define actions to be performed for vendors placed into certain risk tiers. In addition, the one or more graphical user interfaces may allow for the personnel to provide information needed by the vendor risk management computing system 100 to perform the actions such as, for example, email addresses of personnel to receive electronic communications, credentials needed to access entity computing systems 190, and/or the like.

Accordingly, the risk mitigation module 140 may be invoked by personnel of an entity to have one or more actions performed for vendors placed into a certain risk tier. For example, the personnel may have a group of vendors placed into the different risk tiers as previously discussed. The personnel may then decide to have one or more actions performed for vendors placed in a particular risk tier such as the "Very High" tier. In other instances, the vendor risk management computing system 100 may automatically invoke the risk mitigation module 140. For example, personnel of an entity may set up to have the vendor risk management computing system 100 invoke the risk mitigation module 140 for a particular risk tier periodically and/or when a vendor's risk rating has changed and moves the vendor into a particular risk tier. In those instances, the vendor risk management computing system 100 may invoke the risk mitigation module 140 for the particular vendor and not necessarily for every vendor that has placed into the particular risk tier.

The process 600 involves the risk mitigation module 140 selecting the particular risk tier in Operation 610. Here, the risk mitigation module 140 may select the particular risk tier by querying the vendors that have been placed in the particular risk tier for the entity. For example, personnel for the entity may have previously had a group of vendors placed into the different risk tiers as previously discussed and the tiering of the group of vendors may have been stored in a data repository 170 found in the vendor risk management computing system 100 or other computing system such as an entity computing system 190 for the entity. Therefore, the risk mitigation module 140 may query the vendors that have been placed in the particular risk tier from the data repository 170.

In some aspects, the risk mitigation module 140 may use criteria in querying the vendors for the particular risk tier. For example, the risk mitigation module 140 may use criteria that indicates to only query those vendors that have been newly placed in the particular risk tier, which have a risk rating that has recently changed (e.g., increased), and/or the like. Personnel for the entity may define the criteria via a graphical user interface provided through the vendor risk management service. Accordingly, the criteria can facilitate carrying out actions for certain vendors found in the particular risk tier without necessarily having to carry out the actions for every vendor found in the particular risk tier.

In Operation 615, the risk mitigation module 140 identifies the one or more actions that are to be performed for the vendors. As previously discussed, personnel of the entity may define the one or more actions that are to be performed for vendors that are placed in the particular risk tier. For example, the personnel may define that an email is to be sent to certain risk management personnel of the entity that identifies the vendors placed in the particular risk tier. In addition, the personnel may define that an assessment is to be sent to each vendor that has been placed in the particular risk tier. Again, the defined actions to be performed may be stored in a data repository 170 found in the vendor risk management computing system 100 or other computing system such as an entity computing system 190 for the entity. Therefore, the risk mitigation module 140 may query the one or more actions from the data repository 170.

In Operation 620, the risk mitigation module 140 selects a vendor for the particular risk tier. The risk mitigation module 140 then performs the defined action(s) for the selected vendor in Operation 625. The risk mitigation module 140 then determines whether another vendor has been queried for the particular risk tier in Operation 630. If so, then the risk mitigation module 140 selects the next vendor and performs the one or more actions for the vendor accordingly.

Once the risk mitigation module 140 has processed all of the vendors for the particular risk tier, the risk mitigation module 140 determines whether one or more actions are to be carried out for vendors found in another risk tier in Operation 635. For example, the entity may wish to have a first set of actions carried out for vendors placed in the "High" tier and a second set of actions carried out for vendors placed in the "Very High" tier. If this is the case, then the risk mitigation module 140 returns to Operation 610 to select the next risk tier. The risk mitigation module 140 then performs the operations just discussed for the next risk tier. Once the risk mitigation module 140 has processed all the necessary risk tiers, the risk mitigation module 140 exits in Operation 640.

Custom Module

Figure 7:
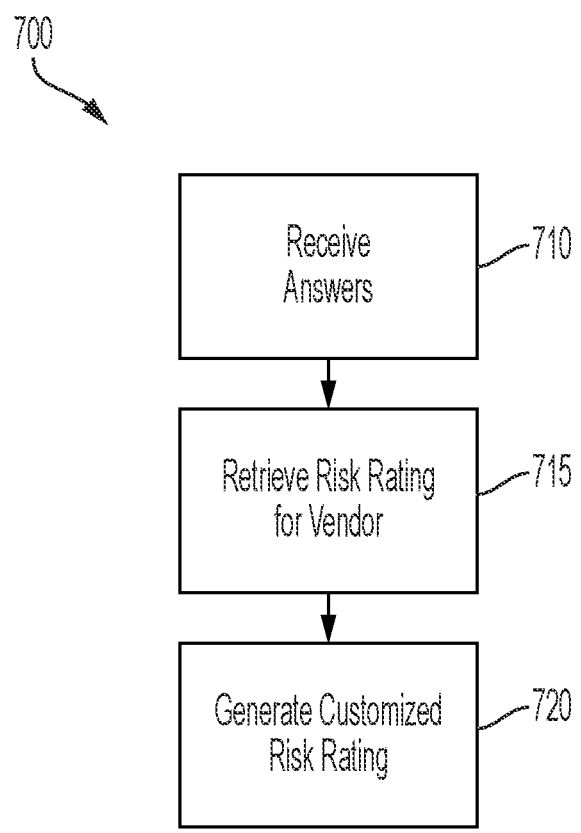
FIG. 7 depicts an example of a process for generating a customized risk rating of a vendor for an entity in accordance with various aspects of the present disclosure.

Turning now to FIG. 7, additional details are provided regarding a custom module 150 for generating a customized risk rating of a vendor for an entity in accordance with various aspects of the disclosure. For instance, the flow diagram shown in FIG. 7 may correspond to operations carried out, for example, by computing hardware found in the vendor risk management computing system 100 as described herein, as the computing hardware executes the custom module 150.

As previously noted, an advantage provided in various aspects is that the vendor risk management service can be utilized to collect information (e.g., assessment datasets) on various vendors through a multitude of sources (e.g., different entities) and generate a risk rating for the individual vendors that may be more representative of the risk involved with integrating computer-implemented functionality with an entity computing system 190 than had a particular entity carried out the risk analysis independently. That is to say, the vendor risk management computing system 100 can be utilized in various aspects to crowdsource respective risk ratings for a plurality of different vendors (e.g., a large number of vendors). For example, over time, a large number of entities may each submit a respective assessment dataset for a particular vendor. The vendor risk management computing system 100 may then use each of these assessment datasets to revise (e.g., modify) the respective risk rating for the particular vendor.

As a specific example, the vendor risk management computing system 100 in various aspects may generate and maintain a respective baseline risk rating for each of a plurality of vendors based on, for example, any suitable combination of factors for the vendors. The vendor risk management computing system 100 may then modify the baseline risk rating for a vendor based on crowdsourced assessment datasets to generate a crowdsourced risk rating for the vendor. In generating the crowdsourced risk rating for a particular vendor, the vendor risk management computing system 100 may, for example, average the respective ratings (e.g., scores) associated with each assessment dataset and use that average (e.g., in conjunction with the baseline risk rating) in determining the crowdsourced risk rating for the vendor. In still other aspects, the vendor risk management computing system 100 may use this averaged rating as the vendor's baseline risk score. It should be understood that the crowdsourced risk rating for a particular vendor may be calculated using any suitable method (e.g., other than averaging). Accordingly, this can allow for a risk rating to be developed and maintained for the vendor that may be more comprehensive of the risk involved with using computer-implemented functionality provided by the particular vendor.

However, with that said, any one entity's integration of computer-implemented functionality provided by a vendor may have specific risk associated with the integration that may be different than the risk experienced by other entities. Therefore, an entity may wish to generate a customized risk rating for a particular vendor that may be more representative of the risk involved with the entity integrating certain computer-implemented functionality with an entity computing system 190 for the entity.

In various aspects, the vendor risk management computing system 100 provides a questionnaire that personnel of an entity can completed for a particular vendor that provides information on the entity's utilization and/or planned utilization of computer-implemented functionality provided by the vendor. For example, the vendor risk management computing system 100 may provide the questionnaire through one or more graphical user interfaces that can be accessed by the personnel of the entity through the vendor risk management service. The questionnaire may include, for example, one or more of the questions 800 listed in FIG. 8. For instance, the questionnaire may ask the personnel whether the vendor performs a critical business function for the entity, whether the vendor connects to the entity's IT infrastructure, etc.

Therefore, the process 700 involves the custom module 150 receiving the answers to the questions (e.g., in a suitable dataset) in Operation 710. In Operation 715, the custom module 150 retrieves a risk rating for the vendor. For example, the custom module 150 may retrieve the baseline risk rating and/or crowdsourced risk rating for the vendor. The custom module 150 then uses the dataset of answers to modify the retrieved risk rating to generate a customized risk rating for the vendor in Operation 720. For example, the custom module 150 may generate the customized risk rating by averaging the retrieved risk rating for the vendor with a risk rating computed from the dataset of answers. Here, the custom module 150 may assign a numerical risk rating to a vendor based on the dataset of answers by assigning a particular value to each possible answer to each particular question within the questionnaire, and then totaling all of the respective values that correspond to the answers to those questions to determine the risk rating.

In particular aspects, the vendor risk management computing system 100 displays (e.g., at least initially display) a risk rating (e.g., a baseline risk rating and/or crowdsourced risk rating) for the vendor (e.g., Vendor X) to each entity of a set of entities accessing the vendor risk management service to view risk data for the particular vendor. In response to a first entity from the set of entities submitting a questionnaire for Vendor X, the custom module 150 may generate a first customized risk rating for Vendor X based on the completed questionnaire from the first entity. The custom module 150 may, for example, generate the first customized risk rating for Vendor X by averaging a baseline risk rating and/or crowdsourced risk rating with a risk rating computed from the completed questionnaire from the first entity. The vendor risk management computing system 100 may then display the first customized risk rating for Vendor X to the first entity, but continue to display the baseline risk rating and/or crowdsourced risk rating to the remaining entities in the set of entities. In various aspects, the vendor risk management computing system 100 maintains the customized risk rating for use only by the entity. In other aspects, the customized risk rating may be available for use by other entities in place of a previous version of a risk rating for the vendor.

Custom Modification Module

Figure 9:
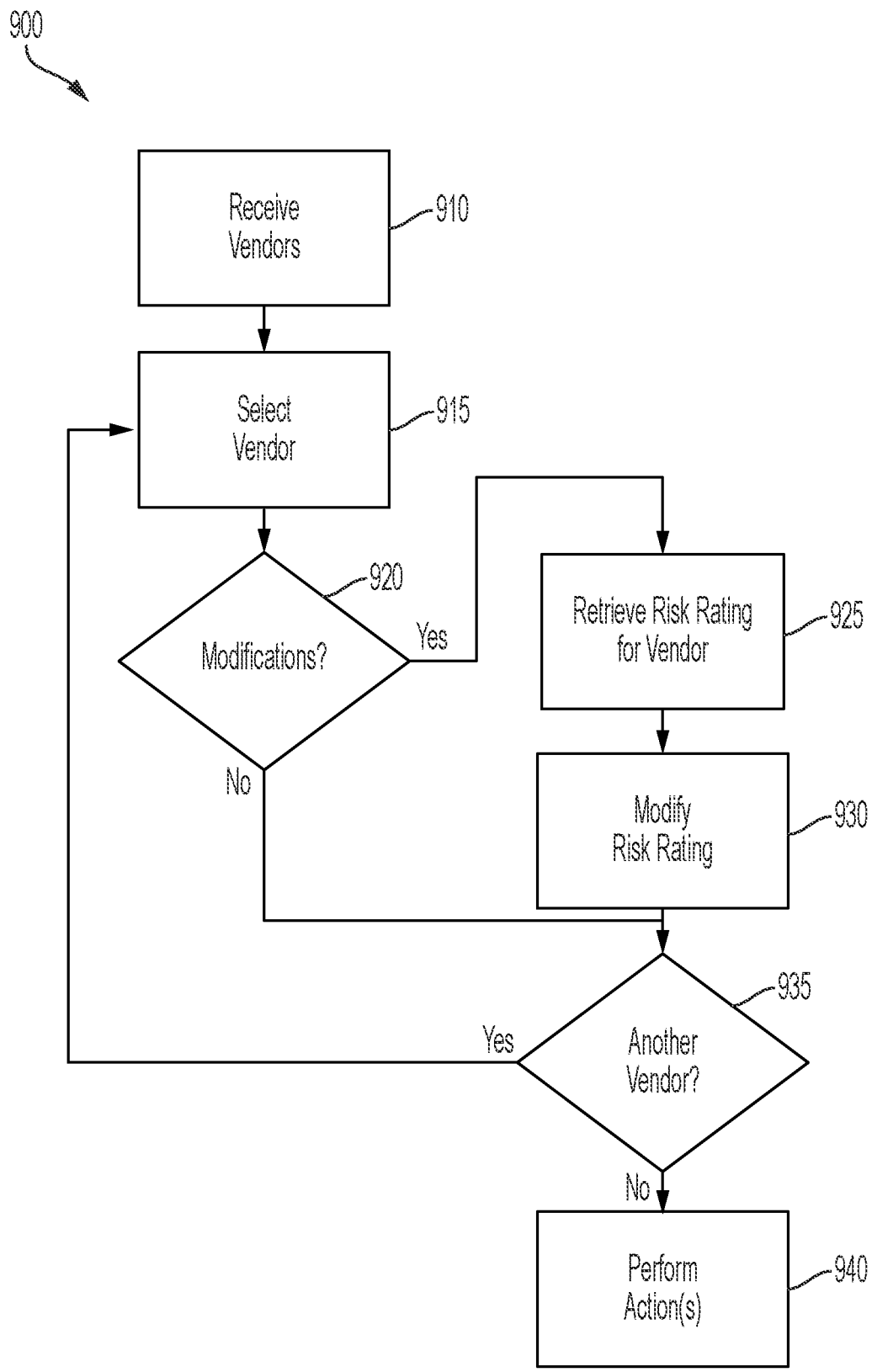
FIG. 9 depicts an example of a process for modifying a risk rating of a vendor for an entity in accordance with various aspects of the present disclosure.

Turning now to FIG. 9, additional details are provided regarding a custom modification module 160 for modifying a risk rating of a vendor for an entity in accordance with various aspects of the disclosure. For instance, the flow diagram shown in FIG. 9 may correspond to operations carried out, for example, by computing hardware found in the vendor risk management computing system 100 as described herein, as the computing hardware executes the custom modification module 160.

In various aspects, the vendor risk management computing system 100 allows an entity to define how a risk rating (e.g., baseline risk rating, crowdsourced risk rating, and/or customized risk rating) for a particular vendor is to be modified for use by the entity. For instance, the entity may specify to modify the risk rating for each of the entity's vendors in accordance with one or more third-party risk ratings (e.g., the Vendor's ISS Cyber Risk Score, or other third-party risk rating such as those that may assess risks related to the vendor's labor or environmental practices).

The vendor risk management computing system 100 may provide one or more graphical user interfaces that are accessible by personnel for entities through the vendor risk management service to specify how certain risk ratings are to be modified. The personnel may use the one or more graphical user interfaces in defining certain conditions that are to be satisfied to have a particular vendor's risk rating modified. In addition, the personnel may define the manner in which a vendor's risk rating is be modified if the conditions are met. Therefore, once personnel for a particular entity has defined the conditions and manner for modifying vendor risk ratings for the entity, the vendor risk management computing system 100 may invoke the custom modification module 160 to modify the risk ratings accordingly.

The process 900 involves the custom modification module 160 receiving the vendors for the entity in Operation 910. In Operation 915, the custom modification module 160 selects one of the vendors. The custom modification module 160 then determines whether the risk rating for the selected vendor is to be modified in Operation 920. For example, the personnel for the entity may have defined a condition that for any particular vendor of the entity, if the vendor's respective ISS Cyber Risk Score falls within a particular range, such as 300 to 500, the vendor's risk rating is to be modified in a certain manner such as raise or lower the vendor's risk rating by a certain amount and/or percentage. Therefore, if the custom modification module 160 determines the condition is satisfied for the selected vendor, then the custom modification module 160 retrieves the vendor's risk rating in Operation 925 and modifies the risk rating accordingly in Operation 930.

The custom modification module 160 determines whether another vendor is to be processed for the entity in Operation 935. If so, then the custom modification module 160 returns to Operation 915, selects the next vendor, and processes the vendor to modify a risk rating for the vendor accordingly. Although the custom modification module 160 is described in the context of allowing a particular entity to modify a risk rating for the entity's purposes, the custom modification module 160 may be used in some aspects to modify a risk rating, such as a baseline risk rating and/or crowdsourcing risk rating, for one or more vendors that is available for use to a plurality of different entities.

In particular aspects, once the custom modification module 160 has processed all of the vendors for the entity, the custom modification module 160 performs one or more actions that may be associated with the modified risk ratings in Operation 940. For example, the custom modification module 160 may invoke the tier module 130 and/or risk mitigation module 140 as previously discussed. In another example, the custom modification module 160 may cause a modified risk rating to be displayed for a particular vendor adjacent one or more other risk ratings associated with the vendor and/or any other relevant risk-related information for the vendor.

Figure 10:
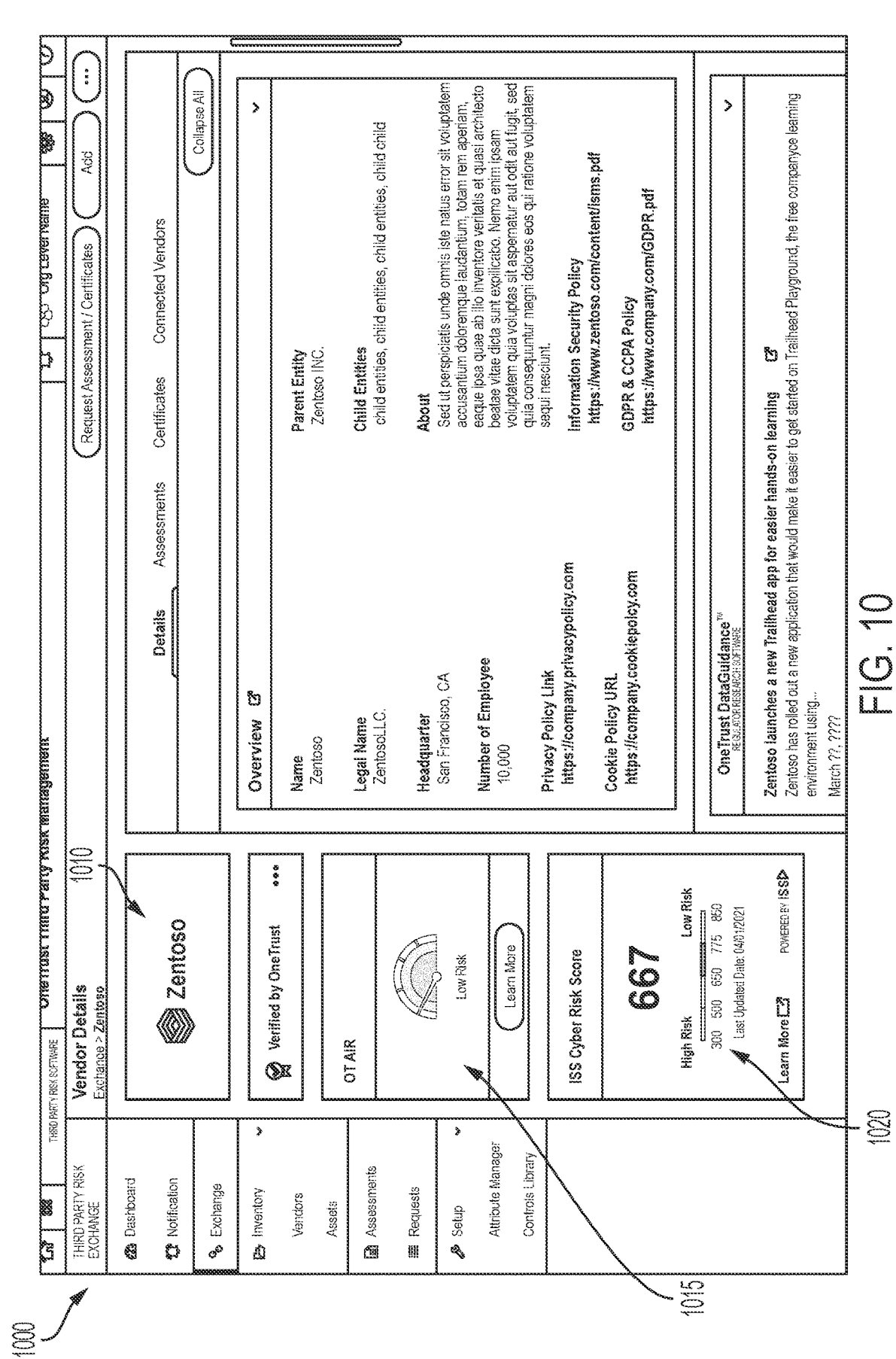
FIG. 10 provides an example of a graphical user interface that can be used in accordance with various aspects of the present disclosure.

For example, FIG. 10 provides an example of a graphical user interface 1000 that may be provided through the vendor risk management service that displays various risk information for a particular vendor (e.g., Zentoso 1010). Here, the graphical user interface 1000 displays a graphic 1015 indicating that the computer-implemented functionality provided by the vendor is considered a low risk to the entity. The graphic 1015 can be based on placing the vendor in a particular tier (e.g. "Low" tier) for the entity. The vendor may have been placed in the particular tier based on one or more of a baseline risk rating, crowdsourcing risk rating, customized risk rating, or modified customized risk rating. In addition, the graphical user interface 1000 provides a third party risk rating, in this instance the vendor's ISS Cyber Risk Score 1020. Accordingly, the graphical user interface 1000 can be useful in helping personnel for the entity assess the risks associated with integrating computer-implemented functionality provided by the vendor into an entity computing system 190 for the entity in greater detail.

Example Technical Platforms

Aspects of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example aspects, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

According to various aspects, a non-volatile computer-readable storage medium may include a floppy disk, flexible disk, hard disk, solid-state storage (SSS) (e.g., a solid-state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (Fe-RAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

According to various aspects, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where various aspects are described to use a computer-readable storage medium, other types of computer-readable storage media may be substituted for or used in addition to the computer-readable storage media described above.

Various aspects of the present disclosure may also be implemented as methods, apparatuses, systems, computing devices, computing entities, and/or the like. As such, various aspects of the present disclosure may take the form of a data structure, apparatus, system, computing device, computing entity, and/or the like executing instructions stored on a computer-readable storage medium to perform certain steps or operations. Thus, various aspects of the present disclosure also may take the form of entirely hardware, entirely computer program product, and/or a combination of computer program product and hardware performing certain steps or operations.

Various aspects of the present disclosure are described below with reference to block diagrams and flowchart illustrations. Thus, each block of the block diagrams and flowchart illustrations may be implemented in the form of a computer program product, an entirely hardware aspect, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution.

For example, retrieval, loading, and execution of code may be performed sequentially such that one instruction is retrieved, loaded, and executed at a time. In some examples of aspects, retrieval, loading, and/or execution may be performed in parallel such that multiple instructions are retrieved, loaded, and/or executed together. Thus, such aspects can produce specially configured machines performing the steps or operations specified in the block diagrams and flowchart illustrations. Accordingly, the block diagrams and flowchart illustrations support various combinations of aspects for performing the specified instructions, operations, or steps.

Example System Architecture

Figure 11:
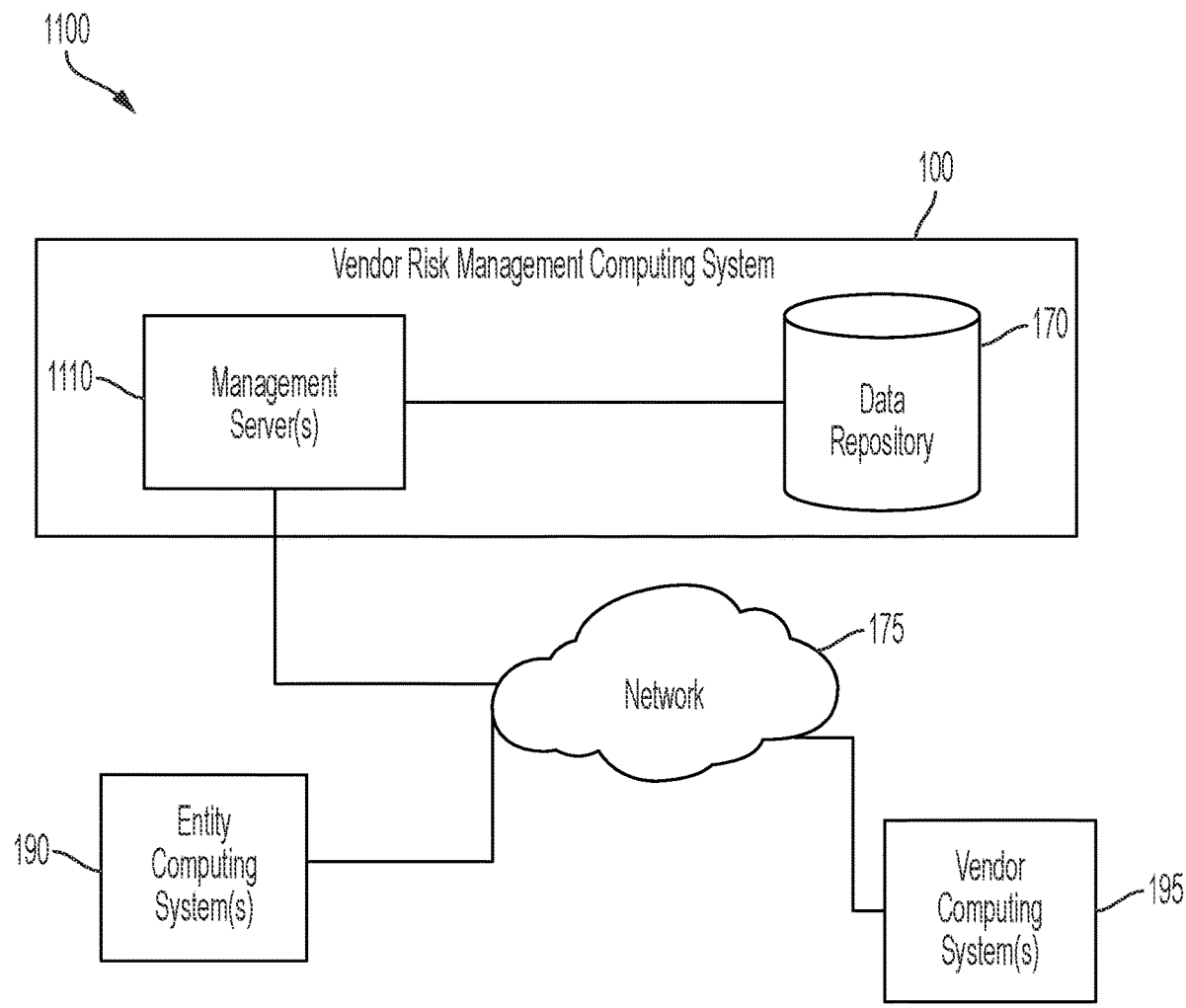
FIG. 11 depicts an example of a system architecture that may be used in accordance with various aspects of the present disclosure.

FIG. 11 is a block diagram of a system architecture 1100 that can be used in providing the vendor risk management service and corresponding functionality according to various aspects of the disclosure as detailed herein. Components of the system architecture 1100 are configured according to various aspects to provide an entity with the vendor risk management service that facilitates and assists the entity in successfully recognizing, managing, and mitigating risks associated with integrating entity computing systems 190 of the entity with computer-implemented functionality (e.g., services, software applications, computing system capacity, and/or the like) provided through vendor computing systems 195. As may be understood from FIG. 11, the system architecture 1100 in various aspects may include a vendor risk management computing system 100 that comprises one or more management servers 1110 and one or more data repositories 170.

The one or more management servers 1110 are used in supporting the vendor risk management service (e.g., an instance thereof) for an entity within the vendor risk management computing system 100. The one or more data repositories 170 may include, for example, a data repository for storing assessment datasets received for various vendors. In addition, the one or more data repositories 170 may include a data repository for storing specific data for various entities such as customized risk ratings on vendors for the various entities, as well as conditions and manners defined by the various entities and used in modifying risk ratings for vendors as described herein. Further, the management server(s) 1110 may execute a modification module 110, a dynamic assessment module 120, a tier module 130, a risk mitigation module 140, a custom module 150, and/or a custom modification module 160 as described herein. Further, in some aspects, the management server(s) 1110 may provide one or more graphical user interfaces through which personnel of the entities can access the vendor risk management service.

The one or more management servers 1110 may be in communication with one or more entity computing systems 190 for the entities, as well as one or more vendor computing systems 195 for the vendors, over one or more networks 175. Accordingly, the management server(s) 1110 may be in communication over the network(s) 140 with components residing on the entity computing systems 190 and/or vendor computing systems 195 to facilitate various functionality as described herein. To do so, the management server(s) 1110 may interface with the entity computing systems 190 and/or vendor computing systems 195 via one or more suitable application programming interfaces (APIs), direct connections, and/or the like. Although the management server(s) 110 and data repository(ies) 170 are shown as separate components, it should be understood that according to other aspects, these components 1110, 170 may comprise a single server and/or repository, a plurality of servers and/or repositories, one or more cloud-based servers and/or repositories, or any other suitable configuration.

Example Computing Hardware

Figure 12:
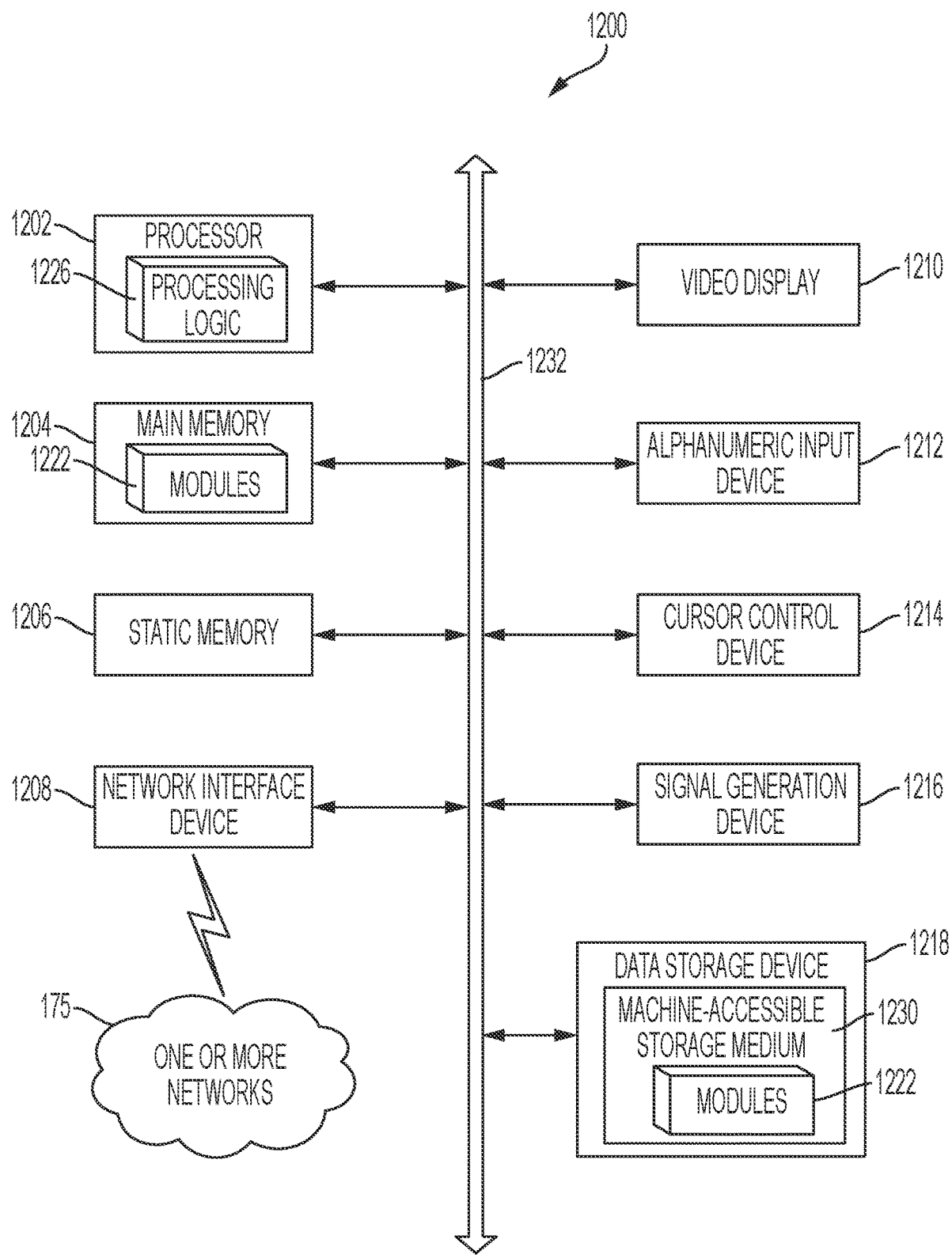
FIG. 12 depicts an example of a computing entity that may be used in accordance with various aspects of the present disclosure.

FIG. 12 illustrates a diagrammatic representation of a computing hardware device 1200 that may be used in accordance with various aspects of the disclosure. For example, the hardware device 1200 may be computing hardware such as a management server 1110 as described in FIG. 11. According to particular aspects, the hardware device 1200 may be connected (e.g., networked) to one or more other computing entities, storage devices, and/or the like via one or more networks such as, for example, a LAN, an intranet, an extranet, and/or the Internet. As noted above, the hardware device 1200 may operate in the capacity of a server and/or a client device in a client-server network environment, or as a peer computing device in a peer-to-peer (or distributed) network environment. According to various aspects, the hardware device 1200 may be a personal computer (PC), a tablet PC, a set-top box (STB), a Personal Digital Assistant (PDA), a mobile device (smartphone), a web appliance, a server, a network router, a switch or bridge, or any other device capable of executing a set of instructions (sequential or otherwise) that specify actions to be taken by that device. Further, while only a single hardware device 1200 is illustrated, the term "hardware device," "computing hardware," and/or the like shall also be taken to include any collection of computing entities that individually or jointly execute a set (or multiple sets) of instructions to perform any one or more of the methodologies discussed herein.

A hardware device 1200 includes a processor 1202, a main memory 1204 (e.g., read-only memory (ROM), flash memory, dynamic random-access memory (DRAM) such as synchronous DRAM (SDRAM), Rambus DRAM (RDRAM), and/or the like), a static memory 1206 (e.g., flash memory, static random-access memory (SRAM), and/or the like), and a data storage device 1218, that communicate with each other via a bus 1232.

The processor 1202 may represent one or more general-purpose processing devices such as a microprocessor, a central processing unit, and/or the like. According to some aspects, the processor 1202 may be a complex instruction set computing (CISC) microprocessor, reduced instruction set computing (RISC) microprocessor, very long instruction word (VLIW) microprocessor, a processor implementing other instruction sets, processors implementing a combination of instruction sets, and/or the like. According to some aspects, the processor 1202 may be one or more special-purpose processing devices such as an application specific integrated circuit (ASIC), a field programmable gate array (FPGA), a digital signal processor (DSP), network processor, and/or the like. The processor 1202 can execute processing logic 1226 for performing various operations and/or steps described herein.

The hardware device 1200 may further include a network interface device 1208, as well as a video display unit 1210 (e.g., a liquid crystal display (LCD), a cathode ray tube (CRT), and/or the like), an alphanumeric input device 1212 (e.g., a keyboard), a cursor control device 1214 (e.g., a mouse, a trackpad), and/or a signal generation device 1216 (e.g., a speaker). The hardware device 1200 may further include a data storage device 1218. The data storage device 1218 may include a non-transitory computer-readable storage medium 1230 (also known as a non-transitory computer-readable storage medium or a non-transitory computer-readable medium) on which is stored one or more modules 1222 (e.g., sets of software instructions) embodying any one or more of the methodologies or functions described herein. For instance, according to particular aspects, the modules 1222 may include a modification module 110, a dynamic assessment module 120, a tier module 130, a risk mitigation module 140, a custom module 150, and/or a custom modification module 160 as described herein. The one or more modules 1222 may also reside, completely or at least partially, within main memory 1204 and/or within the processor 1202 during execution thereof by the hardware device 1200—main memory 1204 and processor 1202 also constituting computer-accessible storage media. The one or more modules 1222 may further be transmitted or received over a network 175 via the network interface device 1208.

While the computer-readable storage medium 1230 is shown to be a single medium, the terms "computer-readable storage medium" and "machine-accessible storage medium" should be understood to include a single medium or multiple media (e.g., a centralized or distributed database, and/or associated caches and servers) that store the one or more sets of instructions. The term "computer-readable storage medium" should also be understood to include any medium that is capable of storing, encoding, and/or carrying a set of instructions for execution by the hardware device 1200 and that causes the hardware device 1200 to perform any one or more of the methodologies of the present disclosure. The term "computer-readable storage medium" should accordingly be understood to include, but not be limited to, solid-state memories, optical and magnetic media, and/or the like.

System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, steps, structural devices, acts, or modules. These states, operations, steps, structural devices, acts, and modules may be implemented in software, in firmware, in special purpose digital logic, and any combination thereof. Greater or fewer operations may be performed than shown in the figures and described herein. These operations also may be performed in a different order than those described herein.

CONCLUSION

The disclosure provided herein entails detecting and addressing changes made to regulatory frameworks that affect (may affect) computing systems of various entities. However, those of ordinary skill in the art should appreciate that aspects of the disclosure may be used in detecting and addressing changes made to other regulatory instruments such as regulatory laws, regulations, standards, and/or the like that may also affect computing systems of various entities in handling certain types of data (e.g., target data).

While this specification contains many specific aspect details, these should not be construed as limitations on the scope of any invention or of what may be claimed, but as descriptions of features that may be specific to particular aspects of particular inventions. Certain features that are described in this specification in the context of separate aspects also may be implemented in combination in a single aspect. Conversely, various features that are described in the context of a single aspect also may be implemented in multiple aspects separately or in any suitable sub-combination. Moreover, although features may be described above as acting in certain combinations and even initially claimed as such, one or more features from a claimed combination may in some cases be excised from the combination, and the claimed combination may be a sub-combination or variation of a sub-combination.

Similarly, while operations are described in a particular order, this should not be understood as requiring that such operations be performed in the particular order described or in sequential order, or that all described operations be performed, to achieve desirable results. In certain circumstances, multitasking and parallel processing may be advantageous. Moreover, the separation of various components in the various aspects described above should not be understood as requiring such separation in all aspects, and the described program components (e.g., modules) and systems may be integrated together in a single software product or packaged into multiple software products.

Many modifications and other aspects of the disclosure will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for the purposes of limitation.

What is claimed:

1. A method comprising:
    providing, by computing hardware, a first question from a set of questions found in an electronic assessment for display on a user interface, wherein the user interface solicits a first answer to the first question, and the set of questions relates to computer-implemented functionality provided by a vendor;
    receiving, by the computing hardware and via the user interface, the first answer to the first question to provide a first question/answer pairing;
    mapping, by the computing hardware, the first question/answer pairing to an attribute related to the computer-implemented functionality;
    mapping, by the computing hardware, the attribute to a second question/answer pairing, wherein the second question/answer pairing:
        is related to the attribute,
        comprises a second question of the set of questions, and
        comprises a second answer provided to the second question;
    comparing, by the computing hardware, the first answer to the second answer to identify an inconsistency in the first answer with respect to the second answer;
    determining, by the computing hardware, to address the inconsistency; and
    responsive to determining to address the inconsistency, performing, by the computing hardware, an action to address the inconsistency, wherein the action comprises at least one of:
    (1) prompting, via the user interface, to provide at least one of supporting information or supporting documentation to address the inconsistency, (2) providing, via the user interface, a follow up question related to the inconsistency, or (3) requesting, via the user interface, the inconsistency in the first answer to be redressed.

2. The method of claim 1, wherein determining to address the inconsistency comprises processing the inconsistency via a decision engine to generate a relevance of the inconsistency, the decision engine comprising a rules-based model configured to use a set of rules in determining a level of the inconsistency as a measure of the relevance of the inconsistency.

3. The method of claim 1 further comprising determining, by the computing hardware, the action to perform by:
    processing at least one of the first question/answer pairing or the second question/answer pairing using a machine-learning model to generate a data representation having a set of predictions in which each prediction is associated with a particular action to take to address the inconsistency; and
    selecting, based on the set of predictions, the action to address the inconsistency.

4. The method of claim 3, wherein the machine-learning model is trained using training data derived from responses to follow up requests previously provided for inconsistencies detected in past assessment question/answer pairings that comprises at least one of (1) whether the inconsistencies detected in the past assessment question/answer pairings were ignored, (2) whether related follow up actions for the inconsistencies detected in the past assessment question/answer pairings were ignored, (3) particular types of actions taken in response to the inconsistencies detected in the past assessment question/answer pairings, or (4) at least one of a framework or standard that is mapped to the past assessment question/answer pairings.

5. The method of claim 1, wherein mapping the first question/answer pairing to the attribute related to the computingcomputer-implemented functionality and mapping the attribute to the second question/answer pairing is performed via a data structure that maps the first question/answer pairing and the second question/answer pairing to the attribute.

6. The method of claim 1, wherein the first answer and the second answer are in a freeform text format and comparing the first answer to the second answer to identify the inconsistency in the first answer with respect to the second answer involves:
    performing a natural language processing technique on the first answer to generate a first embedded representation of the first answer,
    performing the natural language processing technique on the second answer to generate a second embedded representation of the second answer, and
    comparing the first embedded representation to the second embedded representation to identify the inconsistency.

7. The method of claim 1 further comprising determining, by the computing hardware, the action to take to address the inconsistency based on at least one of a type of the attribute or a past response to a past inconsistency related to the attribute.

8. A system comprising:
    a non-transitory computer-readable medium storing instructions; and
    a processing device communicatively coupled to the non-transitory computer-readable medium,
    wherein, the processing device is configured to execute the instructions and thereby perform operations comprising:

providing a first question found in an electronic assessment for display on a user interface, wherein the user interface solicits a first answer to the first question, and the first question relates to computer-implemented functionality;

receiving, via the user interface, the first answer to the first question to provide a first question/answer pairing;

mapping the first question/answer pairing to a plurality of attributes related to the computer-implemented functionality;

mapping the plurality of attributes to a second question/answer pairing, wherein the second question/answer pairing comprises a second question, and a second answer provided to the second question;

comparing the first answer to the second answer to identify an inconsistency in the first answer with respect to the second answer;

determining to address the inconsistency; and responsive to determining to address the inconsistency, performing an action to address the inconsistency, wherein the action comprises at least one of: (1) prompting, via the user interface, to provide at least one of supporting information or supporting documentation to address the inconsistency, (2) providing, via the user interface, a follow up question related to the inconsistency, or (3) requesting, via the user interface, the inconsistency in the first answer to be redressed.

9. The system of claim 8, wherein determining to address the inconsistency comprises processing the inconsistency using a rules-based model configured to use a set of rules in determining a level of the inconsistency as a measure of a relevance of the inconsistency.

10. The system of claim 8, wherein the operations further comprise determining the action to perform by:

processing at least one of the first question/answer pairing or the second question/answer pairing using a machine-learning model to generate a data representation having a set of predictions in which each prediction is associated with a particular action to take to address the inconsistency; and selecting, based on the set of predictions, the action to address the inconsistency.

11. The system of claim 10, wherein the machine-learning model is trained using training data derived from responses to follow up requests previously provided for inconsistencies detected in past assessment question/answer pairings that comprises at least one of (1) whether the inconsistencies detected in the past assessment question/answer pairings were ignored, (2) whether related follow up actions for the inconsistencies detected in the past assessment question/answer pairings were ignored, (3) particular types of actions taken in response to the inconsistencies detected in the past assessment question/answer pairings, or (4) at least one of a framework or standard that is mapped to the past assessment question/answer pairings.

12. The system of claim 8, wherein mapping the first question/answer pairing to the plurality of attributes related to the computer-implemented functionality and mapping the plurality of attributes to the second question/answer pairing is performed via a data structure that maps the first question/answer pairing and the second question/answer pairing to the plurality of attributes.

13. The system of claim 8, wherein the first answer and the second answer are in a freeform text format and comparing the first answer to the second answer to identify the inconsistency in the first answer with respect to the second answer involves:

performing a natural language processing technique on the first answer to generate a first embedded representation of the first answer, performing the natural language processing technique on the second answer to generate a second embedded representation of the second answer, and comparing the first embedded representation to the second embedded representation to identify the inconsistency.

14. The system of claim 8, wherein the operations further comprise determining the action to take to address the inconsistency based on at least one of (1) a number of the plurality of attributes, (2) a type of each of the plurality of attributes, or (3) one or more past responses to one or more past inconsistencies related to the plurality of attributes.

15. A non-transitory computer-readable medium having program code that is stored thereon, the program code executable by one or more processing devices for performing operations comprising:

providing a first question found in an electronic assessment for display on a user interface, wherein the user interface solicits a first answer to the first question, and the first question relates to computer-implemented functionality;

receiving, via the user interface, the first answer to the first question to provide a first question/answer pairing;

mapping the first question/answer pairing to an attribute related to the computer-implemented functionality;

mapping the attribute to a second question/answer pairing, wherein the second question/answer pairing comprises a second question, and a second answer provided to the second question;

comparing the first answer to the second answer to identify an inconsistency in the first answer with respect to the second answer;

determining to address the inconsistency; and responsive to determining to address the inconsistency, performing an action to address the inconsistency, wherein the action comprises at least one of: (1) prompting, via the user interface, to provide at least one of supporting information or supporting documentation to address the inconsistency, (2) providing, via the user interface, a follow up question related to the inconsistency, or (3) requesting, via the user interface, the inconsistency in the first answer to be redressed.

16. The non-transitory computer-readable medium of claim 15, wherein determining to address the inconsistency comprises processing the inconsistency using a rules-based model configured to use a set of rules in determining a level of the inconsistency as a measure of a relevance of the inconsistency.

17. The non-transitory computer-readable medium of claim 15, wherein the operations further comprise determining the action to perform by:

processing at least one of the first question/answer pairing or the second question/answer pairing using a machine-learning model to generate a data representation having a set of predictions in which each prediction is associated with a particular action to take to address the inconsistency; and selecting, based on the set of predictions, the action to address the inconsistency.

18. The non-transitory computer-readable medium of claim 15, wherein mapping the first question/answer pairing to the attribute related to the computer-implemented functionality and mapping the attribute to the second question/answer pairing is performed via a data structure that maps the first question/answer pairing and the second question/answer pairing to the attribute.

19. The non-transitory computer-readable medium of claim 15, wherein the first answer and the second answer are in a freeform text format and comparing the first answer to the second answer to identify the inconsistency in the first answer with respect to the second answer involves:
   performing a natural language processing technique on the first answer to generate a first embedded representation of the first answer,
   performing the natural language processing technique on the second answer to generate a second embedded representation of the second answer, and
   comparing the first embedded representation to the second embedded representation to identify the inconsistency.

20. The non-transitory computer-readable medium of claim 15, wherein the operations further comprise determining the action to take to address the inconsistency based on at least one of a type of the attribute or a past response to a past inconsistency related to the attribute.

\* \* \* \* \*

UNITED STATES PATENT AND TRADEMARK OFFICE
CERTIFICATE OF CORRECTION

| | | |
|---|---|---|
| PATENT NO. | : 11,816,224 B2 | Page 1 of 1 |
| APPLICATION NO. | : 17/977285 | |
| DATED | : November 14, 2023 | |
| INVENTOR(S) | : Sabourin et al. | |

It is certified that error appears in the above-identified patent and that said Letters Patent is hereby corrected as shown below:

On the Title Page

Item (72), in the inventor section, after the last named inventor please add the following inventors: Subramanian Viswanathan, San Ramon, CA (US); Milap Shah, Bangalore (IN); Siju George, Atlanta GA (US); Siju John, Vancouver (CA)

Signed and Sealed this
Fourteenth Day of January, 2025

Derrick Brent
*Acting Director of the United States Patent and Trademark Office*